US011682046B2

(12) United States Patent
Stoddart et al.

(10) Patent No.: US 11,682,046 B2
(45) Date of Patent: *Jun. 20, 2023

(54) SYSTEMS AND METHODS FOR IMPLEMENTING A SPONSOR PORTAL FOR MEDIATING SERVICES TO END USERS

(71) Applicant: FinanceNinja, LLC, Overland Park, KS (US)

(72) Inventors: Michael Stoddart, Baldwin City, KS (US); Arun Pimpalapure, Lewisville, TX (US)

(73) Assignee: FINANCENINJA, LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/576,709

(22) Filed: Jan. 14, 2022

(65) Prior Publication Data
US 2022/0138802 A1  May 5, 2022

Related U.S. Application Data

(63) Continuation of application No. 16/906,794, filed on Jun. 19, 2020, now Pat. No. 11,227,313.
(Continued)

(51) Int. Cl.
*G06Q 30/0251* (2023.01)
*G06F 3/0482* (2013.01)
(Continued)

(52) U.S. Cl.
CPC ....... *G06Q 30/0267* (2013.01); *G06F 3/0482* (2013.01); *G06F 3/0483* (2013.01);
(Continued)

(58) Field of Classification Search
CPC ......... G06Q 30/0267; G06Q 10/06316; G06Q 10/107; G06Q 30/016; G06Q 30/018;
(Continued)

(56) References Cited

U.S. PATENT DOCUMENTS 5,239,462 A  8/1993  Jones et al.
5,592,375 A  1/1997  Salmon et al.
(Continued)

FOREIGN PATENT DOCUMENTS

EP    1076868 A1    2/2001
WO    1997043893 A1    11/1997
(Continued)

OTHER PUBLICATIONS

Using Web Analytics to Increase Conversions: 6. Additional Metrics for Increasing Sales & Generating Leads Anonymous. Direct Marketing Association (DMA). Web Analytics Report. (Nov. 2007).*
(Continued)

*Primary Examiner* — Timothy Padot
(74) *Attorney, Agent, or Firm* — Armstrong Teasdale LLP

(57) ABSTRACT

A graphical user interface (GUI) for a sponsor portal system includes a first display area that persistently displays a list of a plurality of tabs and a second display area. When the GUI is executed by a computing device of a sponsor of the plurality of sponsors, the second display area is dynamically updatable to display a scrollable list of customers of the sponsor, a list of vendors approved by the sponsor, and a list of active offers. In response to selection of an active offer, the GUI is configured to display a draft offer message and an approval control. In response to selection of the approval control, the sponsor engine is configured to transmit an interactive graphic to mobile computing devices, the interactive graphic configured to communicate information to the mobile computing devices for display on a screen of limited size.

20 Claims, 37 Drawing Sheets

Related U.S. Application Data

(60) Provisional application No. 62/863,533, filed on Jun. 19, 2019.

(51) Int. Cl.

| | | |
|---|---|---|
| *G06Q 10/0631* | (2023.01) | |
| *G06Q 30/0201* | (2023.01) | |
| *G06F 16/25* | (2019.01) | |
| *G06F 3/0483* | (2013.01) | |
| *G06Q 10/107* | (2023.01) | |
| *G06Q 30/016* | (2023.01) | |
| *G06Q 30/018* | (2023.01) | |
| *G06Q 30/0207* | (2023.01) | |
| *G06Q 30/0241* | (2023.01) | |
| *G06Q 30/0601* | (2023.01) | |
| *G06T 11/00* | (2006.01) | |
| *G06Q 10/0637* | (2023.01) | |
| *G06Q 10/20* | (2023.01) | |
| *G06Q 40/06* | (2012.01) | |
| *G06Q 50/00* | (2012.01) | |
| *G06Q 50/16* | (2012.01) | |
| *G06Q 40/03* | (2023.01) | |

(52) U.S. Cl.
CPC ..... *G06F 16/252* (2019.01); *G06Q 10/06316* (2013.01); *G06Q 10/107* (2013.01); *G06Q 30/016* (2013.01); *G06Q 30/018* (2013.01); *G06Q 30/0239* (2013.01); *G06Q 30/0276* (2013.01); *G06Q 30/0631* (2013.01); *G06T 11/00* (2013.01); *G06Q 10/06375* (2013.01); *G06Q 10/20* (2013.01); *G06Q 30/0201* (2013.01); *G06Q 40/03* (2023.01); *G06Q 40/06* (2013.01); *G06Q 50/01* (2013.01); *G06Q 50/16* (2013.01)

(58) Field of Classification Search
CPC ........... G06Q 30/0239; G06Q 30/0631; G06Q 10/06375; G06Q 10/20; G06Q 30/0201; G06Q 40/025; G06Q 40/06; G06Q 50/01; G06Q 50/16; G06F 16/252; G06F 3/0482; G06F 3/0483; G06T 11/00
USPC ....................................................... 705/7.26
See application file for complete search history.

(56) References Cited

U.S. PATENT DOCUMENTS

| | | |
|---|---|---|
| 5,797,133 A | 8/1998 | Jones et al. |
| 5,920,848 A | 7/1999 | Schutzer et al. |
| 5,940,812 A | 8/1999 | Tengel et al. |
| 6,014,645 A | 1/2000 | Cunningham |
| 6,029,149 A | 2/2000 | Dykstra et al. |
| 6,128,602 A | 10/2000 | Northington et al. |
| 6,324,524 B1 | 11/2001 | Lent et al. |
| 6,385,594 B1 | 5/2002 | Lebda et al. |
| 6,385,652 B1 | 5/2002 | Brown et al. |
| 6,606,606 B2 | 8/2003 | Starr |
| 6,611,816 B2 | 8/2003 | Lebda et al. |
| 7,089,202 B1 | 8/2006 | McNamar et al. |
| 7,398,236 B2 | 7/2008 | Jaffe |
| 7,415,610 B2 | 8/2008 | Ganesan et al. |
| 7,426,530 B1 | 9/2008 | Rosko et al. |
| 7,676,751 B2 | 3/2010 | Allen et al. |
| 7,711,623 B2 | 5/2010 | Smith et al. |
| 7,720,750 B2 | 5/2010 | Brody et al. |
| 7,734,522 B2 | 6/2010 | Johnson et al. |
| 7,853,493 B2 | 12/2010 | DeBie et al. |
| 7,856,388 B1 | 12/2010 | Srivastava et al. |
| 7,949,579 B2 | 5/2011 | Keld |
| 8,027,888 B2 | 9/2011 | Chandran et al. |
| 8,060,424 B2 | 11/2011 | Kasower |
| 8,296,191 B1 | 10/2012 | Foo et al. |
| 8,346,624 B2 | 1/2013 | Goad et al. |
| 8,355,967 B2 | 1/2013 | DeBie et al. |
| 8,360,787 B2 | 1/2013 | Zorba, Sr. et al. |
| 8,429,112 B2 | 4/2013 | Rosenfeld et al. |
| 8,429,538 B2 | 4/2013 | Allen et al. |
| 8,438,086 B2 | 4/2013 | Rosko et al. |
| 8,442,887 B2 | 5/2013 | Hamann |
| 8,458,070 B2 | 6/2013 | Rosko et al. |
| 8,533,132 B2 | 9/2013 | Zimmerman et al. |
| 8,706,579 B2 | 4/2014 | Keld et al. |
| 8,793,183 B2 | 7/2014 | Bramlage et al. |
| 8,799,128 B2 | 8/2014 | Rosko et al. |
| 8,799,148 B2 | 8/2014 | Chandran |
| 8,868,457 B2 | 10/2014 | Irwin |
| 9,015,239 B2 | 4/2015 | Banatwala et al. |
| 9,032,281 B2 | 5/2015 | Zongker |
| 9,342,824 B2 | 5/2016 | Rosko et al. |
| 9,349,145 B2 | 5/2016 | Rozman et al. |
| 9,443,268 B1 | 9/2016 | Kapczynski et al. |
| 9,514,124 B2 | 12/2016 | Allen et al. |
| 9,563,891 B2 | 2/2017 | Kuhn et al. |
| 9,672,487 B1 | 6/2017 | Garcia et al. |
| 9,710,851 B2 | 7/2017 | Allen et al. |
| 9,712,509 B1 | 7/2017 | Marshall et al. |
| 9,853,959 B1 | 12/2017 | Kapczynski et al. |
| 9,904,957 B2 | 2/2018 | Garcia et al. |
| 9,972,052 B2 | 5/2018 | Keld et al. |
| 10,007,942 B2 | 6/2018 | Wickam |
| 10,019,588 B2 | 7/2018 | Garcia et al. |
| 10,489,813 B1 | 11/2019 | De Guia et al. |
| 2002/0077964 A1 | 6/2002 | Brody et al. |
| 2002/0077970 A1 | 6/2002 | Lebda et al. |
| 2002/0143564 A1 | 10/2002 | Webb et al. |
| 2002/0194120 A1 | 12/2002 | Russell et al. |
| 2004/0030639 A1 | 2/2004 | Lebda et al. |
| 2004/0054610 A1 | 3/2004 | Amstutz et al. |
| 2004/0199458 A1 | 10/2004 | Ho |
| 2004/0205019 A1 | 10/2004 | Painter et al. |
| 2005/0222931 A1 | 10/2005 | Mamou et al. |
| 2005/0273406 A1 | 12/2005 | Lebda et al. |
| 2006/0041491 A1 | 2/2006 | Smith et al. |
| 2006/0072733 A1 | 4/2006 | Ryan et al. |
| 2006/0100944 A1 | 5/2006 | Reddin et al. |
| 2006/0195816 A1 | 8/2006 | Grandcolas et al. |
| 2006/0218061 A1 | 9/2006 | Mouline |
| 2006/0259852 A1 | 11/2006 | Upendran et al. |
| 2007/0050285 A1 | 3/2007 | Freeman |
| 2007/0067234 A1 | 3/2007 | Beech |
| 2007/0189472 A1 | 8/2007 | Lamb et al. |
| 2007/0198401 A1 | 8/2007 | Kunz |
| 2007/0219851 A1* | 9/2007 | Taddei ............ G06Q 30/02 705/7.13 |
| 2008/0027856 A1 | 1/2008 | Owens et al. |
| 2008/0046349 A1 | 2/2008 | Elberg et al. |
| 2008/0059352 A1 | 3/2008 | Chandran |
| 2008/0071675 A1 | 3/2008 | Lebda et al. |
| 2008/0109445 A1* | 5/2008 | Williams ........... G06Q 30/0202 |
| 2008/0114655 A1 | 5/2008 | Skidmore |
| 2008/0154766 A1 | 6/2008 | Lewis et al. |
| 2008/0249869 A1* | 10/2008 | Angell ............ G06Q 30/02 705/14.1 |
| 2008/0262962 A1 | 10/2008 | Alliotts |
| 2008/0301002 A1 | 12/2008 | Chokov et al. |
| 2009/0024462 A1 | 1/2009 | Lin |
| 2009/0144191 A1 | 6/2009 | Lebda et al. |
| 2009/0182661 A1 | 7/2009 | Irwin |
| 2009/0216591 A1 | 8/2009 | Buerger et al. |
| 2009/0259586 A1 | 10/2009 | Reddin et al. |
| 2009/0287547 A1 | 11/2009 | Scanlon |
| 2009/0307088 A1 | 12/2009 | Littlejohn |
| 2010/0088361 A1 | 4/2010 | Oliver |
| 2010/0114663 A1* | 5/2010 | Casas ............... G06Q 30/0201 705/7.31 |
| 2010/0131390 A1 | 5/2010 | Emswiler |
| 2010/0250407 A1 | 9/2010 | Silva |
| 2010/0274623 A1 | 10/2010 | Thomas |
| 2010/0312648 A1 | 12/2010 | Gerome et al. |

(56) References Cited

U.S. PATENT DOCUMENTS

| | | | |
|---|---|---|---|
| 2011/0270773 A1 | 11/2011 | Siekman et al. | |
| 2011/0289161 A1* | 11/2011 | Rankin, Jr. | H04L 51/216 709/206 |
| 2012/0260263 A1 | 10/2012 | Edoja | |
| 2013/0073386 A1 | 3/2013 | Rose et al. | |
| 2013/0085924 A1 | 4/2013 | Colak et al. | |
| 2013/0151368 A1 | 6/2013 | Goad et al. | |
| 2013/0151369 A1 | 6/2013 | Goad et al. | |
| 2013/0173418 A1 | 7/2013 | Goad et al. | |
| 2013/0253987 A1 | 9/2013 | Hamann | |
| 2014/0013194 A1 | 1/2014 | Zongker | |
| 2014/0040113 A1 | 2/2014 | Emswiler | |
| 2014/0136381 A1 | 5/2014 | Joseph et al. | |
| 2014/0172479 A1 | 6/2014 | Gallagher et al. | |
| 2014/0310151 A1 | 10/2014 | Shishkov et al. | |
| 2014/0365350 A1 | 12/2014 | Shvarts | |
| 2014/0372340 A1 | 12/2014 | Brown | |
| 2015/0081496 A1 | 3/2015 | Rowe et al. | |
| 2015/0134505 A1 | 5/2015 | Lebda et al. | |
| 2015/0178804 A1 | 6/2015 | Goad et al. | |
| 2015/0242919 A1* | 8/2015 | Wickam | G06Q 30/0619 705/26.44 |
| 2015/0278761 A1 | 10/2015 | Hamann | |
| 2015/0363862 A1 | 12/2015 | Ranft et al. | |
| 2016/0203551 A1 | 7/2016 | Tutte et al. | |
| 2016/0232533 A1 | 8/2016 | Glaser | |
| 2017/0270440 A1 | 9/2017 | Garcia et al. | |
| 2017/0322705 A1 | 11/2017 | Conway et al. | |
| 2017/0330220 A1* | 11/2017 | Korada | G06Q 30/016 |
| 2017/0365008 A1 | 12/2017 | Schreier et al. | |
| 2018/0005215 A1 | 1/2018 | Delaney et al. | |
| 2018/0005216 A1 | 1/2018 | Delaney et al. | |
| 2018/0082381 A1 | 3/2018 | Jouhikainen et al. | |
| 2018/0232741 A1 | 8/2018 | Jadhav et al. | |
| 2018/0240187 A1 | 8/2018 | Lee et al. | |
| 2018/0253780 A1 | 9/2018 | Wang et al. | |
| 2018/0293640 A1 | 10/2018 | Krappe | |
| 2018/0322580 A1 | 11/2018 | Hsiung | |
| 2019/0012471 A1 | 1/2019 | Garcia et al. | |
| 2019/0057455 A1 | 2/2019 | Mozeika | |
| 2019/0139115 A1 | 5/2019 | Wickam | |
| 2019/0228015 A1 | 7/2019 | Assia | |

FOREIGN PATENT DOCUMENTS

| | | |
|---|---|---|
| WO | 1998058356 A2 | 12/1998 |
| WO | 2003058396 A2 | 7/2003 |
| WO | 2018037401 A1 | 3/2018 |
| WO | 2018190911 A1 | 10/2018 |

OTHER PUBLICATIONS

Managing Sales Leads by Computer. Zeleny, Indira Small Business Reports; Nov. 1989; 14, 11; ABI/INFORM Global; pp. 60-62.*

Applications of recommender systems in target selection. Krishnamoorthy, Srikumar; Bhasker, Bharat. Journal of Targeting, Measurement and Analysis for Marketing13.1: 61-69. Palgrave Macmillan. (Oct. 2004).*

Web Lending Site Qualifies Leads for Banks. FutureBanker 2.4: 28. Thomson Media. (Apr. 1998).*

Campaigner(R) Announces SMTP Relay: An Email Marketing Match Made in Heaven for Customers and Businesses. Business Wire [New York] Aug. 26, 2014.*

ISR and Written Opinion, PCT/US2020/038746, 13 pages, dated Aug. 17, 2020.

* cited by examiner

| | | | 1800 |
|---|---|---|---|
| FinanceNinja — 1603 | | | 🔍 IS Sponsor ⌄<br>Independent Sponsor |
| Contacts | Offer Management — 1605 | | 1816<br>+Create Offers |
| Offers — 1803 | | | |
| Leads | 1802 — Category | 1804 — Product Name ↕ | 1806 — Offer Name ↕ | 1808 — Validity From  Validity To | 1810 — Status | 1812 — Action 1814 |
| Vendors | All Category ⌄ | Search | Search | | All ⌄ | |
| Communication | ⌃ Mortgage | Purchase 30 Yr Fixed | $100 off on processing fee | 10/01/2019  11/05/2019 | ⚪ | + Offer |
| Tasks | | | 10% off on document charges | 10/01/2019  11/05/2019 | ⚪ | View Edit |
| | | | | | ⚪ | View Edit |
| | ⌄ Auto loans | Heavy Vehicle Loan | | | | + Offer |
| | Credit Cards | Personal Loan | $200 off on monthly fee | 10/01/2019  11/05/2019 | ⚪ | View Edit |
| | Student Loans | Education Loan | No processing fee till May end | 10/01/2019  11/05/2019 | ⚪ | View Edit |
| | Insurance | Mortgage Insurance | $100 off on new insurance | 10/01/2019  11/05/2019 | ⚪ | View Edit |
| | Personal Loans | Card Product | $300 off on loan above $100000 | 10/01/2019  11/05/2019 | ⚪ | View Edit |
| | | | | |⟵ ⟨ 1 [2] 3 4 5 ⟩ ⟶| |

FinanceNinja

< Create Offers — 1603

- Contacts
- Offers
- Leads
- Vendors
- Communication
- Tasks

— 1605

⌕ IS Sponsor
Independent Sponsor  >

— 170
— 2000

NOTE: All mandatory fields will be shown to the users on mobile application.

Offer Category*
[ Mortgage ⌄ ]

Product Name*
[ Purchase 30 Yr Fixed ⌄ ]
Max: 60 characters

Mortgage Type
[ Purchase ⌄ ]

Offer Name*
[ $500 off on closing cost ]

Monthly Payment
[ $1200 ]

Interest rate
[ 3.4% ]

APR
[ 4.2% ]

State
[ 7 states selected ⌄ ]

Valid From
[ 05/04/2020 📅 ]

Valid To*
[ 05/25/2020 📅 ]

Offer Description*
[ We offer access to mortgage and real estate solutions that drive results. By combining industry best practices with leading edge technology, we deliver innovative approaches to mitigate risk in an ever changing environment. ]
Max: 350 characters Offer link                                    Featured Offer (Optional)

SYSTEMS AND METHODS FOR IMPLEMENTING A SPONSOR PORTAL FOR MEDIATING SERVICES TO END USERS

CROSS REFERENCE TO RELATED APPLICATIONS

This application is a continuation of and claims priority to U.S. patent application Ser. No. 16/906,794, filed Jun. 19, 2020, entitled SYSTEMS AND METHODS FOR IMPLEMENTING A SPONSOR PORTAL FOR MEDIATING SERVICES TO END USERS, which claims the benefit of and priority to U.S. Provisional Patent Application No. 62/863,533, filed Jun. 19, 2019, and entitled SYSTEMS AND METHODS FOR IMPLEMENTING AN AUTOMATED PERSONAL FINANCE AGENT FOR A USER, the contents and disclosures of which are hereby incorporated by referenced in their entireties.

BACKGROUND

This disclosure relates generally to automated agents for interfacing between a user and third-party systems, and more particularly to an automated personal finance agent.

At least some known computing systems aggregate financial information associated with a user. For example, such systems may allow a user to view information associated with the user's financial accounts. However, such systems only provide access to specific types of financial information, requiring the user to work through multiple interfaces to compile financial information from different sources. Further, such systems do not have a comprehensive set of features enabling the user to actively manage his or her finances globally via the system, but again require the user to work through multiple different interfaces. In addition, current systems passively display financial information and cannot make recommendations for financial decisions without human input.

In addition, at least some known systems are capable of receiving general financial and demographic information about a user, such as yearly income, age, and credit score, and reporting back to the user with one or more loan products for which the user qualifies. However, such general financial and demographic information does not enable in-depth evaluation of the user's personal financial circumstances, and such systems are not capable of negotiating individually tailored financial products for a user based on personal characteristics and individual financial accomplishments of the user.

In addition, some technologies allow individuals to search, e.g., the World Wide Web for sites of businesses or companies that provide services such as home improvement, maintenance, or remodeling work. Some websites and/or applications, such as Yelp and NextDoor, allow users to post and read recommendations and reviews of local businesses that can provide such services. However, such reviews may be biased or subjective or even subject to manipulation, resulting in increased risk of a negative experience for the customer. Such known systems suffer from a lack of infrastructure that would enable users to conveniently and efficiently search for such services through a trusted sponsor, and from a lack of infrastructure that would enable potential trusted sponsors of such services to conveniently and efficiently mediate offers from sources of such services.

Accordingly, a computing system that provides infrastructure for automatically connecting customers to vendors via mediation by a trusted sponsor is therefore desirable.

BRIEF DESCRIPTION

In one aspect, a graphical user interface (GUI) for a sponsor portal system is described. The sponsor portal system includes a sponsor engine in communication with a database, the database storing sponsor profiles for a plurality of sponsors, each sponsor registered for services with respect to recommending vendors to users, the vendors and users stored in a contact list with respect to each sponsor. The GUI includes a first display area that persistently displays a list of a plurality of tabs for different elements of the sponsor portal system and a second display area. When the GUI is executed by a computing device of a sponsor of the plurality of sponsors, the second display area is dynamically updatable to display in response to a selection of a contacts tab in the first display area, a scrollable list of customers of the sponsor, in response to a selection of a vendors tab in the first display area, a list of vendors approved by the sponsor, and in response to a selection of a leads tab in the first display area, a list of active offers, each active offer submitted by a vendor included in the list of vendors, each active offer in the list of active offers selectable by the sponsor. In response to selection of an active offer, the GUI is configured to display in overlay over the second display area a draft offer message corresponding to the selected active offer, the draft offer message including an offer title, a details section, and a hyperlink to additional information regarding the offer, display an approval control selectable to indicate approval of the draft offer message, and wherein in response to selection of the approval control, the sponsor engine is configured to transmit an interactive graphic to mobile computing devices of at least a portion of the list of customers included in the contacts tab, the interactive graphic configured to communicate the offer title, the details section, and the hyperlink included in the draft offer message to the mobile computing devices for display on a screen of limited size.

In another aspect, a computer-implemented method for implementing a graphical user interface (GUI) for a sponsor portal system is described. The sponsor portal system includes a sponsor engine in communication with a database, the database storing sponsor profiles for a plurality of sponsors, each sponsor registered for services with respect to recommending vendors to users, the vendors and users stored in a contact list with respect to each sponsor, the GUI including a first display area that persistently displays a list of a plurality of tabs for different elements of the sponsor portal system and a second display area. When the GUI is executed by a computing device of a sponsor of the plurality of sponsors, the second display area is dynamically updatable. The method includes displaying, in the second display area, in response to a selection of a contacts tab in the first display area, a scrollable list of customers of the sponsor, in response to a selection of a vendors tab in the first display area, a list of vendors approved by the sponsor, and in response to a selection of a leads tab in the first display area, a list of active offers, each active offer submitted by a vendor included in the list of vendors, each active offer in the list of active offers selectable by the sponsor. In response to selection of an active offer, the GUI is configured to display in overlay over the second display area a draft offer message corresponding to the selected active offer, the draft offer message including an offer title, a details section, and a hyperlink to additional information regarding the offer, display an approval control selectable to indicate approval of the draft offer message, and wherein in response to selection of the approval control, the sponsor engine is configured to transmit an interactive graphic to mobile computing devices of at least a portion of the list of customers included in the contacts tab, the interactive graphic configured to communicate the offer title, the details section, and the hyperlink included in the draft offer message to the mobile computing device for display on a screen of limited size.

In yet another aspect, at least one non-transitory computer-readable storage media is described. The at least one non-transitory computer-readable storage media includes computer-executable instructions for implementing a graphical user interface (GUI) for a sponsor portal system, the sponsor portal system including a sponsor engine in communication with a database, the database storing sponsor profiles for a plurality of sponsors, each sponsor registered for services with respect to recommending vendors to users, the vendors and users stored in a contact list with respect to each sponsor, the GUI generated by at least one processor and comprising a first display area that persistently displays a list of a plurality of tabs for different elements of the sponsor portal system and a second display area, wherein, when the GUI is executed by a computing device of a sponsor of the plurality of sponsors, the second display area is dynamically updatable. The computer-executable instructions, when executed by the at least one processor, cause the at least one processor to display, in the second display area in response to a selection of a contacts tab in the first display area, a scrollable list of customers of the sponsor, in response to a selection of a vendors tab in the first display area, a list of vendors approved by the sponsor, and in response to a selection of a leads tab in the first display area, a list of active offers, each active offer submitted by a vendor included in the list of vendors, each active offer in the list of active offers selectable by the sponsor. In response to selection of an active offer, the GUI is configured to display in overlay over the second display area a draft offer message corresponding to the selected active offer, the draft offer message including an offer title, a details section, and a hyperlink to additional information regarding the offer, display an approval control selectable to indicate approval of the draft offer message, and wherein in response to selection of the approval control, the sponsor engine is configured to transmit an interactive graphic to mobile computing devices of at least a portion of the list of customers included in the contacts tab, the interactive graphic configured to communicate the offer title, the details section, and the hyperlink included in the draft offer message to the mobile computing device for display on a screen of limited size.

BRIEF DESCRIPTION OF THE DRAWINGS

FIG. 18 illustrates an example screenshot of an offer management page of a GUI that appears in a second display area in response to sponsor selection of an offers tab in a first display area in a sponsor portal in accordance with the present disclosure.

FIG. 19 illustrates an example screenshot of an offer details pop-up of a GUI in a sponsor portal in accordance with the present disclosure.

FIG. 20 illustrates an example screenshot of a create offers page of a GUI in a sponsor portal that appears in response to selection of a create-offers control on a page in a sponsor portal in accordance with the present disclosure.

FIG. 24 illustrates an example screenshot of a vendor account setup page of a GUI in a sponsor portal in accordance with the present disclosure.

FIG. 33 illustrates an example screenshot of an other tasks page of an SE application accessible via a control in accordance with the present disclosure.

DETAILED DESCRIPTION

Figure 1A:
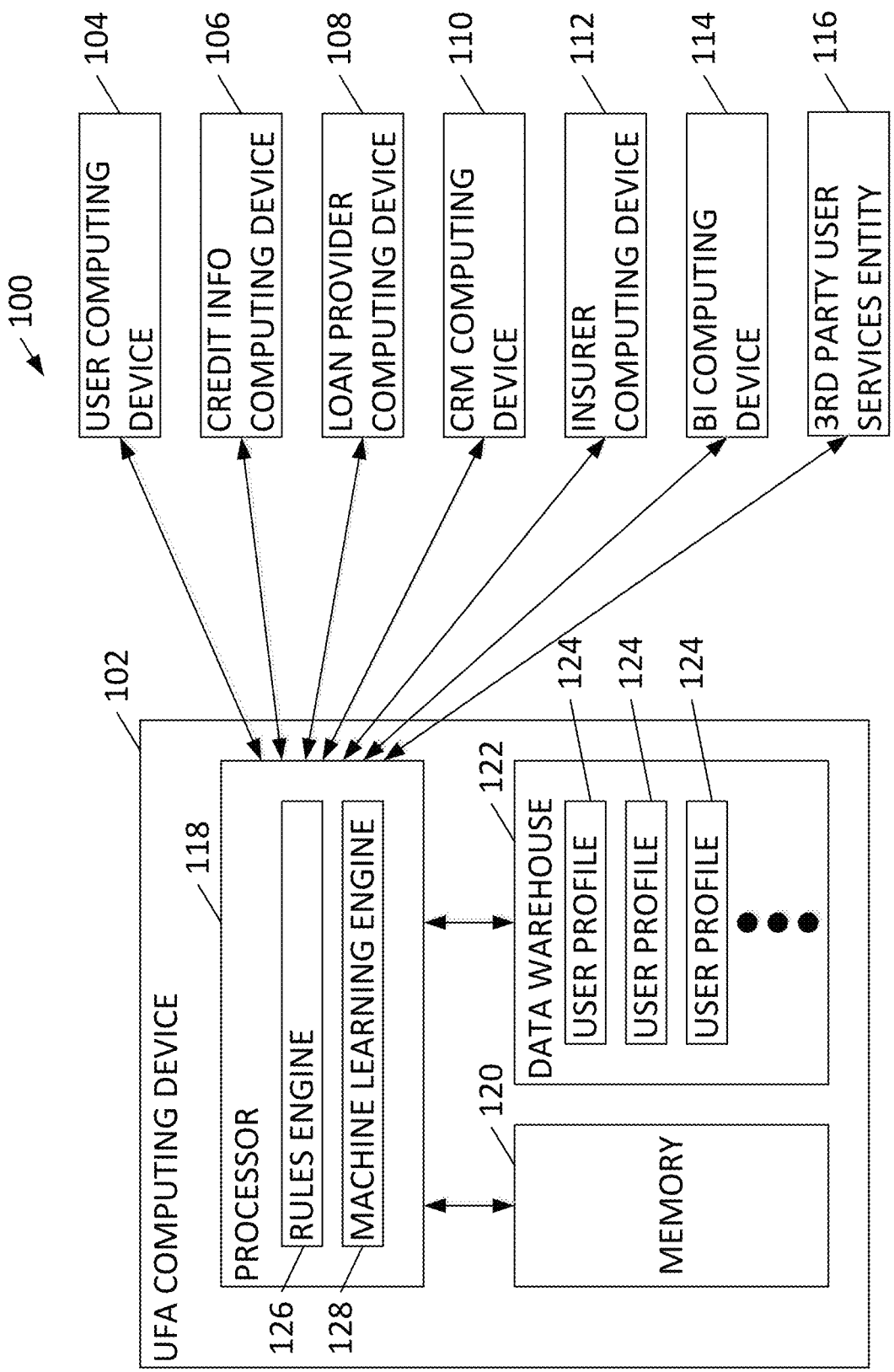
FIG. 1A is a schematic diagram illustrating an example computing system for implementing an automated personal finance agent for a user.

The following detailed description illustrates embodiments of the disclosure by way of example and not by way of limitation. The description enables one skilled in the art to make and use the disclosure, describes several embodiments, adaptations, variations, alternatives, and uses of the disclosure, including what is presently believed to be the best mode of carrying out the disclosure. Unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

The disclosure is described as applied to an example embodiment, namely, systems and methods including a sponsorship engine (SE) computing device, configured to implement a sponsor portal, and an SE application configured to execute on a user device of an end user, configured to enable interaction with services offered through the sponsor portal. The SE computing device is configured to implement a customer relationship management (CRM) platform in a sponsor portal (e.g., accessible by sponsors as described herein). The SE application is configured to provide end users with data, options, information, and guidance, mediated by the sponsor, to enable the end user to make improved decisions with respect to various aspects of their homes and properties. The SE application may be a dedicated client application installed on the user computing device, and/or may include a web browser application on the user computing device configured to access one or more web pages hosted by the SE computing system. In some embodiments, the system is configured to generate a long-term, customized homeownership journey and a financial road map for end users, designed to preserve, maintain, and grow generational wealth through real estate ownership. In certain embodiments, the platform further facilitates sponsors, who may have a trusted but limited business relationship with a set of end users, in offering a broader range of mediated services that may improve the sponsor's customer retention, customer acquisition, and recurring revenue opportunities. Examples of sponsors that may utilize the sponsorship portal include loan officers, real estate agents, insurance agents, financial planners, wealth advisors, and any other individual or business having opportunities to establish trusted relationships with end users. Examples of end users that may utilize the SE application in communication with the SE computing device include customers of any of the various types of sponsors listed above, as well as service vendors.

Based on an end user profile, the SE computing device is configured to generate a customized homeownership journey and a light financial road map. This not only assists the end user in planning home maintenance and repair items as needs are recognized by the end user, but also recommends upgrades and enhancements related to the end user's home that are automatically selected to improve the home value while maintaining the end user's cash flow at an acceptable level to meet ongoing needs and handle unexpected life events (e.g., loss of employment, sudden illness). For example, the SE computing device may be configured to automatically generate a project plan based on home inspection report data provided by the user. The project plan includes all recommended maintenance tasks along with projected end of life items that will need replacement, as well as market-based home improvements/upgrade ideas/recommendations that will enhance the home value and will have a high return on investment (ROI). The SE computing device automatically provides a task list, timeline, estimated cost, options for vendors for each task via the vendor network of the sponsor, options (e.g., a personal loan) for financing each task via the vendor network of the sponsor, and projected ROI. Some homeowners may not have sufficient knowledge to optimize home value via properly selected and timed upgrades, renovations, or maintenance. Failure to accomplish such tasks may cause long term loss, either at a later sale of the house or in an expensive repair of a subsequent severe problem. With the help of the SE computing device, such homeowners are provided with a simple and efficient program that will assist them throughout the journey.

In the example embodiment, an end user may provide home details data to the SE computing device by using the SE application to import a home inspection report/appraisal, e.g., via an application programming interface (API) call, or to manually enter the home details data. Example home details data includes property name, address, year built, property description, square footage of the home, number of rooms, number of bathrooms, garage information, yard information, pool information, central heating/air conditioning information including age of system, and renovation history.

In some embodiments, an end user may record a video and/or a 3D augmented reality video of the home and upload the content to the SE computing device. In these embodiments, the SE computing device analyzes the uploaded content to, as examples, match the end user with service providers, get a best quote for an end user, and utilize the data for generating a home appraisal. In some embodiments, the SE computing device, provides, through the SE application, a platform that allows the end user to generate a video of the home. The SE application is configured to prompt the end user through a guided tour that covers all core aspects of the house to be recorded (e.g., exterior of the house, landscape, driveway, backyard, HVAC, windows, doors, roof, fence, gate, pool, rooms, bathrooms, common areas, garage, kitchen, media room, flooring, doors, windows, appliances, celling, paint, walls, furniture etc.). Once the video is complete, the SE computing device analyzes the video to index the different parts of the video and store it in the end user profile. This stored content and, optionally, other home details data is then utilized by the SE computing device to obtain quotes from service providers. In some embodiments, the SE computing device utilizes the stored video to generate a virtual blueprint of the home. The virtual blueprint can then be utilized by the SE computing device to obtain instant quotes/offers for different services without a vendor needing to manually inspect the home.

In the example embodiment, the SE computing device generates a wealth creation journey specific to an end user based on the home details data provided. An example wealth creation journey includes a project task list, an end user timeline, an indication of effort required and approximate cost for each task, and projected ROI for each task, which are displayable via the SE application. The end user can select a task control in the SE application and, in response to customer selection of the task control, the GUI will display the task name, a detailed description of effort required to complete the task, estimated ROI of the task (e.g., as calculated by the SE computing device), and list of suggested vendors (e.g., as generated by the SE computing device based on vendors approved by the sponsor, as described herein). In some embodiments, the task list will be automatically generated by the SE computing device if the user has a loan file with the sponsor and has uploaded an inspection report. The SE computing device will import the inspection report which will provide details on all items that are considered as major upgrades and, based on the provided information, will create the project plan.

In conjunction with the plan to increase home equity value, the SE computing device in some embodiments automatically determines how much of the equity is recommended to be leveraged in acquiring new revenue-generating real estate. Revenue-generating real estate could include, as examples, rental properties, commercial properties, or undeveloped land. The SE computing device selects loan options for customers based both on loan terms and on reducing end user effort required to secure financing for the new loan. Further, the SE application provides end users with the ability to tag vendor service (e.g., allowing users to select their favorite vendors and create their own custom dashboard, with preferences stored in the end user profile by the SE computing device). The end user then has access via the SE application to a custom vendor dashboard with their favorite service vendors displayed. Accordingly, the SE system provides end users with an enhanced community network feel.

In furtherance of the enhanced community network feel a peer to peer messaging/blogging platform is provided by the SE computing device, which enables end users to post, chat, discuss, send alerts, etc. via the SE application on a message board implemented by the SE computing device. The platform includes a message board where end users can, as examples, create and post a new topic/question (including categories, such as standard, emergency, etc.), add comments/reply to an existing post (publicly or privately), list items for sale or items wanted, view a message from the sponsor (e.g., a standard post that can be commented on by customers or as a view only message), access a sponsor tab managed by the sponsor and including a list of important contact information and data, and access a business tab wherein the end user can post/promote/recommend any business. In some embodiments of the messaging platform, messages from the sponsor are displayed on the top of the message board and receive higher priority than peer to peer messages.

The SE system provides a unique and customizable platform that end users can utilize to find the best vendors, deals and offers, and financial solutions based on their personalized needs, backed by their trusted sponsor who endorses these limited vendors on a screened/exclusive basis. In addition, by connecting end customers with the sponsor in a new and expanded fashion, the SE system strengthens the relationship between the two parties by creating a customized homeownership journey and leveraging the increasing home equity value to generate additional wealth for the end user.

In the example embodiment, the SE system enables sponsors to promote customized, relevant vendors and service providers that cater to end user needs. Further, the SE system offers end users insight and knowledge regarding their journey as a homeowner, with details such as home renovation tips and quotes, refinancing, and other ways to increase the value of their properties.

In the example embodiment, a vendor rating system is provided by the SE computing device. The SE computing device minimizes the need for end users to rely on conventional ratings websites and word-of-mouth from peers that can be inaccurate and subjective. The SE system stores, and presents to end users, only approved vendors from the sponsor, who can maintain appropriate standards when adding or maintaining vendors on the list. This eliminates the guess work or risk for end users having to select a vendor based on ratings provided by unknown or inexperienced reviewers. In some embodiments, each vendor rating includes a hierarchal connection (e.g., utilizing a six degree of separation model), wherein the SE computing device identifies how the end users with profiles in the SE computing system are connected with the rating providers. In some embodiments, end users, vendors, and/or sponsors may be pre-approved by the SE computing device before they are allowed to create a profile within the SE computing system. This way the ratings are more reliable, trustworthy, accurate, and relevant. In some embodiments, the SE computing device may generate rewards (e.g., discounts) that can be redeemed for various products and services offered through SE computing device.

In the example embodiment, the SE application provides end users the ability to list out-of-network products and service providers (e.g., regional/neighborhood based) in order to help promote community/neighborhood business and service providers. Additionally or alternatively, end users can invite new members to the SE computing system. In some embodiments, end user provider listings and/or invitations must be reviewed and approved by the sponsor. In some embodiments, in response to end user selection of an invitation control on the SE application, a pop-up is displayed wherein the customer can input, for example, the name, email, and cell phone number of the person they want to invite. When the end user selects the invitation control, the SE computing system creates an account for the new end user and displays the pending invitation request in a contact management queue in the sponsor portal GUI with the status of "new invite." The sponsor then can activate the new end user account via the sponsor portal GUI. In response, the new end user is automatically contacted by the SE computing device, e.g., via text or email, and the message indicates which end user initiated the invitation and provides a link to download the SE application.

In some embodiments, end users have the option to join (and combine) multiple sponsor ecosystems. For example, an end user may accept invitations from multiple sponsors, and the SE application merges the multiple sponsor ecosystems. More specifically, each sponsor generates vendor recommendations for the end user via the sponsors' respective sponsor portals, and the SE application merges the multiple sponsor ecosystems by presenting vendors approved by each sponsor. The SE application may provide an option to filter the displays by sponsor.

In the example embodiment, the SE application allows end users to request a new service (e.g., if a service is not listed for the end user, the end user can request the sponsor to connect with a service provider for the new service). The request is then presented to the sponsor in the GUI of the sponsor portal, and the sponsor can cause the new service to be added for the end user.

In some embodiments, based on the end user profile, the SE computing device filters out financial offers for which the end user does not meet basic criteria (e.g., based on credit score, income, debt-to-income ratio, loan amount etc.) before transmitting financial offers to the SE application for display to the end user. Similarly, the SE computing device filters out vendor offers for which a distance from a vendor location to an end user location exceeds a threshold distance before transmitting vendor offers to the SE application for display.

The SE system includes a new customer relationship management tool (e.g., the sponsor portal) and complementary end user application (e.g., the SE application) that enable a sponsor to combine real estate and finance guidance, services, and products with additional vendor services that may include home remodeling, renovations, maintenance, insurance, and a wide variety of other services to end users, particularly those that own their home or another property. The SE system provides increased access to trusted services for end users while enhancing the end user relationship with the sponsor, thus improving customer retention and providing increased revenue generation opportunities for the sponsor.

For sponsors, the SE computing system offers a variety of services and benefits. Once sponsors create an account with the sponsorship engine, content and automation is handled by the SE computing system, leaving sponsors with the sole responsibility of managing customer and vendor relationships. Sponsors log into the sponsor portal to add or remove vendors, or promote special offers. Depending on end user needs specific to customers of a particular sponsor, these vendors may include home maintenance, emergency services, remodeling, and renovations, among others. In the example embodiment, the SE computing device is configured to automatically suggest offers for end users based on the needs of each end user. Sponsors may also select and promote mortgage coaches, certified financial advisors (CFAs), local and regional banks, insurance companies, and retail partners, for example. Sponsors are also able to directly contact customers through the SE computing system. The services and vendors promoted by the sponsor can be personally rated and reviewed by end users, ensuring that end users are receiving the expected quality of services and deals. All of these features will help elevate a sponsor to a trusted advisor status instead of being used solely for a single transaction.

For example, one of the biggest challenges for loan officers and other loan industry professionals is customer acquisition and retention. Loan origination is still considered a one-time transaction, and the customer retention rate is very low; therefore, the SE system assists in elevating the loan officer's relationship to that of a trusted advisor (i.e., a sponsor) by providing guidance to end users for diverse services related to home purchasing, homeownership, and light financial planning. The SE system empowers end users (the sponsor's customers) with effective and simple solutions to efficiently manage and take control of their personal finances while living their desired life.

The SE system also adds value for vendors that advertise services via the sponsor portal the SE application. The vendors receive access to a pre-existing customer base and receive a recommendation from a trusted sponsor of that customer base. In some embodiments, the SE application enables end users to select a video chat option for vendors who agree to provide this service through the SE system. More specifically, the SE application provides a do-it-yourself (DIY) control that, when selected by the end user, initiates a video chat with the vendor. The vendor may then help the end user complete a DIY task, in the equivalent of an interactive "how to" video, and form a new customer relationship without the vendor needing to travel to the end user property. The vendor benefits because the end user is much more likely to call on the vendor subsequently for larger projects, and optionally the vendor may charge a small fee for the DIY guidance.

The SE computing system adds value for end users by with an important asset the customer owns: their home. The SE computing system assists end users with preserving, maintaining, and upgrading their homes or properties while helping end users achieve each of these in a simple and effective way. Based on the end user profile, the SE computing system generates the customized homeownership journey and the light financial road map. The SE computing system assists end users with maintenance and repairs. Additionally, the SE computing system generates recommendations for upgrades and enhancements that will increase the value of the home or property.

In the long run, the SE computing system helps end users create generational wealth through home ownership. The SE computing system provides information about potential real estate investments for the end user, including information regarding how use a home's equity to identify and invest in income-generating rental properties. In some embodiments, when end users create an end user profile with the SE computing system, they are asked a series of questions that assist the SE computing system in determining services and financial offers that will benefit the end user. End users can opt to have their information prepopulated with information previously provided to their sponsor, populate it themselves, or refuse to include it; however, the more information that is entered into the SE computing system, the more customized deals and offers end users will receive. Information requested by the SE computing system includes credit scores, assets, liabilities, mortgages, education, and income. For example, the SE application walks end users through a series of prompts to calculate debt-to-income ratio, loan-to-value ratio, borrowing ability, risk score calculation, and liquidity risk. This information is used by the SE computing system to generate a consumer grade underwriting decision for various products and services including mortgage rates, refinancing rates, credit cards, auto loans, student loans, personal loans, and insurance.

In some embodiments, the SE system incorporates, or is in communication with, a user finance analytics ("UFA") system to implement an automated personal finance agent for the end user. The UFA system may provide financial recommendations for a user based on a user profile and enable the user to efficiently track the user's financial information across a variety of different types of financial products from a variety of different providers. The UFA system described herein includes at least one UFA computing device that uses a rules engine and a machine learning engine to make recommendations to a user based on a user profile. The UFA computing device may be in communication with at least one credit information computing device, at least one loan provider computing device, and the SE application on at least one user computing device.

The UFA computing device includes at least one processor communicatively coupled to a memory and a data warehouse. In the example embodiment, as some of the information stored in the data warehouse may include personally identifiable information (PII), any stored PII is encrypted to prevent unauthorized access to the PII. Moreover, in any embodiments in which PII may be collected, the user from which the PII may be collected is provided an opportunity to agree to or deny collection of such data.

In the example embodiment, the UFA computing device may accept a registration request from a user. The registration request may be sent by the SE application to the UFA computing device in order to enroll in services associated with the UFA computing device. The registration request may include registration information of the user. The registration request may be received at the UFA computing device from the user computing device.

The UFA computing device may create, in the data warehouse, a user profile associated with the user. The user profile may be combined with the end user profile of the SE system or stored separately, and may include a plurality of user data sets, such as, for example, a credit history data set, a demographics data set, an employment history data set, a skills data set, a budget data set, and a long-term goals data set. The plurality of user data sets may be populated with data obtained from third parties and/or data obtained through user responses to a series of individually tailored questions, as described below.

The UFA computing device may obtain data from a credit information entity to populate the credit history data set. The UFA computing device may accept, from a credit information computing device, an electronic signal including credit history information for the user. The UFA computing device may populate the credit history data set based on credit history information included in the electronic signal and use the credit history information to generate additional questions for the user, as described below. In some embodiments, the UFA computing device may transmit, to the credit information computing device, an electronic credit request signal including at least a portion of the registration information and accept the electronic signal described above including the credit history information in response to the transmitted credit request. In some embodiments, the credit history information may include a credit score range that encompasses a credit score of the user and at least one credit attribute of the user. The credit attribute may be, for example, (i) a trend in a number of open accounts of the user, (ii) a trend in a number of late payments on accounts of the user; (iii) a trend in a usage rate of revolving credit accounts of the user, or (iv) a trend in applications by the user for new credit accounts.

The UFA computing device may execute a rules engine and a machine learning engine. The rules engine may be configured to utilize predefined rules to generate output values based on input values. The machine learning engine may be automatically trained, such as by applying one or more machine learning algorithms to training data and/or data accumulated from a plurality of users, to make predictions or decisions relying on patterns and inference automatically drawn from the underlying data, rather than generating output values based on predefined rules. For example, the machine learning engine may automatically tune itself for improved performance by comparing actual results for one or more users against earlier predictions and recommendations made for those users.

The UFA computing device may generate one or more sets of questions to obtain data from the user. For example, the UFA computing device may generate, by the rules engine, a first sequence of questions regarding the user. The first sequence of questions may be determined based on the registration information and the credit history information. The first sequence of questions may be designed to elicit or verify standard information such as the user's age, profession, salary, educational status, home address, family or dependent information, etc. The UFA computing device may transmit the generated first sequence of questions to the user computing device, for example, via an electronic user communication channel. The electronic user communication channel may include a graphical user interface (GUI) displayable on the user computing device via the SE application. The UFA computing device may receive from the user computing device a first sequence of user responses to the first sequence of questions. The first sequence of user responses may be received via the electronic user communication channel. The UFA computing device may populate, for example, the credit history data set, the demographics data set, the employment history data set, the accounts data set, the income and assets data set, a first portion of the budget data set, and the long-term goals data set with data parsed from the registration information, the credit history information, and the received first sequence of user responses.

The UFA computing device may generate, by the machine learning engine, a second sequence of questions regarding the user based on, for example, the data parsed from the registration information, the credit history information, and the received first sequence of user responses and stored in the credit history data set, the demographics data set, the employment history data set, the accounts data set, the income and assets data set, the first portion of the budget data set, and the long-term goals data set. The UFA computing device may transmit the generated second sequence of questions to the user computing device, for example, via the electronic user communication channel. The UFA computing device may receive a second sequence of user responses to the second sequence of questions from the user computing device via the electronic user communication channel. The UFA computing device may populate, for example, the skills data set and a second portion of the budget data set with data parsed from the second sequence of user responses. In certain embodiments, at least one question of the second sequence of questions is based on the user response to an earlier question in the second sequence of questions. In some embodiments, the UFA computing device may generate further questions based on the second sequence of user responses.

The second set of questions generated by the machine learning engine enables a much more nuanced user profile to be developed, as compared to the general demographic and financial information collected and analyzed by known systems, based on patterns and inferences drawn by the machine learning engine. For example, the machine learning engine may infer that the user's gross monthly spending exceeds an expected range, and may tailor certain questions in the second sequence of questions based on patterns automatically inferred from age, profession, salary, educational status, home address, etc., to identify specific expenses that could potentially be reduced to improve the user's financial situation. The second sequence of questions may elicit from the user, for example, that the user makes a daily expenditure at a high-end coffee shop. As discussed below, the automated personal finance agent may then be able to educate the user that this daily coffee creates $150 of monthly spending that increases a credit card balance carried by the user. The automated personal finance agent may further be able to show the user how the user's credit circumstances would improve if the user switched to free coffee provided at the user's workplace, for example.

The automated personal finance agent may generate a cash inflow proposal for the user and present the cash inflow proposal via the electronic user communication channel. In some embodiments, the UFA computing device may automatically determine the cash inflow proposal for the user based on, for example, the demographics data set, the skills data set, the budget data set, and the long-term goals data set. For example, a selected type of loan product may be presented to the user as a recommendation to reduce relatively high-interest credit card debt. In such embodiments, the UFA computing device may determine the cash inflow proposal as equal to a total outstanding balance on at least one credit card account of the user and select one of a plurality of types of loan product having a lower interest rate than an interest rate of the at least one credit card. In another example, the cash inflow proposal may be presented to the user as a recommendation to establish an emergency loss-of-employment fund. In such embodiments, the UFA computing device may determine the cash inflow proposal as equal to a minimum amount of living expenses incurred by the user over a time period based on the user profile. In such embodiments, the UFA computing device may determine the time period based on, for example, the demographics data set and the skills data set. In some embodiments the second sequence of questions generated by the machine learning engine enables a more accurate estimate of the time period over which the user would be expected to remain unemployed, and thus a more accurate determination of the amount needed for the loss-of-employment fund. For example, the machine learning engine automatically detects deep patterns relating periods of unemployment to details about users' skill sets and medical histories, and infers the likely duration of a period of unemployment for the user that is far more accurate than the standard, one-size-fits-all rules for selecting the size of such an emergency fund.

Additionally or alternatively, the UFA computing device may receive a user-determined cash inflow proposal from the user computing device via the electronic user communication channel.

In some embodiments, to implement the cash flow proposal, the UFA computing device may select, by the rules engine based on the user profile, one of a plurality of types of loan products for which the user qualifies. The UFA computing device may select a type of loan product by comparing loan terms for each of the plurality of types of loan products. In some embodiments, the UFA computing device may implement, in the rules engine, respective loan-qualification guidelines provided by a plurality of offerors of the selected type of loan product. The UFA computing device may transmit a loan application based on data extracted from the user profile to a loan provider computing device of a third party offeror of the selected type of loan product and receive a loan offer from the loan provider computing device. The UFA computing device may transmit a recommendation of the selected type of loan product and the loan offer to the user computing device and accept a signal authorizing acceptance of the loan offer, for example, via the electronic user communication channel. The UFA computing device, in response to the signal authorizing acceptance of the loan offer, may transmit a signal to the loan provider computing device electronically accepting the loan offer.

In some embodiments, the automated personal finance agent may present the user with educational modules deemed relevant based on the user profile, and certain providers and/or regulators of loan products may agree to "up-qualify" the user for additional categories of loan products based on the automated personal finance agent verifying that the user successfully completed the educational module. The educational modules may be designed to fill gaps in the user's understanding of credit, and the impact of user behavior on the user's ability to obtain favorable credit terms, that are inferred by the machine learning engine based on the user profile. For example, the ability to complete the educational modules identified as relevant correlates to improved credit performance, even if not immediately reflected in a standard credit score. Moreover, the educational modules may be tailored for each user by the machine learning engine for presentation using phrasing and examples that are relevant to the user, based on the user profile. For example, the user profile further includes a financial education data set, and the UFA computing device may populate the financial education data set based on the second sequence of user responses; determine, by the machine learning engine based on the user profile, a first educational module relevant to the user; serve interactively, via the electronic user communication channel, the first educational module to the user computing device; and update the financial education data set based on responses received from the user computing device during interaction with the first educational module to verify successful completion by the user of the first educational module. In some embodiments, the UFA computing device may select a type of loan product for which the user did not qualify prior to the successful completion of the first educational module, e.g., a loan product that the user would not qualify for based on standard credit rules.

In some embodiments, the UFA computing device may monitor the credit performance of users receiving "up-qualified" loan products to ensure that successful completion of the educational modules remains sufficiently correlated with repayment performance to justify the up-qualification. As up-qualified users occasionally become delinquent on up-qualified loans, the machine learning engine may automatically detect patterns that further refine the ability of the UFA computing device to determine which users are suitable subjects for up-qualification via educational modules. In such embodiments, the UFA computing device may detect that the user is at least temporarily delinquent on the accepted loan and update the machine learning engine by including the user profile and detected delinquency in a training input for a reinforcement learning algorithm applied to the machine learning engine. Such processes may enhance the confidence of the providers and/or regulators of loan products in continuing to participate in the up-qualification program.

In some embodiments, the automated personal finance agent may assist the user in keeping track of payment due dates and scheduling loan payments. In such embodiments, the accounts data set may identify accounts on which the user periodically owes a payment, and the UFA computing may generate a calendar of payments due by the user on the accounts. In such embodiments, the automated personal finance agent may notify the user computing device via the electronic user communication channel based on the calendar within a predefined time period before each payment is due; receive, from the user computing device via the electronic user communication channel, a signal authorizing payment on one or more of the accounts; and cause payment on one or more of the accounts to be electronically transferred from at least one payment account of the user in response to the signal authorizing payment. Additionally or alternatively, the UFA computing device may accept, from the user computing device via the electronic user communication channel, an auto-pay instruction, the auto-pay instruction identifying one or more of the accounts, and cause, based on the calendar and without further input from the user, payment on the one or more accounts to be electronically transferred from at least one payment account of the user within a predefined time period before each payment is due.

In some embodiments, the automated personal finance agent may identify candidate transactions that, if executed by the user, would improve the user's credit score. An improved credit score allows the user, for example, to consolidate loans or refinance loans at a more favorable interest rate. In such embodiments, the UFA computing device may determine, based on the credit history data set, the accounts data set, and the income and assets data set, a candidate transaction associated with an improved credit score or the user; transmit, via the electronic user communication channel to the user computing device, a recommendation to execute the candidate transaction; accept, from the user computing device via the electronic user communication channel, a signal authorizing execution of the candidate transaction; and transmit a signal to a third party computing device electronically executing the candidate transaction. For example, in certain embodiments, the accounts data set may identify one or more revolving credit accounts of the user and the candidate transaction may include closing one or more of the revolving credit accounts. In another example, in certain embodiments, the accounts data set may identify one or more installment credit accounts of the user and the candidate transaction includes an early payment of an entire balance of at least one of the installment credit accounts. In such embodiments, the UFA computing device may determine the cash inflow proposal, discussed above, as an amount required for the early payment of the entire balance of the installment credit account.

In some embodiments, the UFA computing device may enable the user to identify, set, and keep track of short-term financial goals. Moreover, the UFA computing device may determine, and certain providers and/or regulators of loan products may agree, to "up-qualify" the user for additional categories of loan products based on the automated personal finance agent verifying that the user successfully achieved the short-term financial goal. For example, the ability to set and follow relevant short-term financial goals correlates to improved credit performance, even if not immediately reflected in a standard credit score. In such embodiments, the user profile may include a short-term goals data set, and the UFA computing device may populate the short-term goals data set based on the second sequence of user responses. The UFA computing device may populate the short term goals data set to include, for example, (i) a regular expenditure of the user in a non-essential expense category, and (ii) a total amount of the regular expenditure over a first analysis time period. For example, the UFA computing device may transmit, via the electronic user communication channel to the user computing device, a recommendation to reduce the regular expenditure (e.g., giving up the daily coffee purchase at the high-end coffee shop as discussed above), monitor the regular expenditure over at least a second analysis time period occurring after transmission of the recommendation, and update the short-term goals data set to include a degree of success in reduction by the user of the regular expenditure. After updating the short-term goals data set to include the degree of success satisfying a predetermined success threshold, the UFA computing device may transmit to the user computing device via the electronic user communication channel, for example, an offer for a loan product for which the user did not qualify prior to satisfying the predetermined success threshold, e.g., a loan product that the user would not qualify for based on standard credit rules.

As discussed above, in some embodiments, the UFA computing device may monitor the credit performance of users receiving "up-qualified" loan products to ensure that successful completion of the short-term financial goals remains sufficiently correlated with repayment performance to justify the up-qualification. As up-qualified users occasionally become delinquent on up-qualified loans, the machine learning engine may automatically detect patterns that further refine the ability of the UFA computing device to determine which users are suitable subjects for up-qualification via achievement of short-term financial goals. In such embodiments, the UFA computing device may detect that the user is at least temporarily delinquent on the accepted loan and update the machine learning engine by including the user profile and detected delinquency in a training input for a reinforcement learning algorithm applied to the machine learning engine. Such processes again may enhance the confidence of the providers and/or regulators of loan products in continuing to participate in the up-qualification program.

In some embodiments, the UFA computing device may provide a customer relationship management (CRM) interface. In such embodiments, the user profile further may include a CRM data set, and the UFA computing device may populate the CRM data set based on at least one of the first or second sequence of user responses and provide, via the GUI, an interface between the user computing device and a CRM computing device of a third party CRM provider identified in the CRM data set.

In some embodiments, the UFA computing device may automatically recommend and facilitate the user applying for an insurance policy. In such embodiments, the UFA computing device may automatically determine an insurance proposal for the user based on, for example, the income and assets data set; transmit an insurance application based on data extracted from the user profile to an insurer computing device; receive an insurance policy offer from the insurer computing device; and transmit, via the electronic user communication channel to user computing device, the insurance proposal and the insurance policy offer.

In some embodiments, the UFA computing device may provide a business intelligence (BI) interface to a user. In some embodiments, the user profile may include a BI data set, and the UFA computing device may populate the BI data set based on at least one of the first or second sequence of user responses; automatically transmit to a BI computing device to a third party BI provider, a query based on the BI data set; receive results of the query from the BI computing device; and transmit the results of the query to the user computing device via the electronic user communication channel.

In certain embodiments, the automated personal finance agent provides, at the user's request, the user profile, or selected user data sets of the user profile, as an electronically portable "digital briefcase" that may be used by third-party user-services entities to build their own offers to the user. Those offers may be presented through the automated personal finance agent or, alternatively, directly to the user through any suitable channel. In some such embodiments, the UFA computing device charges an access fee to the third-party user-services entity in exchange for access to the user profile built by the UFA computing device. The amount of the access fee may be based on the number and type of user data sets requested by the third-party user-services entity. Additionally or alternatively, if the offer of the third-party user-services entity is accepted by the user, the UFA computing device charges a "success" fee to the third-party user-services entity. Thus, the automated personal finance agent reduces or eliminates a need for the user to undergo a repetitive information-collection process with each third-party user-services entity from which the user may desire services. A blockchain based platform may be used for managing a "Digital Briefcase" (e.g., including user personal information/data), where the system assigns a user's personal data collection a "Key Identifier" that can be used for various applications by the user. A user can share the Key Identifier with any entity that requires the user's personal data. Sharing of the Key Identifier is a time sensitive event and a user will have the option to share only the attributes/personal data they desire. The time sensitive sharing greatly reduces data security concerns and user identity theft while eliminating a redundant data input process from the user. The "Digital Briefcase" information will automatically be updated and kept current, potentially with the help of various third party systems. The blockchain platform will also be utilized in other areas of the systems and methods described herein, including transactions, house/property profiles and/or blueprints, homeownership journey events, and any major events that require, as examples, data security, historic information, and a timestamp.

A Blockchain based platform will be used for managing the "Digital Briefcase", where the system assigns the user's personal data collection a "Key Identifier" that can be used for various applications by the user. User can share the Key Identifier with any entity that requires user's personal data. The Key Identifier share will be a time sensitive event and user will have the option to share only the attributes they desire. This greatly reduces data security and user identity theft while eliminating the redundant data input process. The "Digital Briefcase" information will automatically be updated and kept current, with the help of various third party systems. The Blockchain platform will also be utilized in other areas of FinanceNinja including transactions, House profile Blueprint, Homewonership journey events and any major events that require data security, historic information and timestamp.

The technical problems addressed by the disclosure include at least one of: (i) inefficiency of computing devices in compiling and mediating offer data from various sources to present to a user in an intuitive and understandable format; (ii) inability of computing devices to identify and obtain verified offer information from solely vendors having indicia of trustworthiness to offer to a customer; (iii) inability of computing devices to enable a sponsor to efficiently identify, select, organize, and present trusted vendor information to customers in an intuitive and understandable GUI; (iv) inability of computing devices to automatically identify and present relevant property maintenance tasks to customers in an intuitive and understandable format; (v) inability of computing devices to automatically identify vendors to assist with maintenance tasks and generate a connection between an end user device of a customer and an end user device of a vendor such that the customer may perform the maintenance task with virtual guidance from the vendor; and (vi) inability of computing devices to build a portable, detailed mobile application, based on customer-approved sponsor information and sponsor-approved vendor information, including a plurality of selectable controls, configured for display on a screen of limited size.

The technical effects achieved by the systems and methods described herein include at least one of: (i) displaying, in a second display area, in response to a selection of a contacts tab in the first display area, a scrollable list of customers of the sponsor; (ii) displaying, in a second display area, in response to a selection of a vendors tab in the first display area, a list of vendors approved by the sponsor; (iii) displaying, in a second display area, in response to a selection of a leads tab in the first display area, a list of active offers, each active offer submitted by a vendor included in the list of vendors, each active offer in the list of active offers selectable by the sponsor, wherein in response to selection of an active offer; (iv) displaying in overlay over a second display area a draft offer message corresponding to a selected active offer, the draft offer message including an offer title, a details section, and a hyperlink to additional information regarding the offer; (v) displaying an approval control selectable to indicate approval of the draft offer message; and (vi) transmitting an interactive graphic to mobile computing devices of at least a portion of a list of customers included in a contacts tab, the interactive graphic configured to communicate the offer title, the details section, and the hyperlink included in a draft offer message to the mobile computing device for display on a screen of limited size.

The resulting technical benefits achieved by the systems and methods of the disclosure include at least one of: (i) efficiency in compiling offer data from various sources to present to a user in an intuitive and understandable format; (ii) ability of computing devices to identify and obtain verified offer information from vendors having indicia of trustworthiness to offer to a customer; (iii) ability of computing devices to enable a sponsor to efficiently identify, select, organize, and present trusted vendor information to customers in an intuitive and understandable GUI; (iv) ability of computing devices to automatically identify and present relevant property maintenance tasks to customers in an intuitive and understandable format; (v) ability of computing devices to automatically identify vendors to assist with maintenance tasks and generate a connection between an end user device of a customer and an end user device of a vendor such that the customer may perform the maintenance task with virtual guidance from the vendor; and (vi) ability of computing devices to build a portable, detailed mobile application, based on customer-approved sponsor information and sponsor-approved vendor information, including a plurality of selectable controls, configured for display on a screen of limited size.

In one embodiment, a computer program is provided, and the program is embodied on a computer readable medium. In an example embodiment, the system is executed on a single computing system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer readable medium and utilizes a Structured Query Language (SQL) with a client user interface front-end for administration and a web interface for standard user input and reports. In another embodiment, the system is web enabled and is run on a business-entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computing system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.).

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

Figure 2:
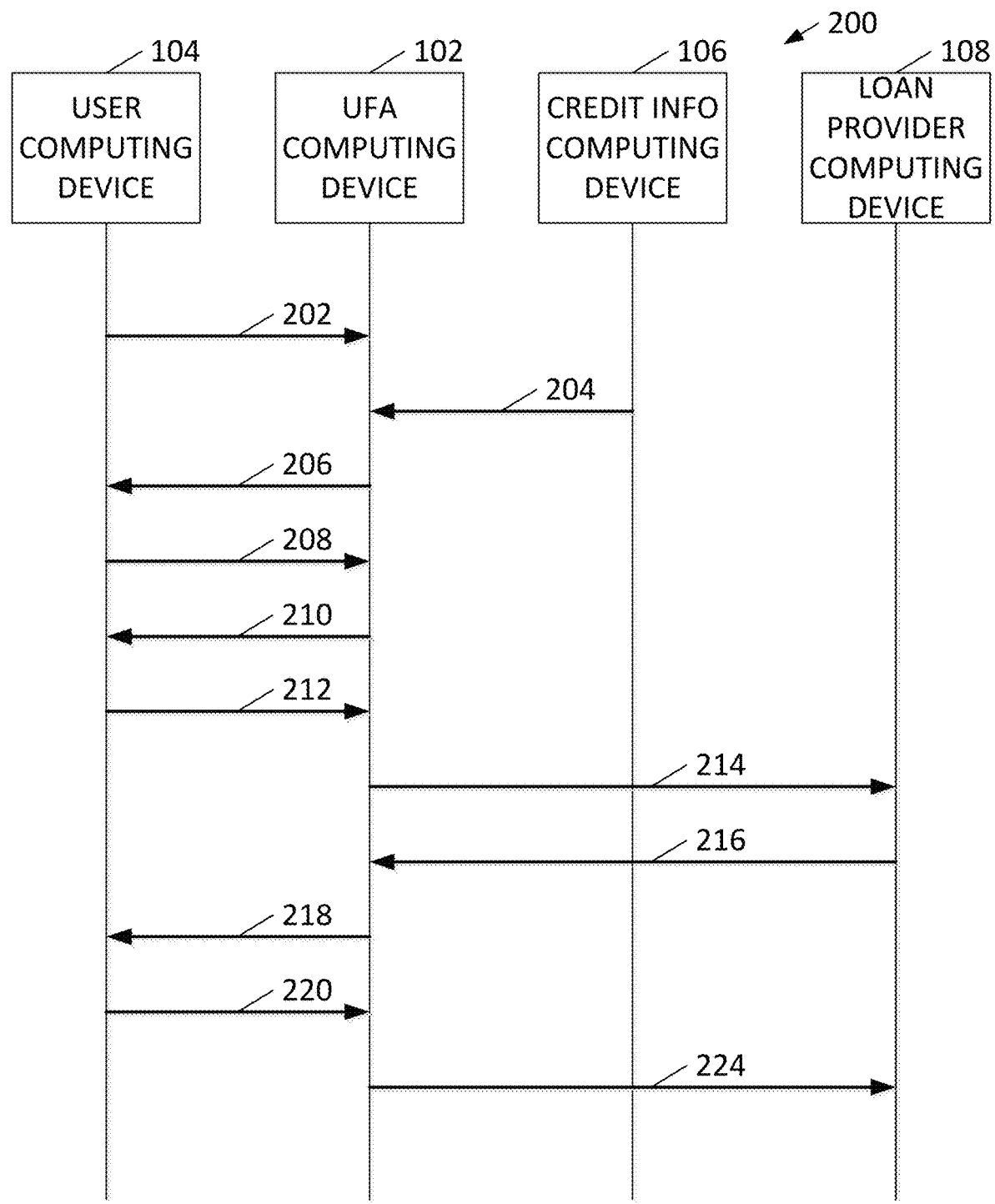
FIG. 2 is a data flow diagram illustrating an example data flow among elements of the system shown in FIG. 1A.

FIG. 1A is a schematic diagram illustrating an example system 100 for implementing an automated personal finance agent for a user. FIG. 2 is a data flow diagram illustrating an example data flow 200 among elements of the system shown in FIG. 1A.

In the example embodiments, system 100 includes a UFA computing device 102 that may be in communication with one or more of a user computing device 104, a credit information computing device 106, a loan provider computing device 108, a customer relationship management computing device 110, an insurer computing device 112, a BI computing device 114, and/or a third-party user-services entity computing device 116. UFA computing device 102 may include a processor 118 in communication with a memory 120 and a data warehouse 122.

UFA computing device 102 may accept a registration request 202 from a user. Registration request 202 may be sent by the user to the UFA computing device 102 in order to enroll in services associated with UFA computing device 102. Registration request 202 may include registration information of the user. Registration request 202 may be received at UFA computing device 102 from user computing device 104.

UFA computing device 102 may create, in the data warehouse 122, a user profile 124 associated with the user. User profile 124 may include a plurality of user data sets, such as, for example, a credit history data set, a demographics data set, an employment history data set, a skills data set, a budget data set, and a long-term goals data set. The plurality of user data sets may be populated with data obtained from third parties and/or data obtained through user responses to computer-generated sequences of questions, as described below.

UFA computing device 102 may obtain data from a credit information entity to populate the credit history data set. UFA computing device 102 may accept, from credit information computing device 106, an electronic signal 204 including credit history information for the user. UFA computing device 102 may populate the credit history data set based on credit history information included in electronic signal 204 and use the credit history information to generate questions, as described below. In some embodiments, UFA computing device 102 may transmit, to credit information computing device 106, an electronic credit request signal including at least a portion of the registration information and accept electronic signal 204 described above including the credit history information in response to the transmitted credit request. In some embodiments, the credit history information may include a credit score range that encompasses a credit score of the user and at least one credit attribute of the user. The credit attribute may be, for example, (i) a trend in a number of open accounts of the user, (ii) a trend in a number of late payments on accounts of the user; (iii) a trend in a usage rate of revolving credit accounts of the user, or (iv) a trend in applications by the user for new credit accounts.

UFA computing device 102 may execute a rules engine 126 and a machine learning engine 128. Rules engine 126 may be configured to utilize predefined rules to generate output values based on input values. Machine learning engine 128 may be automatically trained, such as by applying one or more machine learning algorithms to training data and/or data accumulated from a plurality of users, to make predictions or decisions relying on patterns and inference automatically drawn from the underlying data, rather than generating output values based on predefined rules.

UFA computing device 102 may generate one or more sets of questions to obtain data from the user. For example UFA computing device 102 may generate, by rules engine 126, a first sequence of questions 206 regarding the user. First sequence of questions 206 may be determined based on the registration information and the credit history information. UFA computing device 102 may transmit the generated first sequence of questions 206 to user computing device 104, for example, via an electronic user communication channel. The electronic user communication channel may include a graphical user interface (GUI) displayable on the user computing device. The GUI may be generated by, for example, (i) a user application installed on user computing device 104 and/or (ii) one or more web pages hosted by UFA computing device 102 and accessible by the user computing device 104. UFA computing device 102 may receive a first sequence of user responses 208 to first sequence of questions 206 from user computing device 104. First sequence of user responses 208 may be received via the electronic user communication channel. UFA computing device 102 may populate, for example, the credit history data set, the demographics data set, the employment history data set, the accounts data set, the income and assets data set, a first portion of the budget data set, and the long-term goals data set with data parsed from the registration information, the credit history information, and the received first sequence of user responses 208.

UFA computing device 102 may generate, by machine learning engine 128, a second sequence of questions 210 regarding the user based on, for example, the data parsed from the registration information, the credit history information, and the received first sequence of user responses and stored in the credit history data set, the demographics data set, the employment history data set, the accounts data set, the income and assets data set, the first portion of the budget data set, and the long-term goals data set. UFA computing device 102 may transmit the generated second sequence of questions 210 to the user computing device 104, for example, via the electronic user communication channel. UFA computing device 102 may receive a second sequence of user responses 212 to second sequence of questions 210 from the user computing device 104 via the electronic user communication channel. UFA computing device 102 may populate, for example, the skills data set and a second portion of the budget data set with data parsed from second sequence of user responses 212. In certain embodiments, at least one question of the second sequence of questions 210 is based on the user response 212 to an earlier question in the second sequence of questions 210. In some embodiments, UFA computing device 102 may generate further questions based on the second sequence of user responses 212.

The automated personal finance agent may generate a cash inflow proposal for the user and present the cash inflow proposal via the electronic user communication channel. In some embodiments, UFA computing device 102 automatically determines the cash inflow proposal for the user based on, for example, the demographics data set, the skills data set, the budget data set, and the long-term goals data set. For example, a selected type of loan product may be presented to the user as a recommendation to reduce relatively high-interest credit card debt. UFA computing device 102 determines the cash inflow proposal as equal to a total outstanding balance on at least one credit card account of the user and selects one of a plurality of types of loan product having a lower interest rate than an interest rate of the at least one credit card. In another example, the cash inflow proposal may be presented to the user as a recommendation to establish an emergency loss-of-employment fund. UFA computing device 102 determines the cash inflow proposal as equal to a minimum amount of living expenses incurred by the user over a time period based on the user profile. UFA computing device 102 may determine the time period based on, for example, the demographics data set and the skills data set. Additionally or alternatively, UFA computing device 102 may receive a user-determined cash inflow proposal from the user computing device via the electronic user communication channel.

To implement the cash flow proposal, UFA computing device 102 may select, by rules engine 126 based on user profile 124, one of a plurality of types of loan products for which the user qualifies. UFA computing device 102 may select a type of loan product by comparing loan terms for each of the plurality of types of loan products. In some embodiments, UFA computing device 102 may implement, in rules engine 126, respective loan-qualification guidelines provided by a plurality of offerors of the selected type of loan product. UFA computing device 102 may transmit a loan application 214 based on data extracted from user profile 124 to loan provider computing device 108 of a third party offeror of the selected type of loan product and receive a loan offer 216 from loan provider computing device 108. UFA computing device 102 may transmit a recommendation 218 of the selected type of loan product and loan offer 216 to the user computing device 104 and accept a signal 220 authorizing acceptance of loan offer 216, for example, via the electronic user communication channel. UFA computing device 102, in response to the signal 220 authorizing acceptance of loan offer 216, may transmit a signal 224 to the loan provider computing device 108 electronically accepting loan offer 216.

In some embodiments, the automated personal finance agent implemented by UFA computing device 102 presents the user with an interactive educational module 226 deemed relevant based on user profile 124, and certain providers and/or regulators of loan products may agree to "up-qualify" the user for additional categories of loan products based on the automated personal finance agent verifying that the user successfully completed educational module 226. Educational module 226 may be one of a plurality of educational modules 226 designed to fill gaps in understanding of credit, and the impact of user behavior on the user's ability to obtain favorable credit terms. Educational module 226 further may be tailored for the particular user by machine learning engine 128, based on user profile 124, for presentation using phrasing and examples that are relevant to the user. In the example embodiment, the one or more educational modules 226 that are relevant to the particular user are inferred by machine learning engine 128 based on user profile 124. In some embodiments, the user's ability to complete one or more interactive educational modules 226 identified as relevant correlates to improved credit performance of the user, even if this improved performance is not immediately reflected in a standard credit score.

For example, user profile 124 further includes a financial education data set, and UFA computing device 102 may populate the financial education data set based on second sequence of user responses 212; determine, by machine learning engine 128 based on user profile 124, a first educational module 226 relevant to the user; serve interactively, via the electronic user communication channel, the first educational module to user computing device 104; and update the financial education data set based on responses received from user computing device 104 during interaction with first educational module 226 to verify successful completion by the user of first educational module 226. In some embodiments, UFA computing device 102 may transmit a loan application 228 to loan provider computing device 108 for, and loan provider computing device 108 may provide, a type of loan product for which the user did not qualify prior to the successful completion of first educational module 226, e.g., a loan product that the user would not qualify for based on standard credit rules.

In some embodiments, UFA computing device 102 may monitor the credit performance of users receiving "up-qualified" loan products 228 to ensure that successful completion of educational module 226 remains sufficiently correlated with repayment performance to justify the up-qualification. As up-qualified users occasionally become delinquent on up-qualified loans 228, machine learning engine 128 may automatically detect patterns that further refine the ability of UFA computing device 102 to determine which users are suitable subjects for up-qualification via educational modules 226. In such embodiments, UFA computing device 102 may detect that the user is at least temporarily delinquent on the accepted loan 228 and update machine learning engine 128 by including the user profile 124 and detected delinquency in a training input for a reinforcement learning algorithm applied to machine learning engine 128. Such processes may enhance the confidence of the providers and/or regulators of loan products in continuing to participate in the up-qualification program.

In some embodiments, UFA computing device 102 may assist the user in keeping track of payment due dates and scheduling loan payments. In such embodiments, the accounts data set may identify accounts on which the user periodically owes a payment, and UFA computing device 102 may generate a calendar of payments due by the user on the accounts. In such embodiments, UFA computing device 102 may transmit a notification 230 to user computing device 104 via the electronic user communication channel based on the calendar within a predefined time period before each payment is due; receive, from user computing device 104 via the electronic user communication channel, a signal 232 authorizing payment on one or more of the accounts; and cause payment on one or more of the accounts to be electronically transferred from at least one payment account of the user in response to signal 232 authorizing payment. Additionally or alternatively, UFA computing device 102 may accept, from user computing device 104 via the electronic user communication channel, an auto-pay instruction 234 identifying one or more of the accounts, and cause, based on the calendar and without further input from the user, payment on the one or more accounts to be electronically transferred from at least one payment account of the user within a predefined time period before each payment is due.

In some embodiments, UFA computing device 102 may identify candidate loan transactions that, if executed by the user, would improve the user's credit score. In such embodiments, UFA computing device 102 may determine, based for example on the credit history data set, the accounts data set, and the income and assets data set, a candidate transaction associated with an improved credit score or the user; transmit, via the electronic user communication channel to user computing device 104, a recommendation 236 to execute the candidate transaction; accept, from user computing device 104 via the electronic user communication channel, a signal 238 authorizing execution of the candidate transaction; and transmit a signal to a third party computing device electronically executing the candidate transaction. For example, in certain embodiments, the accounts data set may identify one or more revolving credit accounts of the user and the transaction may include closing one or more of the revolving credit accounts. In another example, in certain embodiments, the accounts data set may identify one or more installment credit accounts of the user and the transaction includes an early payment of an entire balance of at least one of the installment credit accounts. In such embodiments, UFA computing device 102 may determine the cash inflow proposal as an amount required for the early payment of the entire balance of the installment credit account.

In some embodiments, UFA computing device 102 may enable the user to identify, set, and keep track of short-term financial goals. Moreover, UFA computing device 102 may determine, and certain providers and/or regulators of loan products may agree, to "up-qualify" the user for additional categories of loan products based on the automated personal finance agent verifying that the user successfully achieved the short-term financial goal. For example, the ability to set and follow relevant short-term financial goals correlates to improved credit performance, even if not immediately reflected in a standard credit score. In such embodiments, user profile 124 may include a short-term goals data set, and UFA computing device 102 may populate the short-term goals data set based on the second sequence of user responses 212. UFA computing device 102 may populate the short term goals data set to include, for example, (i) a regular expenditure of the user in a non-essential expense category, and (ii) a total amount of the regular expenditure over a first analysis time period. For example, UFA computing device 102 may transmit, via the electronic user communication channel to the user computing device, a recommendation 240 to reduce the regular expenditure (e.g., giving up the daily coffee purchase at the high-end coffee shop as discussed above), monitor 242 the regular expenditure over at least a second analysis time period occurring after transmission of the recommendation, and update the short-term goals data set to include a degree of success in reduction by the user of the regular expenditure. After updating the short-term goals data set to include the degree of success satisfying a predetermined success threshold, UFA computing device 102 may transmit a loan application 244 to loan provider computing device 108 for, and loan provider computing device 108 may provide, the type of loan product for which the user did not qualify prior to the successful completion of the short-term financial goal, e.g., a loan product that the user would not qualify for based on standard credit rules.

As discussed above, in some embodiments, UFA computing device 102 may monitor the credit performance of users receiving "up-qualified" loan products 244 to ensure that successful completion of the short-term financial goals remains sufficiently correlated with repayment performance to justify the up-qualification. As up-qualified users occasionally become delinquent on up-qualified loans 244, machine learning engine 128 may automatically detect patterns that further refine the ability of UFA computing device 102 to determine which users are suitable subjects for up-qualification via achievement of short-term financial goals. In such embodiments, UFA computing device 102 may detect that the user is at least temporarily delinquent on the accepted loan 244 and update machine learning engine 128 by including user profile 124 and detected delinquency in a training input for a reinforcement learning algorithm applied to machine learning engine 128. Such processes again may enhance the confidence of the providers and/or regulators of loan products in continuing to participate in the up-qualification program.

In some embodiments, UFA computing device 102 may provide a customer relationship management (CRM) interface. In such embodiments, user profile 124 further may include a CRM data set, and UFA computing device 102 may populate the CRM data set based on at least one of first sequence of user responses 208 or second sequence of user responses 212 and provide, via the GUI, an interface between user computing device 104 and a CRM computing device 110 of a third party CRM provider identified in the CRM data set.

In some embodiments, UFA computing device 102 may automatically recommend and facilitate the user applying for an insurance policy. In such embodiments, UFA computing device 102 may automatically determine an insurance proposal for the user based on, for example, the income and assets data set, transmit an insurance application based on data extracted from user profile 124 to an insurer computing device 112, receive an insurance policy offer from insurer computing device 112, and transmit, via the electronic user communication channel to user computing device 104, the insurance proposal and the insurance policy offer.

In some embodiments, UFA computing device 102 may provide a business intelligence (BI) interface to a user. In some embodiments, user profile 124 may include a BI data set, and UFA computing device 102 may populate the BI data set based on at least one of first sequence of user responses 208 or second sequence of user responses 212, automatically transmit to a BI computing device 114 to a third party BI provider, a query based on the BI data set, receive results of the query from BI computing device 114, and transmit the results of the query to user computing device 104 via the electronic user communication channel.

In certain embodiments, the automated personal finance agent provides, at the user's request, user profile 124, or selected user data sets of user profile 124, as an electronically portable "digital briefcase" that may be used by third-party user-services entity computing device 116 to build its own offer to the user. Those offers may be presented through the automated personal finance agent implemented by UFA computing device 102 or, alternatively, directly to the user through any suitable channel. In some such embodiments, UFA computing device 102 charges an access fee to third-party user-services entity computing device 116 in exchange for access to the user profile built by UFA computing device 102. The amount of the access fee may be based on the number and type of user data sets requested by third-party user-services entity computing device 116. Additionally or alternatively, if the offer of the third-party user-services entity computing device 116 is accepted by the user, UFA computing device 102 charges a "success" fee to third-party user-services entity computing device 116. Thus, the automated personal finance agent reduces or eliminates a need for the user to undergo a repetitive information-collection process with each third-party user-services entity from which the user may desire services.

Figure 4:
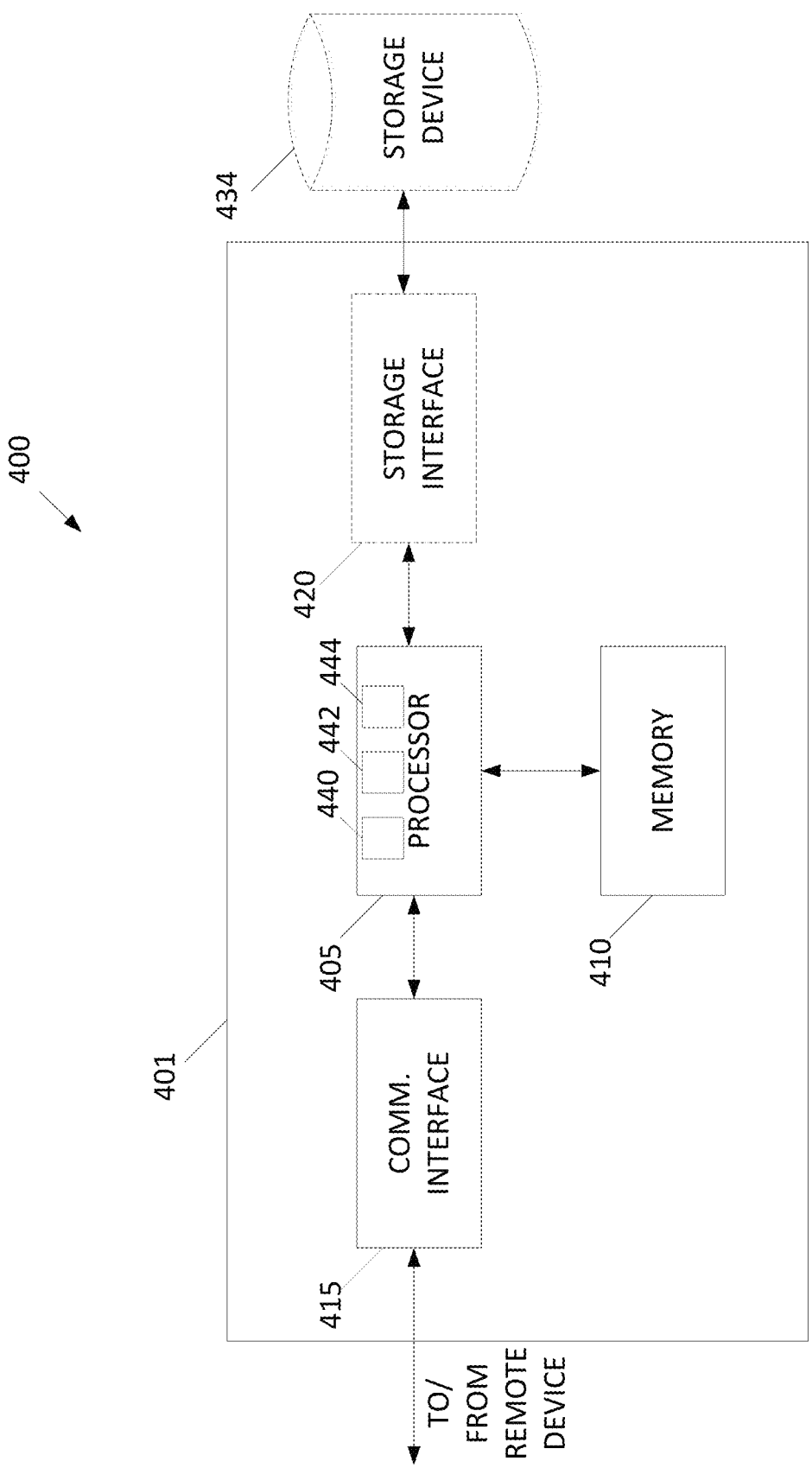
FIG. 4 illustrates an example configuration of a server system that may be used in the system shown in FIG. 1A, in accordance with an embodiment of the present disclosure.

FIG. 4 illustrates an example configuration of a server system 400. In the example embodiment, server system 400 includes at least one server computing device 401, in electronic communication with at least one storage device 434. Server computing device 401 may be used to implement UFA computing device 102 (shown in FIG. 1A). In the example embodiment, server computing device 401 includes a processor 405 for executing instructions (not shown) stored in a memory area 410. In an embodiment, processor 405 may include one or more processing units (e.g., in a multi-core configuration) for executing instructions. For example, the processor 405 may be programmed with instructions such that it may execute the processes as illustrated in FIGS. 6-15, below. The instructions may be executed within various different operating systems on the server system 400, such as UNIX®, LINUX® (LINUX is a registered trademark of Linus Torvalds), Microsoft Windows®, etc. More specifically, the instructions may cause various data manipulations on data stored in a storage device 434 (e.g., create, read, update, and delete procedures. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

In the example embodiment, processor 405 may include one or more modules for implementing the disclosed systems and methods. Processor 405 may include a data management module 440 configured, for example, to create user profile 124 in data warehouse 122 including a plurality of user data sets and populate the plurality of user data sets. Processor 405 may further include a communication module 442 configured, for example, to accept registration request 202 from a user, accept electronic signal 204 including credit history information of the user, transmit first sequence of questions 206, receive first sequence of user responses 208, transmit second sequence of questions 210 to the user, receive second sequence of user responses 212 from the user, transmit loan application 214 to a loan provider, receive loan offer 216 from the loan provider, transmit recommendation 218 of the type of loan product to the user, accept signal 220 authorizing acceptance of the loan offer, and transmit signal 224 to the loan provider electronically accepting loan offer 216. In some embodiments, communication module 442 may be further configured, for example, to present the user with educational module 226, transmit loan application 228 to a loan provider, transmit notification 230 to a user, receive signal 232 authorizing payment on one or more accounts, transmit recommendation 236 to execute a candidate transaction, accept signal 238 authorizing execution of the candidate transaction, transmit recommendation 240 to reduce a regular expenditure, monitor 242 the regular expenditure, and/or transmit a loan application 244 to a loan provider. Processor 405 may further include a decision making module 444 configured, for example, to execute rules engine 126 and machine learning engine 128, generate first sequence of questions 206 and second sequence of questions 210, and select one of a plurality of types of loan products for which the user qualifies.

Figure 3:
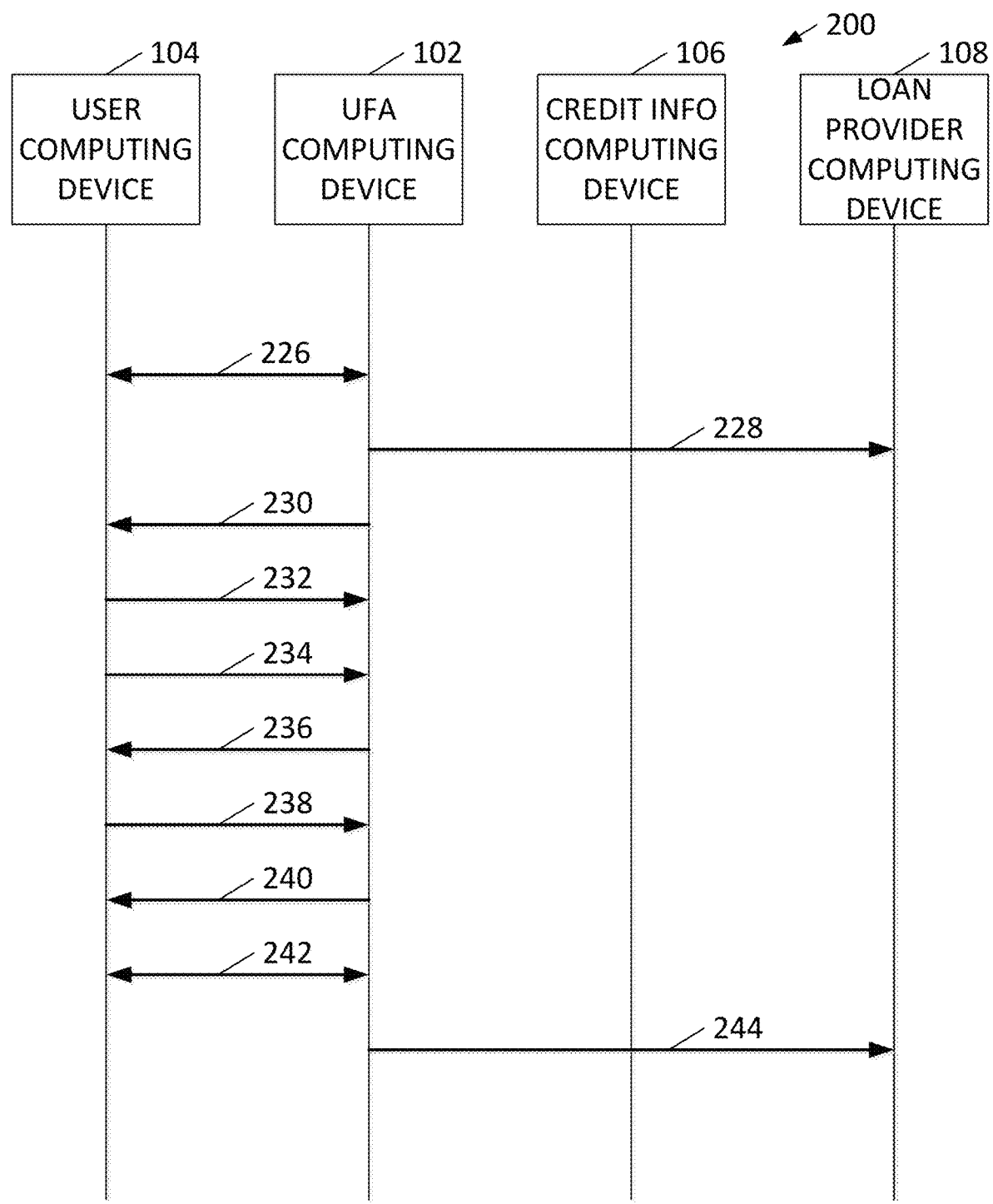
FIG. 3 is a continuation of the data flow diagram of FIG. 2.

In the example embodiment, processor 405 is operatively coupled to a communication interface 415 such that server system 400 is capable of communicating with a remote device such as a user system (e.g., user computing device 104 shown in FIG. 1A) or another server system 400. For example, communication interface 415 may receive requests from client system 300 (FIG. 3) via the Internet, within the scope of the embodiment illustrated in FIG. 1A.

In the example embodiment, processor 405 is also operatively coupled to storage device 434, which may be, for example, any computer-operated hardware unit suitable for storing and/or retrieving data. In some embodiments, storage device 434 is integrated in server system 400. For example, server system 300 may include one or more hard disk drives as storage device 434. In certain embodiments, storage device 434 is similar to data warehouse 122 (shown in FIG. 1A). In other embodiments, storage device 434 is external to server system 400 and may be accessed by a plurality of server systems 400. For example, storage device 434 may include multiple storage units such as hard disks or solid state disks in a redundant array of inexpensive disks (RAID) configuration. Storage device 434 may include a storage area network (SAN) and/or a network attached storage (NAS) system.

In some embodiments, processor 405 is operatively coupled to storage device 434 via a storage interface 420. Storage interface 420 may include, for example, a component capable of providing processor 405 with access to storage device 434. In an example embodiment, storage interface 420 further includes one or more of an Advanced Technology Attachment (ATA) adapter, a Serial ATA (SATA) adapter, a Small Computer System Interface (SCSI) adapter, a RAID controller, a SAN adapter, a network adapter, and/or any similarly capable component providing processor 405 with access to storage device 434.

Memory area 410 may include, but is not limited to, random-access memory (RAM) such as dynamic RAM (DRAM) or static RAM (SRAM), read-only memory (ROM), erasable programmable read-only memory (EPROM), electrically erasable programmable read-only memory (EEPROM), non-volatile RAM (NVRAM), and magneto-resistive random-access memory (MRAM). The above memory types are for example only, and are thus not limiting as to the types of memory usable for storage of a computer program. In certain embodiments, memory area 410 is similar to memory 120 (shown in FIG. 1A).

Figure 5:
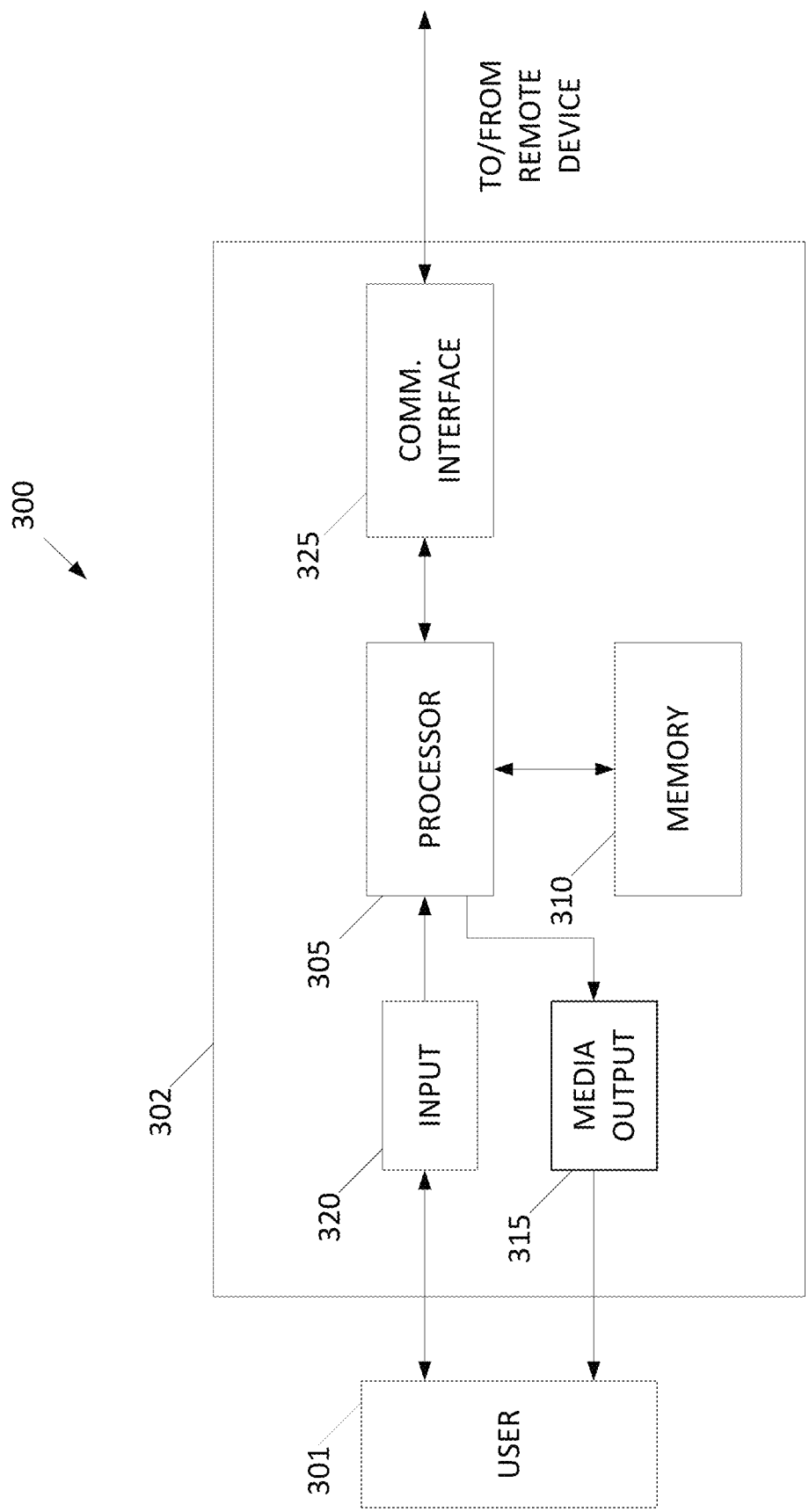
FIG. 5 illustrates an example configuration of a client system that may be used in the system shown in FIG. 1A, in accordance with an embodiment of the present disclosure.
Figure 6:
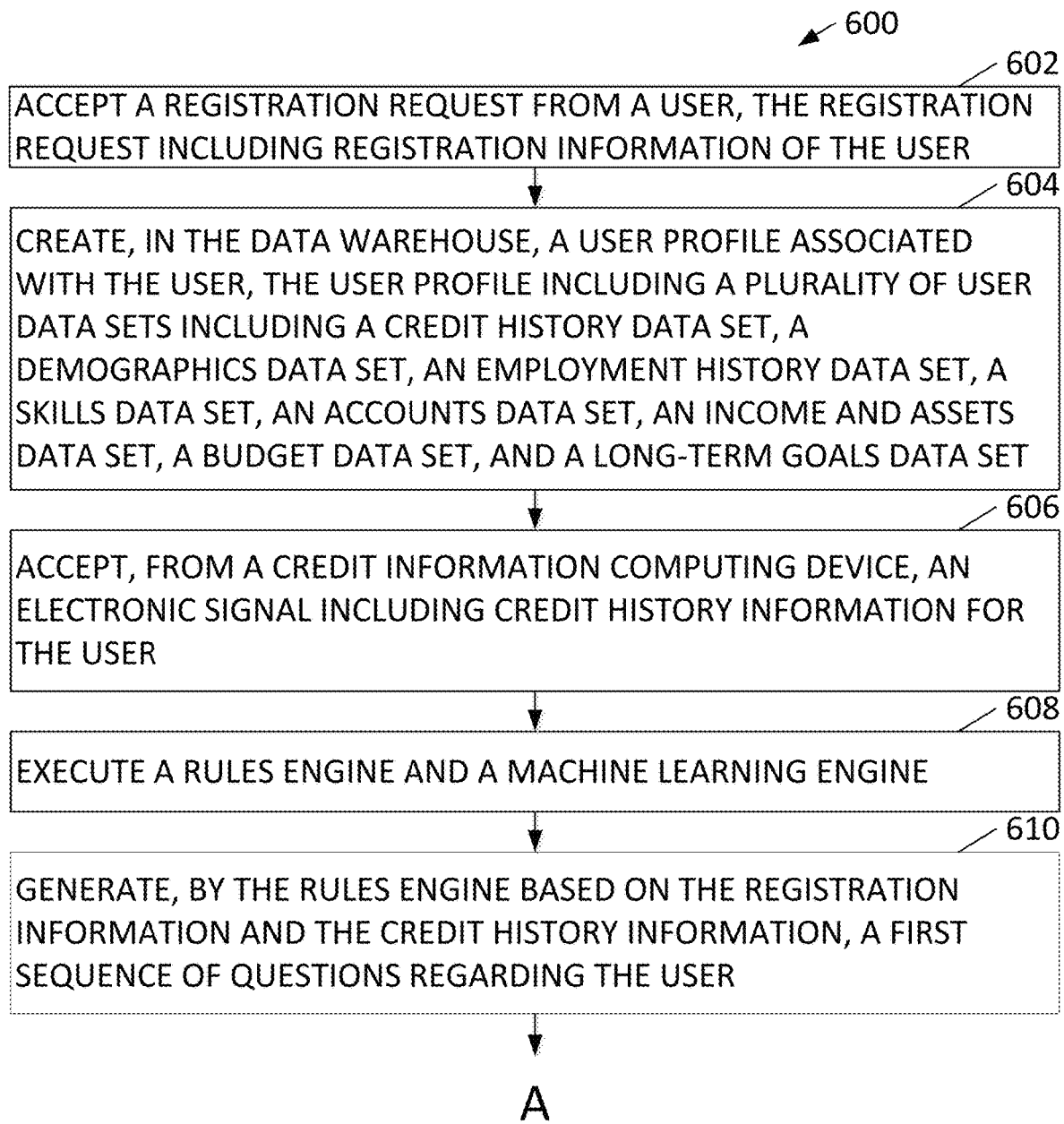
FIG. 6 is a flowchart illustrating an example method of implementing an automated personal finance agent for a user.
Figure 7:
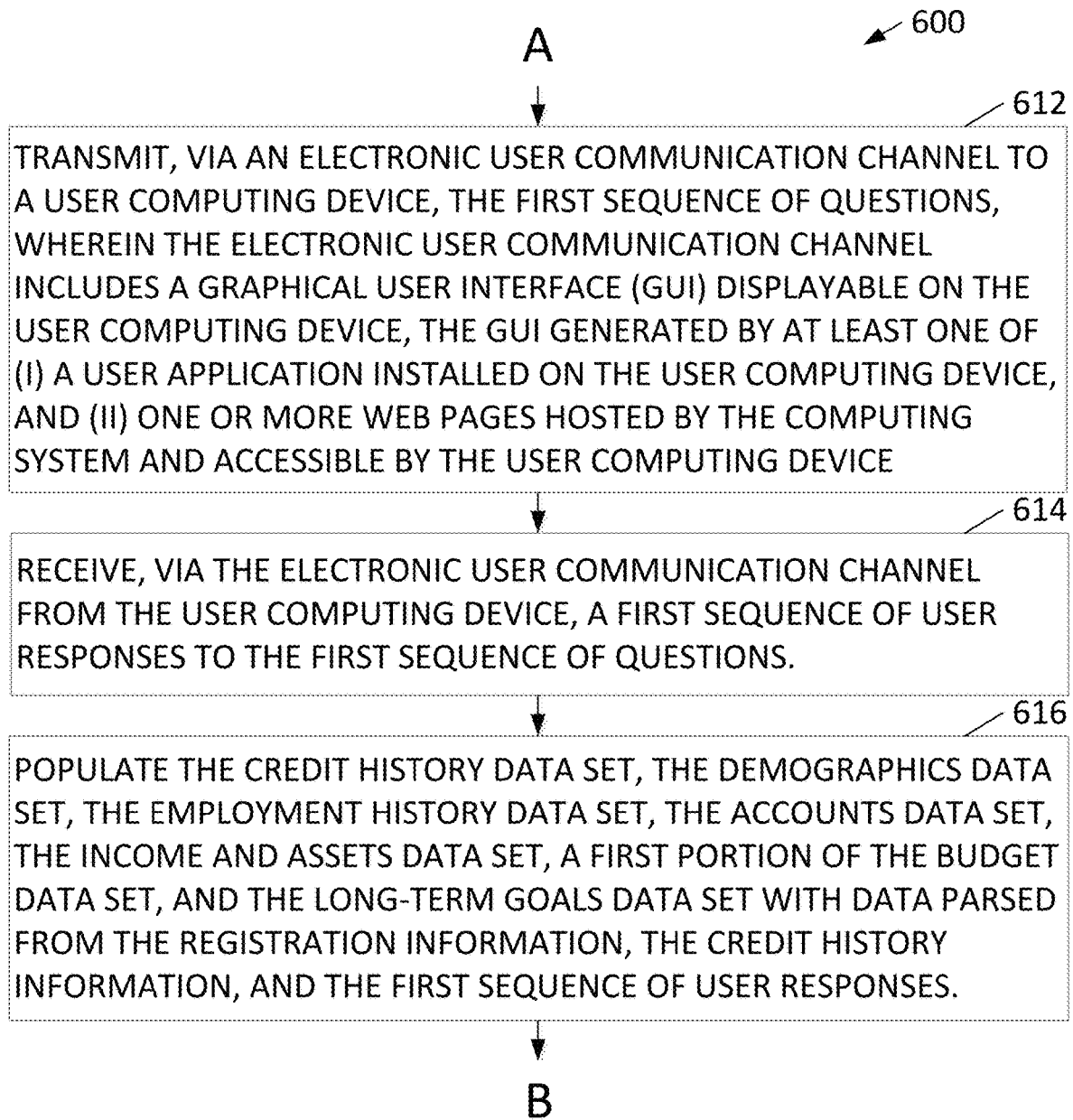
FIG. 7 is a continuation of the flowchart shown in FIG. 6.
Figure 8:
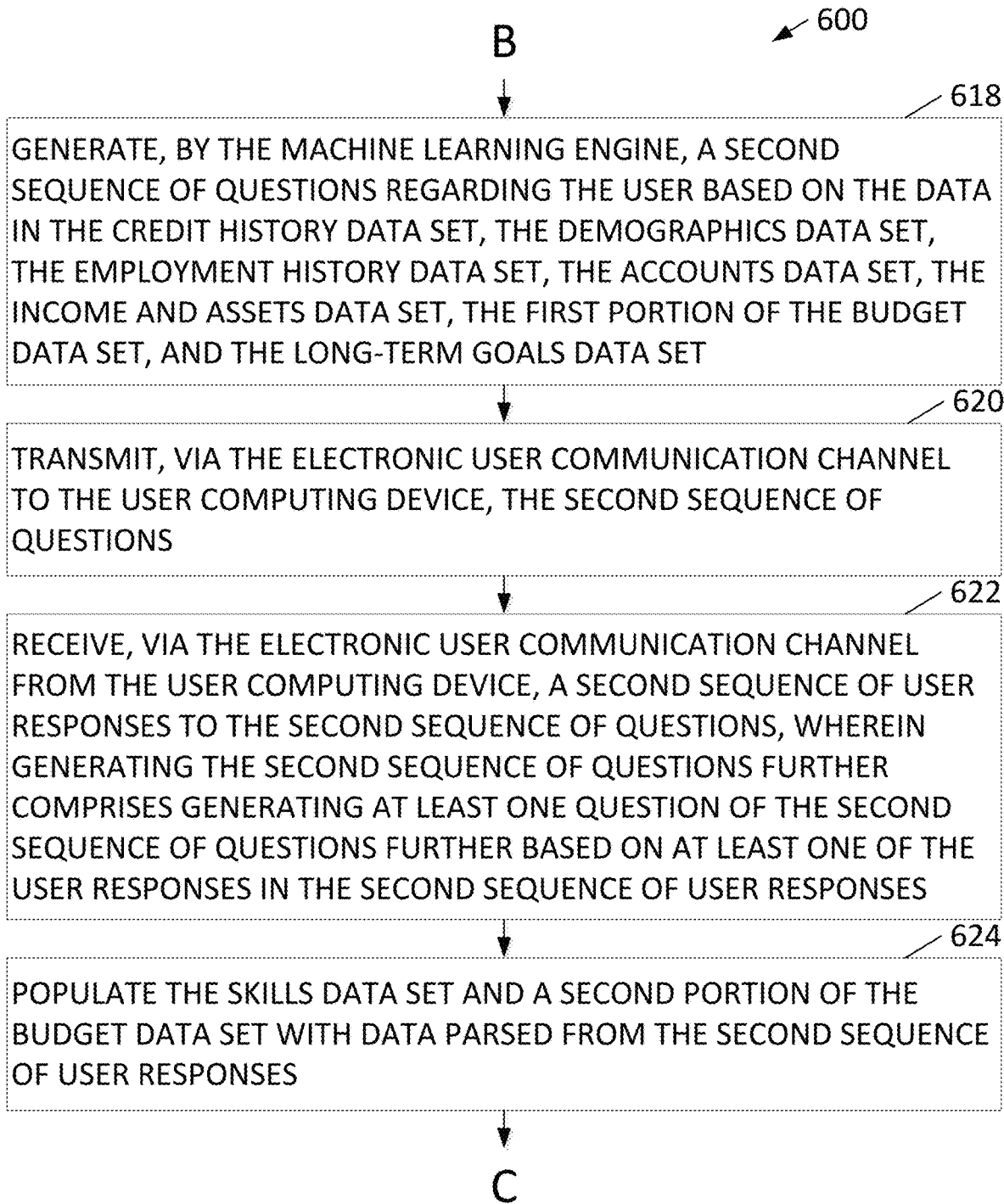
FIG. 8 is a continuation of the flowchart shown in FIG. 7.
Figure 9:
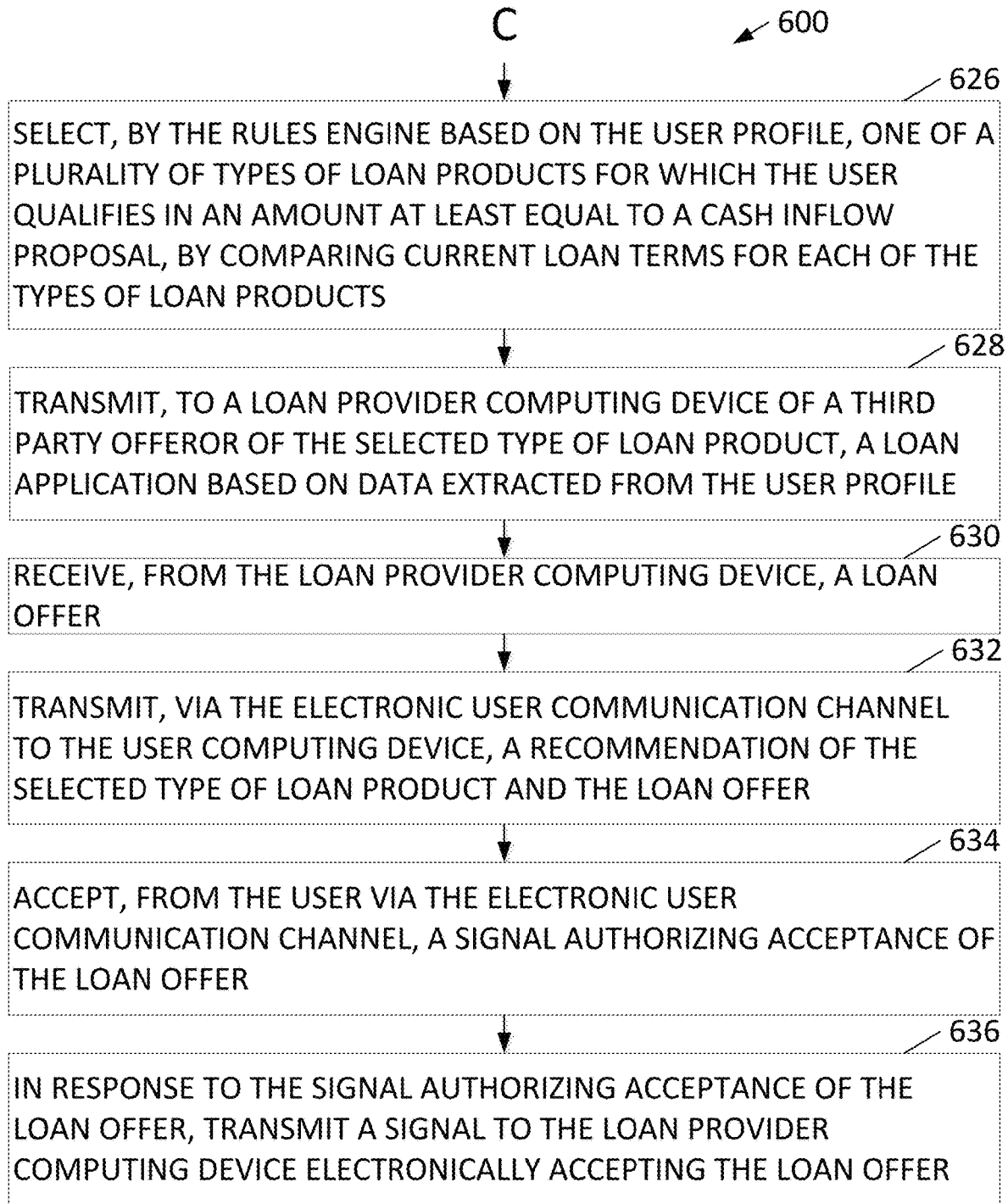
FIG. 9 is a continuation of the flowchart shown in FIG. 8.

FIG. 5 illustrates an example configuration of a client system 300 in accordance with one embodiment of the present disclosure. In the example embodiment, client system 300 includes at least one user computing device 302, operated by a user 301. Embodiments of user computing device 302 may be used to implement one or more of user computing device 104, credit information computing device 106, loan provider computing device 108, CRM computing device 110, insurer computing device 112, BI computing device 114, and third-party user-services entity computing device 116 (all shown in FIG. 1A). User computing device 302 includes a processor 205 for executing instructions, and a memory area 310. In some embodiments, executable instructions are stored in memory area 310. Processor 305 may, for example, include one or more processing units (e.g., in a multi-core configuration). Memory area 310 may, for example, be any device allowing information such as executable instructions to be stored and retrieved. Memory area 310 may further include one or more computer readable media.

In the example embodiment, user computing device 302 further includes at least one media output component 315 for presenting information to user 301. Media output component 315 may, for example, be any component capable of converting and conveying electronic information to user 301. For example, media output component 315 may be a display component configured to display component lifecycle data in the form of reports, dashboards, communications, and the like In some embodiments, media output component 315 includes an output adapter (not shown), such as a video adapter and/or an audio adapter, which is operatively coupled to processor 305 and operatively connectable to an output device (also not shown), such as a display device (e.g., a cathode ray tube (CRT), liquid crystal display (LCD), light emitting diode (LED) display, or "electronic ink" display) or an audio output device (e.g., a speaker or headphones).

In some embodiments, media output component 315 is configured to include and present a graphical user interface (not shown), such as a web browser and/or a client application, to user 301. In some embodiments, user computing device 302 includes an input device 320 for receiving input from user 301. Input device 320 may include, for example, a keyboard, a pointing device, a mouse, a stylus, a touch sensitive panel, a touch pad, a touch screen, a gyroscope, an accelerometer, a position detector, an audio input device, a fingerprint reader/scanner, a palm print reader/scanner, a iris reader/scanner, a retina reader/scanner, a profile scanner, or the like. A single component such as a touch screen may function as both an output device of media output component 315 and input device 320. User computing device 302 may also include a communication interface 325, which is communicatively connectable to a remote device such as server system 312 (shown in FIG. 2). Communication interface 325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 310 are, for example, computer readable instructions for providing a user interface to user 301 via media output component 315 and, optionally, receiving and processing input from input device 320. A user interface may include, among other possibilities, a web browser, and client application. Web browsers enable users, such as user 301, to display and interact with media and other information typically embedded on a web page or a website from UFA computing device 102 (shown in FIG. 1A). A client application allows user 301 to interact with a server application from UFA computing device 102. For example, instructions may be stored by a cloud service, and the output of the execution of the instructions sent to the media output component 315.

Processor 305 executes computer-executable instructions for implementing aspects of the disclosure. In some embodiments, the processor 305 is transformed into a special purpose microprocessor by executing computer-executable instructions or by otherwise being programmed.

FIGS. 6-9 are a flowchart illustrating an example method 600 for implementing an automatic personal finance agent for a user. Method 600 may be implemented utilizing, for example, UFA computing device 102 (shown in FIG. 1A).

In the example embodiment, method 600 may include accepting 602 a registration request (e.g., registration request 202) from a user, the registration request including registration information of the user.

Method 600 may further include creating 604, in the data warehouse, a user profile (e.g., user profile 124) associated with the user, the user profile including a plurality of user data sets including a credit history data set, a demographics data set, an employment history data set, a skills data set, an accounts data set, an income and assets data set, a budget data set, and a long-term goals data set.

Method 600 may further include accepting 606, from a credit information computing device (e.g., credit information computing device 106), an electronic signal (e.g., electronic signal 204) including credit history information for the user. In some embodiments, the credit history information includes a credit score range that encompasses a credit score of the user and at least one credit attribute of the user, wherein the at least one credit attribute is at least one of (i) a trend in a number of open accounts of the user, (ii) a trend in a number of late payments on accounts of the user, (iii) a trend in a usage rate of revolving credit accounts of the user, and (iv) a trend in applications by the user for new credit accounts.

Method 600 may further include executing 608 a rules engine (e.g., rules engine 126) and a machine learning engine (e.g., machine learning engine 128).

Method 600 may further include generating 610, by the rules engine based on the registration information and the credit history information, a first sequence of questions (e.g., first sequence of questions 206) regarding the user.

Method 600 may further include transmitting 612, via an electronic user communication channel to a user computing device (e.g., user computing device 104), the first sequence of questions, wherein the electronic user communication channel includes a graphical user interface (GUI) displayable on the user computing device, the GUI generated by at least one of (i) a user application installed on the user computing device, and (ii) one or more web pages hosted by the computing system and accessible by the user computing device.

Method 600 may further include receiving 614, via the electronic user communication channel from the user computing device, a first sequence of user responses (e.g., first sequence of user responses 208) to the first sequence of questions.

Method 600 may further include populating 616 the credit history data set, the demographics data set, the employment history data set, the accounts data set, the income and assets data set, a first portion of the budget data set, and the long-term goals data set with data parsed from the registration information, the credit history information, and the first sequence of user responses.

Method 600 may further include generating 618, by the machine learning engine, a second sequence of questions (e.g., second sequence of questions 210) regarding the user based on the data in the credit history data set, the demographics data set, the employment history data set, the accounts data set, the income and assets data set, the first portion of the budget data set, and the long-term goals data set.

Method 600 may further include transmitting 620, via the electronic user communication channel to the user computing device, the second sequence of questions.

Method 600 may further include receiving 622, via the electronic user communication channel from the user computing device, a second sequence of user responses (e.g., second sequence of user responses 212) to the second sequence of questions, wherein generating the second sequence of questions further includes generating at least one question of the second sequence of questions further based on at least one of the user responses in the second sequence of user responses.

Method 600 may further include populating 624 the skills data set and a second portion of the budget data set with data parsed from the second sequence of user responses.

Method 600 may further include selecting 626, by the rules engine based on the user profile, one of a plurality of types of loan products for which the user qualifies in an amount at least equal to a cash inflow proposal, by comparing current loan terms for each of the types of loan products. In some embodiments, method 600 may further include implementing, in the rules engine, respective loan-qualification guidelines provided by a plurality of offerors of the selected type of loan product.

Method 600 may further include transmitting 628, to a loan provider computing device (e.g., loan provider computing device 108) of a third party offeror of the selected type of loan product, a loan application (e.g., loan application 214) based on data extracted from the user profile.

Method 600 may further include receiving 630, from the loan provider computing device, a loan offer (e.g., loan offer 216).

Method 600 may further include transmitting 632, via the electronic user communication channel to the user computing device, a recommendation (e.g., recommendation 218) of the selected type of loan product and the loan offer.

Method 600 may further include accepting 634, from the user via the electronic user communication channel, a signal (e.g., signal 220) authorizing acceptance of the loan offer.

Method 600 may further include, in response to the signal authorizing acceptance of the loan offer, transmitting 636 a signal (e.g., signal 224) to the loan provider computing device electronically accepting the loan offer.

Figure 10:
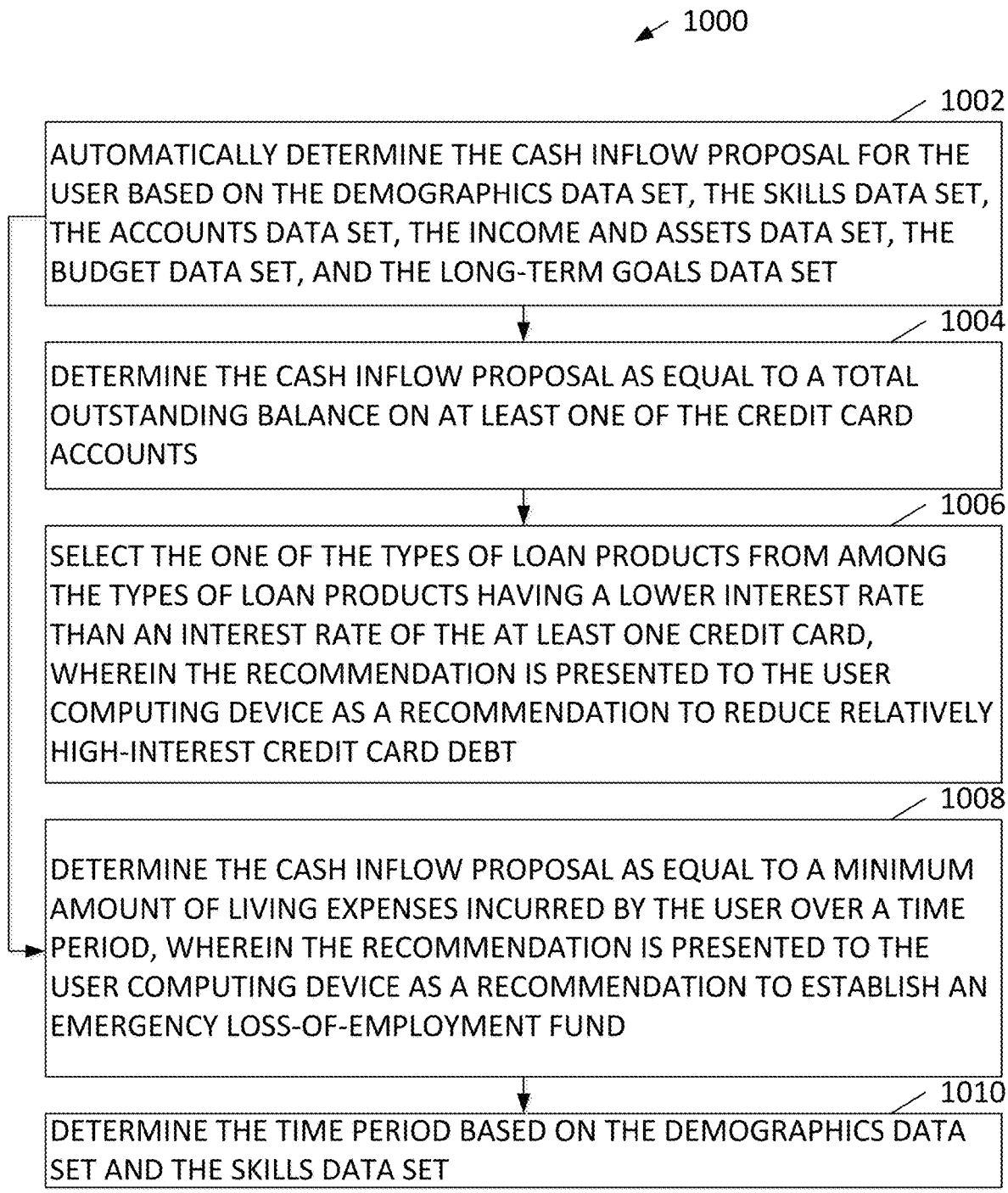
FIG. 10 is an example method for determining a cash inflow proposal.

FIG. 10 is an example method 1000 for determining a cash inflow proposal. Method 1000 may be implemented utilizing, for example, UFA computing device 102 (shown in FIG. 1A).

In some embodiments, method 1000 may include automatically determining 1002 the cash inflow proposal for the user based on the demographics data set, the skills data set, the accounts data set, the income and assets data set, the budget data set, and the long-term goals data set. In such embodiments, method 1000 may further include determining 1004 the cash inflow proposal as equal to a total outstanding balance on at least one of the credit card accounts and selecting 1006 the one of the types of loan products from among the types of loan products having a lower interest rate than an interest rate of the at least one credit card, wherein the recommendation is presented to the user computing device as a recommendation to reduce relatively high-interest credit card debt. Additionally or alternatively, in such embodiments, method 1000 may include determining 1008 the cash inflow proposal as equal to a minimum amount of living expenses incurred by the user over a time period, wherein the recommendation is presented to the user computing device as a recommendation to establish an emergency loss-of-employment fund and determining 1010 the time period based on the demographics data set and the skills data set.

Figure 11:
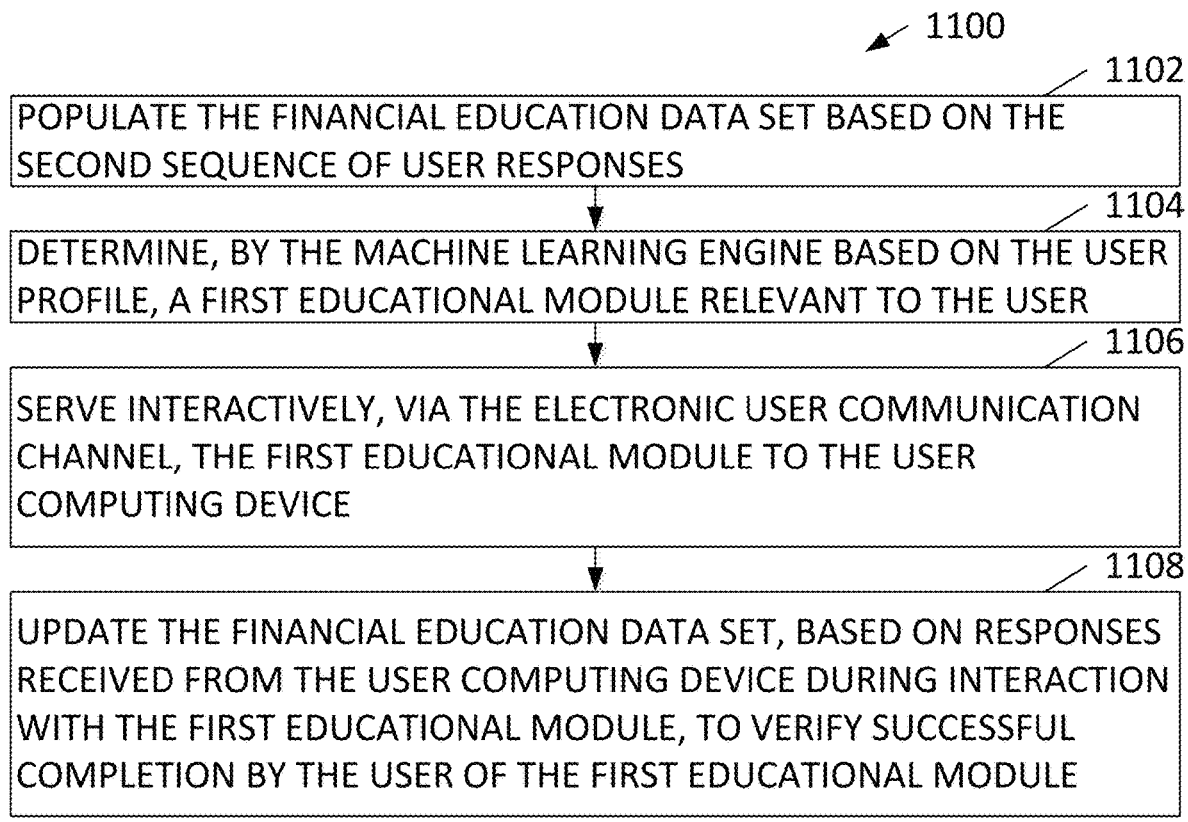
FIG. 11 is a flowchart illustrating an example method for automatically implementing a financial education program.

FIG. 11 is an example method 1100 for automatically implementing a financial education program. Method 1100 may be implemented utilizing, for example, UFA computing device 102 (shown in FIG. 1A).

Method 1100 may include populating 1102 the financial education data set based on the second sequence of user responses. Method 1100 may further include determining 1104, by the machine learning engine based on the user profile, a first educational module relevant to the user. Method 1100 may further include serving 1106 interactively, via the electronic user communication channel, the first educational module to the user computing device. Method 1100 may further include updating the financial education data set, based on responses received from the user computing device during interaction with the first educational module, to verify successful completion by the user of the first educational module. In some embodiments, the selecting of the one of the types of loan products occurs after the updating of the financial education data set, and the selected type of loan product is one for which the user did not qualify prior to the successful completion of the first educational model.

Figure 12:
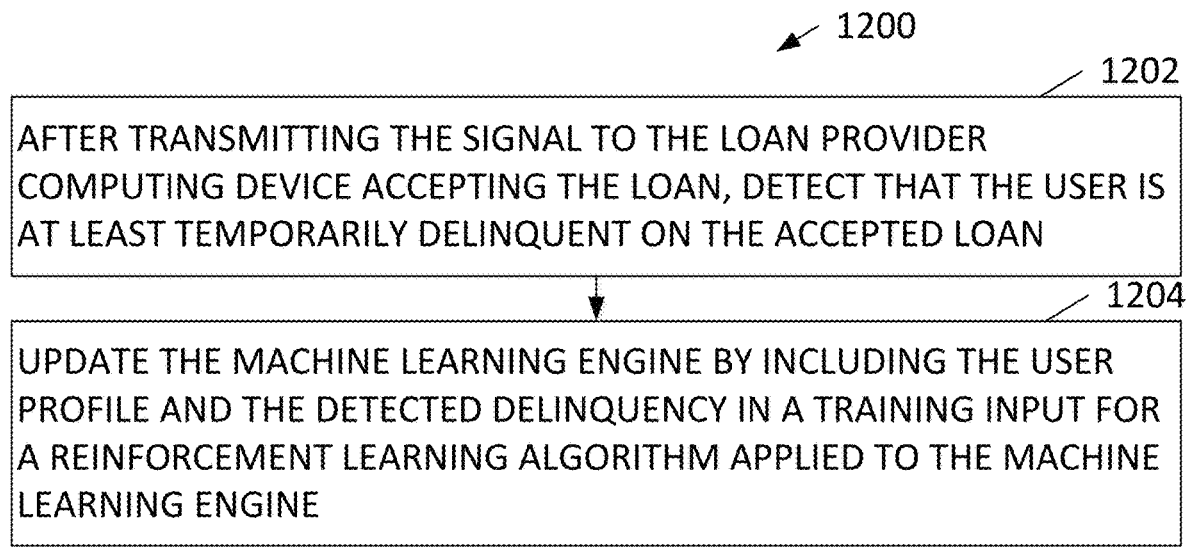
FIG. 12 is a flowchart illustrating an example method of updating a machine learning model based on the delinquency of a user in making a loan payment.

FIG. 12 is an example method 1200 of updating a machine learning model based on the delinquency of a user in making a loan payment. Method 1200 may be implemented utilizing, for example, UFA computing device 102 (shown in FIG. 1A).

Method 1200 may include, after transmitting the signal to the loan provider computing device accepting the loan, detecting 1202 that the user is at least temporarily delinquent on the accepted loan. Method 1200 may further include updating 1204 the machine learning engine by including the user profile and the detected delinquency in a training input for a reinforcement learning algorithm applied to the machine learning engine.

Figure 13:
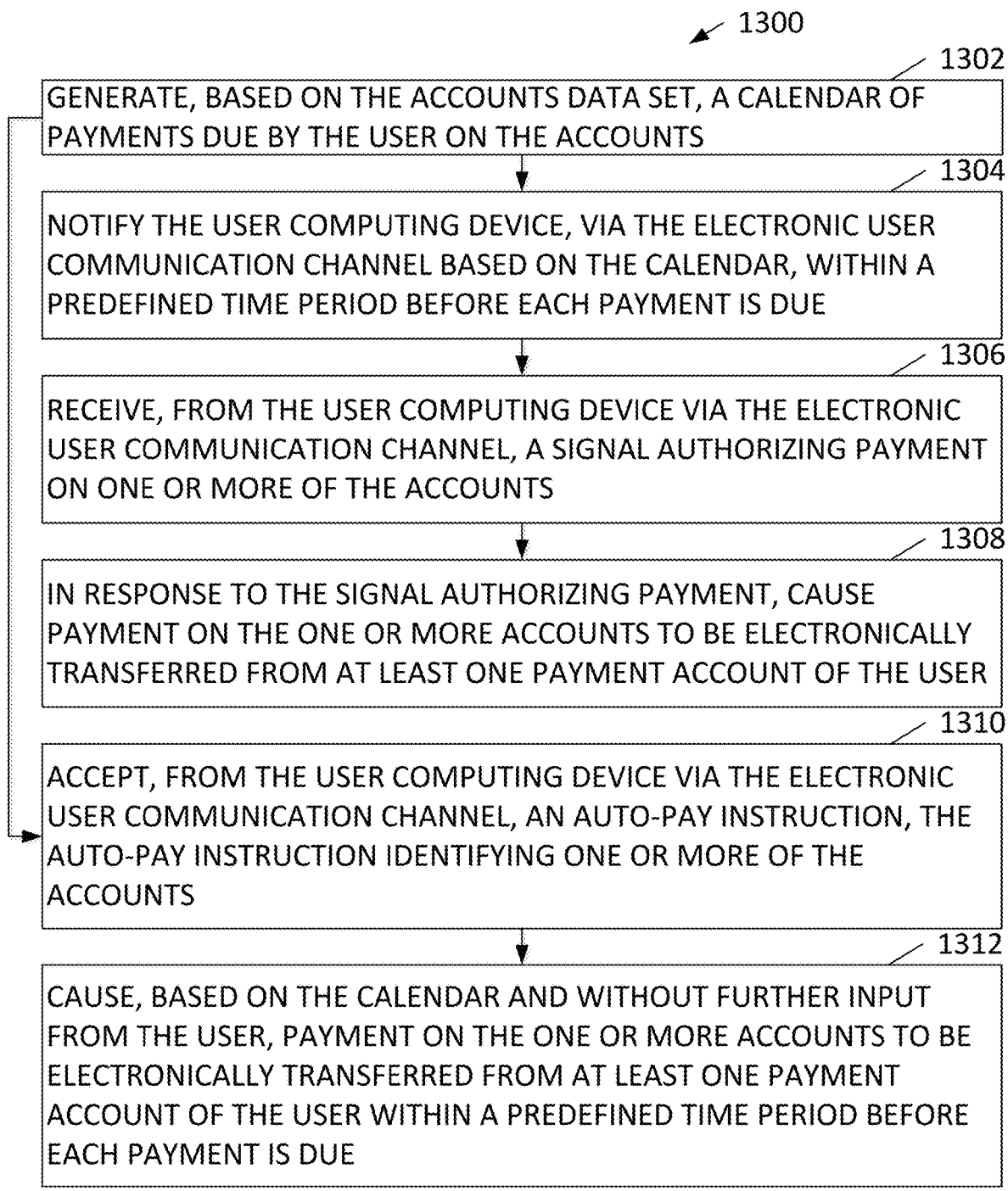
FIG. 13 is a flowchart illustrating example method for automated management of loan payments.

FIG. 13 is example method 1300 for automated management of loan payments. Method 1300 may be implemented utilizing, for example, UFA computing device 102 (shown in FIG. 1A).

Method 1300 may include generating 1302, based on the accounts data set, a calendar of payments due by the user on the accounts. Method 1300 may further include notifying 1304 the user computing device, via the electronic user communication channel based on the calendar, within a predefined time period before each payment is due. Method 1300 may further include receiving 1306, from the user computing device via the electronic user communication channel, a signal authorizing payment on one or more of the accounts. Method 1300 may further include, in response to the signal authorizing payment, causing 1308 payment on the one or more accounts to be electronically transferred from at least one payment account of the user. In some embodiments, method 1300 may further include accepting 1310, from the user computing device via the electronic user communication channel, an auto-pay instruction, the auto-pay instruction identifying one or more of the accounts. In such embodiments, method 1300 may further include causing 1312, based on the calendar and without further input from the user, payment on the one or more accounts to be electronically transferred from at least one payment account of the user within a predefined time period before each payment is due.

Figure 14:
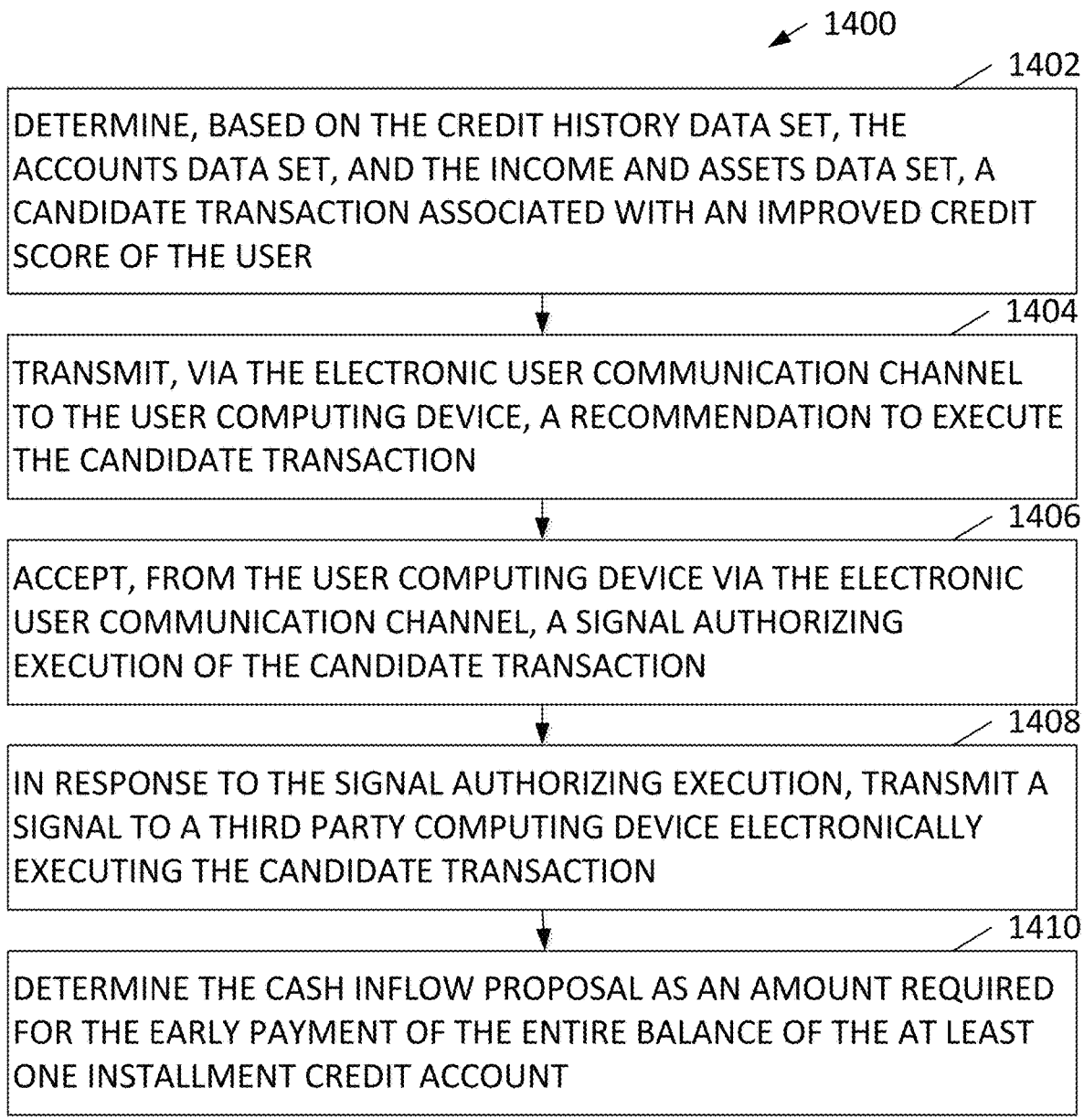
FIG. 14 is a flowchart illustrating an example method for automatically executing a financial transaction based on an improvement in a user's credit score.

FIG. 14 is an example method 1400 for automatically identifying candidate transactions to improve a user's credit score. Method 1400 may be implemented utilizing, for example, UFA computing device 102 (shown in FIG. 1A).

Method 1400 may include determining 1402, based on the credit history data set, the accounts data set, and the income and assets data set, a candidate transaction associated with an improved credit score of the user. Method 1400 may further include transmitting 1404, via the electronic user communication channel to the user computing device, a recommendation to execute the candidate transaction. Method 1400 may further include accepting 1406, from the user computing device via the electronic user communication channel, a signal authorizing execution of the candidate transaction. Method 1400 may further include, in response to the signal authorizing execution, transmitting 1408 a signal to a third party computing device electronically executing the candidate transaction.

In certain embodiments, the accounts data set identifies one or more revolving credit accounts of the user, and the candidate transaction includes closing at least one of the one or more revolving credit accounts.

In some embodiments, the accounts data set identifies one or more installment credit accounts of the user, and the candidate transaction includes early payment of an entire balance of at least one of the one or more installment credit accounts. In such embodiments, method 1400 may further include determining 1410 the cash inflow proposal as an amount required for the early payment of the entire balance of the at least one installment credit account.

Figure 15:
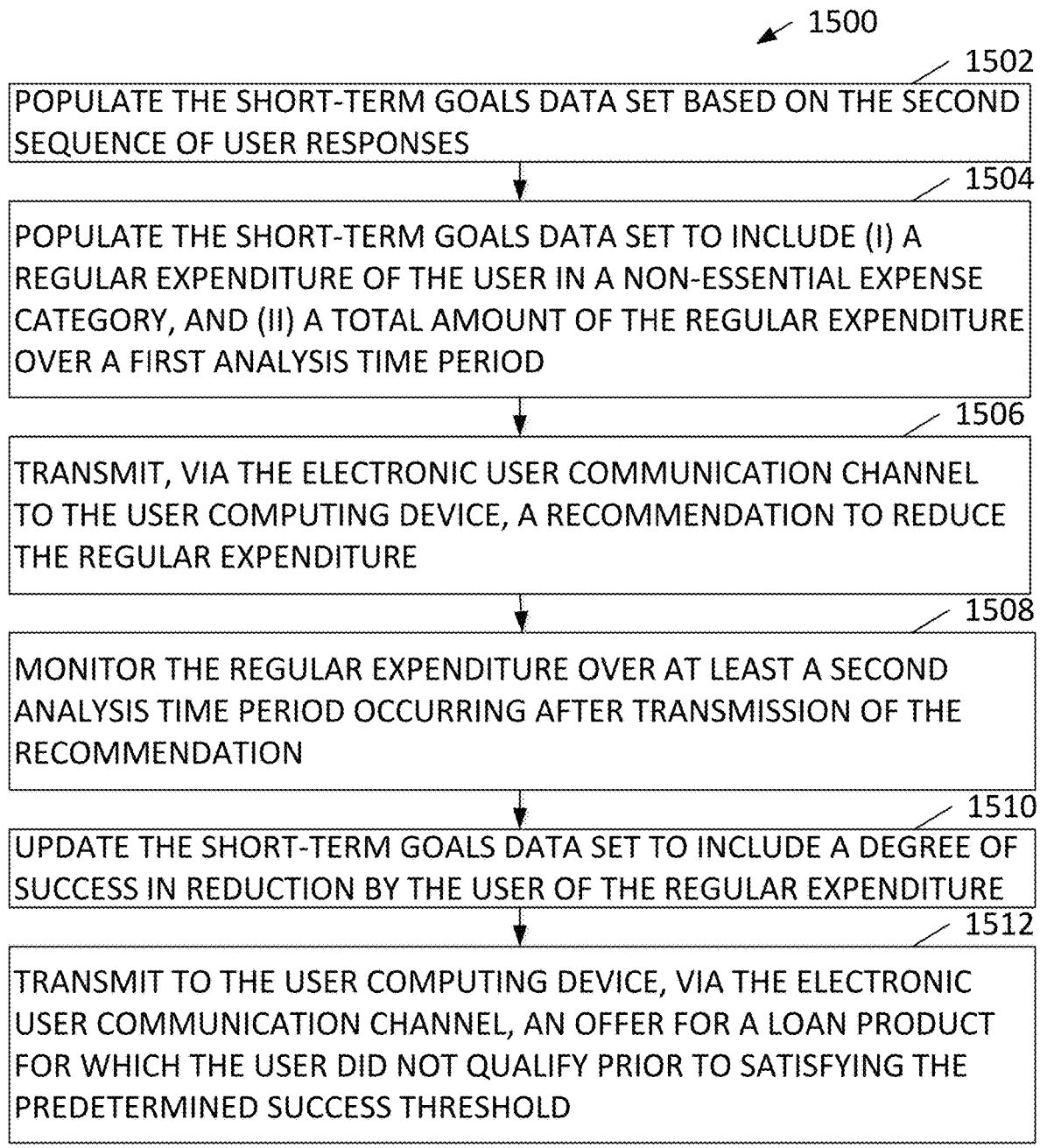
FIG. 15 is a flowchart illustrating an example method for automatically recommending and tracking short-term financial goals of for a user.

FIG. 15 is an example method 1500 for automatically recommending and tracking short-term financial goals of for a user. Method 1500 may be implemented utilizing, for example, UFA computing device 102 (shown in FIG. 1A).

Method 1500 may include populating 1502 a short-term goals data set based on the second sequence of user responses. Method 1500 may further include populating 1504 the short-term goals data set to include (i) a regular expenditure of the user in a non-essential expense category, and (ii) a total amount of the regular expenditure over a first analysis time period. Method 1500 may further include transmitting 1506, via the electronic user communication channel to the user computing device, a recommendation to reduce the regular expenditure. Method 1500 may further include monitoring 1508 the regular expenditure over at least a second analysis time period occurring after transmission of the recommendation. Method 1500 may further include updating 1510 the short-term goals data set to include a degree of success in reduction by the user of the regular expenditure. In some embodiments, method 1500 may further include transmitting 1512 to the user computing device, via the electronic user communication channel, an offer for a loan product for which the user did not qualify prior to satisfying the predetermined success threshold.

Figure 1B:
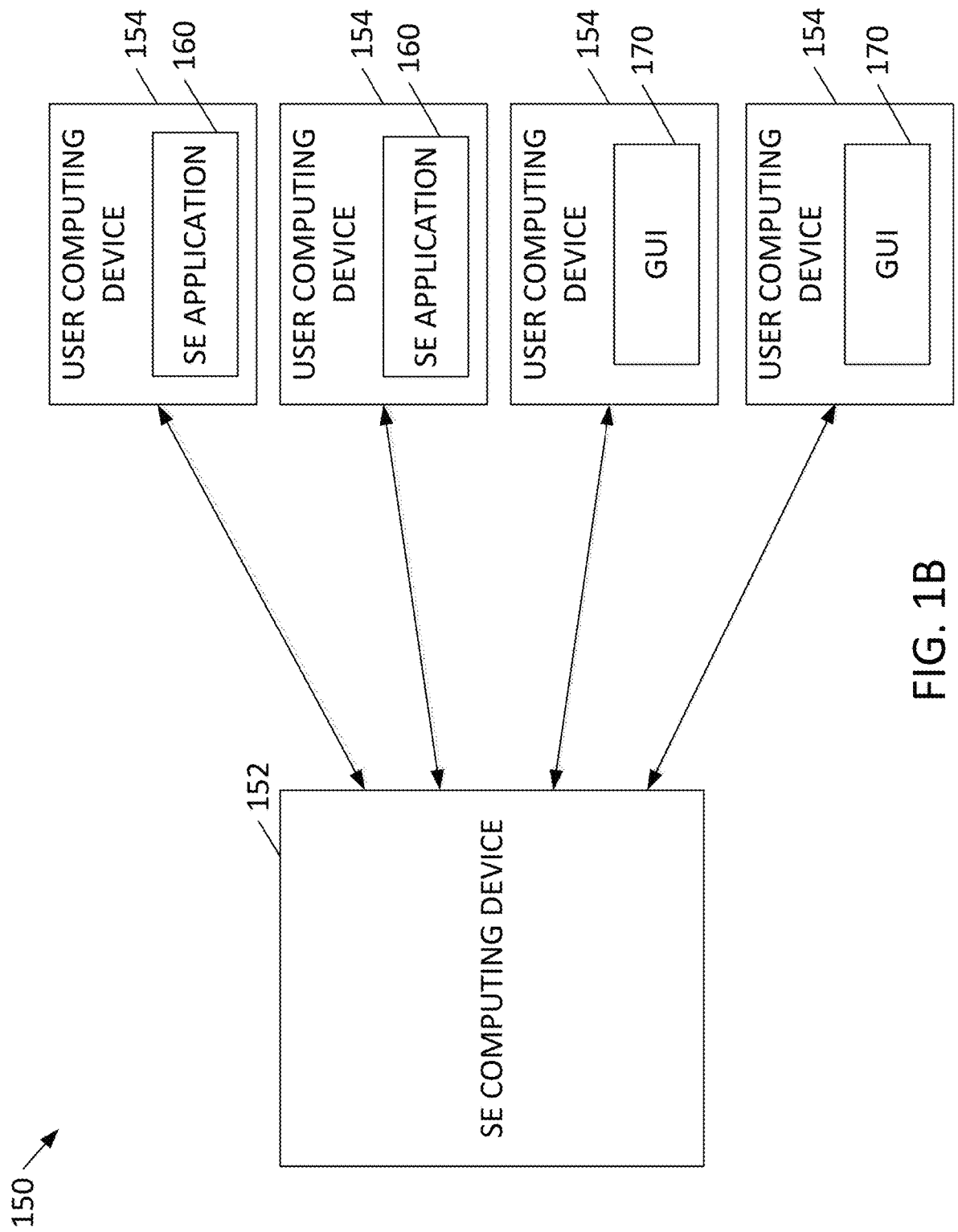
FIG. 1B is a schematic diagram illustrating an example sponsorship engine system in accordance with the present disclosure

FIG. 1B is a block diagram of an example sponsorship engine (SE) system 150. SE system 150 includes an SE computing device 152 and a plurality of user computing devices 154. In some embodiments, SE computing device 152 is implemented using the hardware shown in FIG. 4, and/or user computing devices 154 are each implemented using the hardware shown in FIG. 5. At least one user computing device 154 is configured to interface with SE computing device 152 via a sponsor portal including a graphical user interface (GUI) 170. Other user computing devices 154 are configured to execute an SE application 160 configured to enable end users, i.e., customers of the sponsor, to interface with SE computing device 152.

Figure 16:
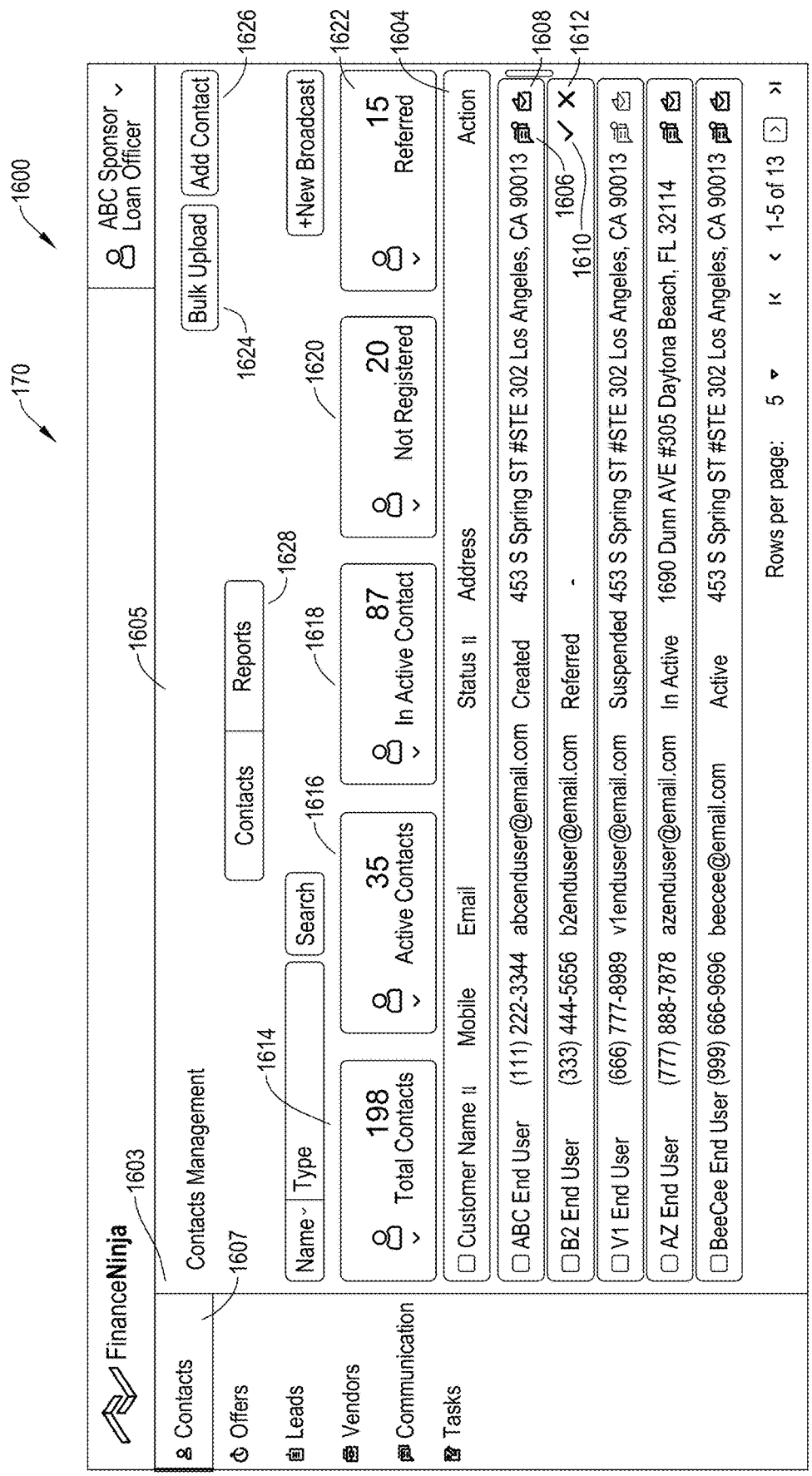
FIG. 16 illustrates an example screenshot of a contacts management page of a graphical user interface (GUI) in a sponsor portal in accordance with the present disclosure.

FIG. 16 is an example screenshot of a contacts management page 1600 of GUI 170. Contacts management page 1600 is generated and transmitted by SE computing device 102 to user computing device 154 in response to sponsor selection of a contacts tab 1607. GUI 170 includes a first display area 1603 and a second display area 1605. In the example embodiment, first display area 1603 persistently displays a plurality of tabs, while second display area 1605 is dynamically updatable in response to selection of each of the tabs persistently displayed in first display area 1603.

In the illustrated embodiment, contacts management page 1600 is shown as displayed to a sponsor, as described herein. In the example embodiment, second display area 1605 is dynamically updatable to display contacts page 1600 in response to a selection of contacts tab 1607 in first display area 1603. Contacts management page 1600 is configured to display basic information associated with contacts of the sponsor (e.g., customer name, phone number, email address, address, etc.). In the example embodiment, the customer information shown on contacts management page 1600 is contact information transmitted to SE computing device 152 by a sponsor. As examples, a sponsor may be able to upload contact information in bulk (e.g., uploading a spreadsheet to SE computing device 152 in response to selection of bulk upload control 1624) or by manually entering contact information (e.g., in response to selection of add contact control 1626). In some embodiments, sponsors may be able to share customer contact information with other sponsors utilizing SE computing device 152. In some embodiments, a sponsor may disable and/or delete certain customer records (e.g., including customer contact information) stored in SE computing system 150. In some embodiments, a sponsor can view, in response to selection of reports control 1628, different reports regarding different customers (e.g., including customer activity in SE computing system 150 as described below with respect to FIG. 17).

Action column 1604 includes controls for actions that may be taken by a sponsor in regard to a particular contact. For example, in response to selection of control 1606, a pop-up page that allows the sponsor to send a message to a particular contact is displayed. In response to selection of symbol 1608, SE computing system 152 generates a reminder that is transmitted to a user computing device 104 of a particular contact. Further, as shown in contacts management page 1600, no controls in action column 1604 are selectable for customers that have a "Suspended" status because those customers have stopped using the mobile application. Further, controls 1610 and 1612 allow a sponsor to select one of accepting a customer by selecting control 1610, or rejecting a customer by selecting control 1612, for customers with a "Referred" status.

Also included in contacts management page 1600 are different controls 1614-1622 that are selectable by a sponsor such that, in response to selection of a control 1614-1622, SE computing system 152 filters different customers to be displayed. As illustrated in contacts management page 1600, selection of control 1614 causes display of every contact of the sponsor, selection of control 1616 causes display of only active contacts, selection of control 1618 causes display of inactive contacts, selection of control 1620 causes display of contacts that are not yet registered, and selection of control 1622 causes display of contacts referred to the sponsor from a different sponsor.

Figure 17:
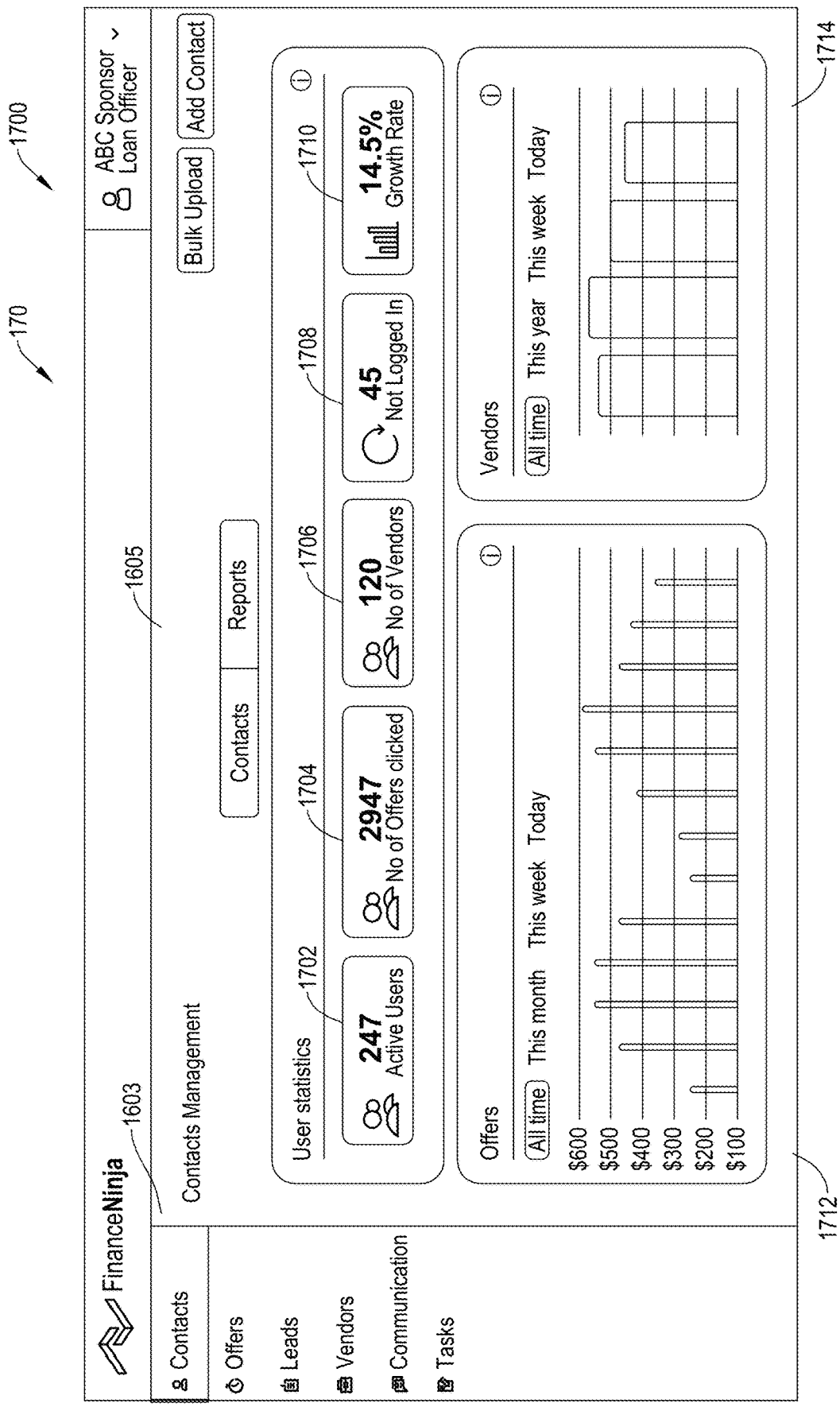
FIG. 17 illustrates an example screenshot of another contacts management page of a GUI in a sponsor portal in accordance with the present disclosure.

FIG. 17 is an example screenshot of another contacts management page 1700 of GUI 170. In the illustrated embodiment, contacts management page 1700 displays a number 1702 of active users, a number 1704 of offers selected, a number 1706 of vendors, a number 1708 of users not logged in to SE application 160, and a growth rate 1710 of the number of users.

In the example embodiment, the number 1702 of active users indicates the number of customers currently logged in to SE application 160. The number 1704 of offers selected indicates the number of offers selected by the sponsor that are currently available to at least a portion of their customers via SE application 160. Further, a graph 1712 of offers indicates a number of offers over a period of time where each different period of time displayed is a control that is selectable by the sponsor, such that graph 1712 displays the number of offers over a different period of time (e.g., months, weeks, days, etc.). The number 1706 of vendors indicates the number of vendors that are accepted by the sponsor to input offers that the sponsor may approve to be offered to the customers of the sponsor. Further a graph 1714 of vendors indicates a number of vendors approved by the sponsor during a predefined period of time (e.g., in the current year, month, week, etc.). The number 1708 of users not logged in to SE application 160 indicates a number of users/customers not currently logged in to SE application 160. The growth rate 1710 of the number of users indicates the growth rate of users over a predefined period of time (e.g., a year, a month, etc.), such as by percentage.

FIG. 18 is an example screenshot of an offer management page 1800 of GUI 170 that appears in second display area 1605 in response to sponsor selection of an offers tab 1803 in first display area 1603. In the illustrated embodiment shown on offer management page 1800, a variety of information regarding offers, including a listing of offers, as described herein, is illustrated, including categories 1802, product names 1804, offer names 1806, valid from 1808 and valid to 1810 dates, status 1812, actions 1814, and create-offers control 1816.

In the example embodiment, at least some categories displayed in categories 1802 are controls selectable by a sponsor. For example, as shown on page 1800, "Mortgage" and "Auto loans" are selectable controls as indicated by the up/down arrows displayed in the categories column. In response to selection of a control by a sponsor, a drop down menu is displayed including each offer included in the selected category. In the example of page 1800, a sponsor has selected the Mortgage category control. Accordingly, two different options are displayed below the Mortgage row, each including a different option of a Mortgage offer.

Product names 1804 are displayed for each offer to indicate a name of what product the offer is for (e.g., a vehicle loan, insurance, etc.). Offer names 1806 are displayed to indicate with the offer regarding the product is (e.g., a discount, reduced fees, etc.). Valid from 1808 and valid to 1810 dates indicate a time frame for how long the associated offer will be active. Status 1812 column indicates which offers are being offered to the customer of the sponsor. Each control in status 1812 column is selectable by the sponsor to turn the selected offer on or off for their customers. For example, as shown on page 1800, darker controls with the circle on the right side of the control are "on" (e.g., currently being offered to customers) while lighter controls with the circle on the left side of the control are "off" (e.g., not currently being offered to customers). Further, actions 1814 column indicates a number of actions that can be taken by the sponsor in response to selecting a control in actions 1814 column, including controls for viewing (e.g., at a view offer control) and/or editing a particular offer (e.g., at an offer-edit control).

Figure 19:
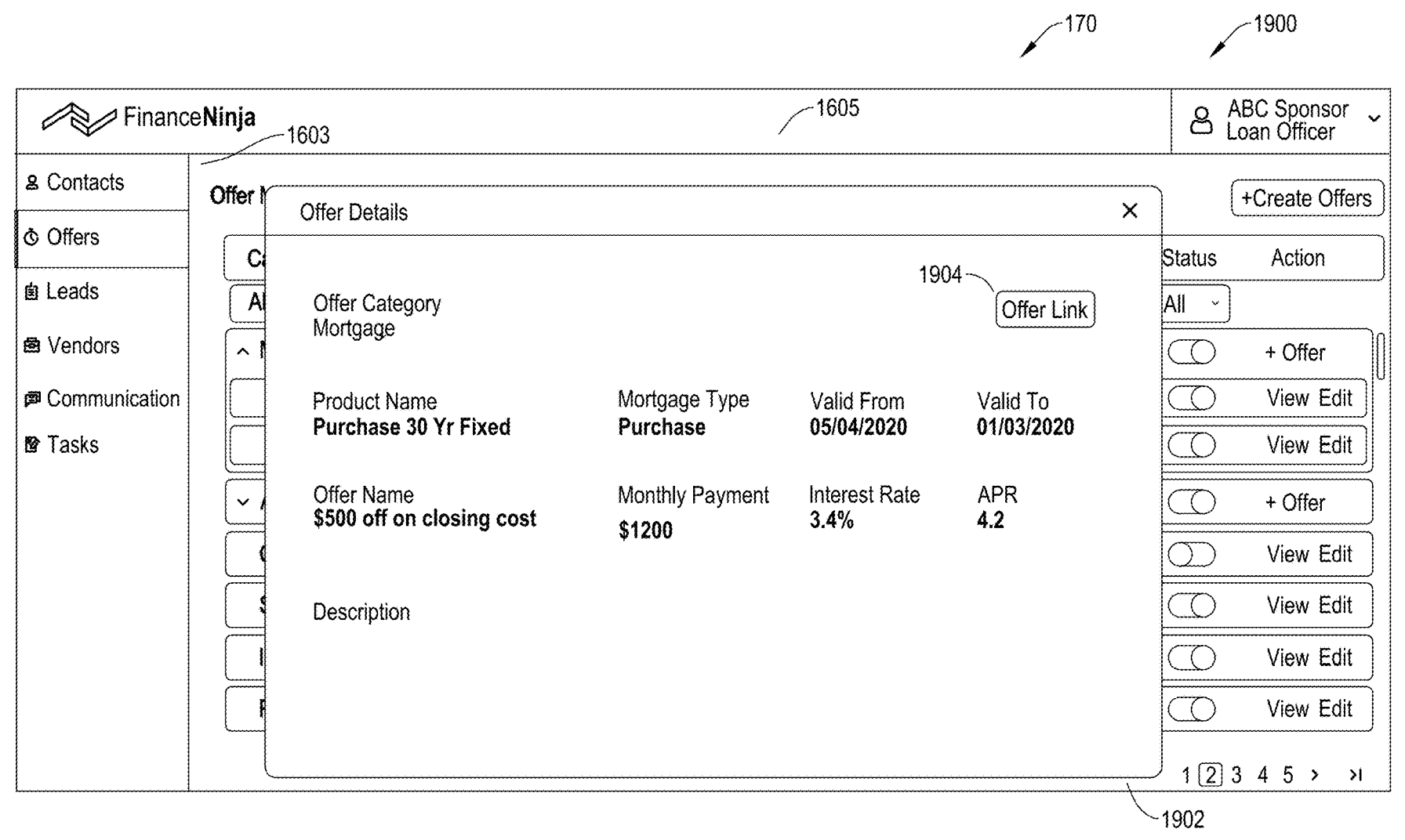

FIG. 19 is an example screenshot of an offer details pop-up 1902 of GUI 170. In response to selection of a view and/or edit control for a particular offer as described above, pop-up 1902 is displayed. In the example, a sponsor has selected to edit/view a mortgage offer. Information displayed in pop-up 1902 includes an offer category, a product name, a mortgage type, a valid to and valid from date, an offer name, a monthly payment, an interest rate, an annual percentage rate (APR), and a description of the offer. In some embodiments, pop-up 1902 may display different, and/or more or less information that is displayed in example pop-up 1902. For example, a pop-up displayed upon selection of a car loan offer would display different information than the example pop-up 1902 for a mortgage offer. For more information regarding the selected offer, a sponsor may select the offer link 1904 control displayed in pop-up 1902. In response to selection of offer link 1904 control, GUI 170 pulls up a web page including more details regarding the selected offer.

FIG. 20 is an example screenshot of a create offers page 2000 of GUI 170 that appears in response to selection of create-offers control 1816 on page 1800. New offers, as described above, in the example embodiment may be entered by sponsors at create offers page 2000, or alternatively imported from vendors. Once an offer is entered at create offers page 2000, the offer subsequently appears at offer management page 1800.

Figure 21:
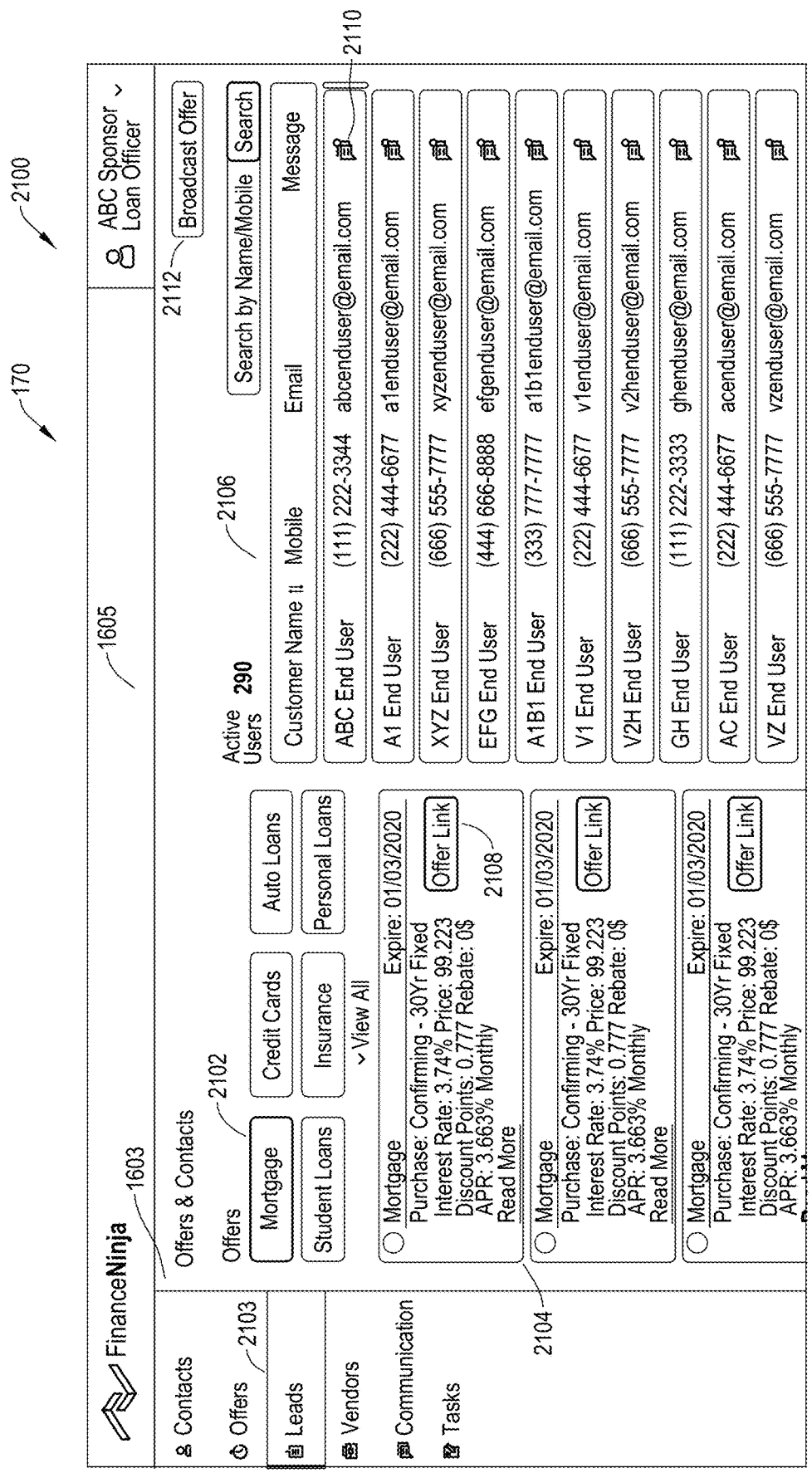
FIG. 21 illustrates an example screenshot of an offers and contacts page of a GUI that appears in a second display area in response to selection of a leads tab in a first display area in a sponsor portal in accordance with the present disclosure.

FIG. 21 is an example screenshot of an offers and contacts page 2100 of GUI 170 that appears in second display area 1605 in response to selection of a leads tab 2103 in first display area 1603. In the embodiment illustrated in page 2100, categories 2102 of offers are displayed, offers 2104 are displayed for a selected category, and a list 2106 of contacts for a sponsor is displayed. On page 2100, a sponsor can select a category control of the categories 2102, including, as examples, mortgage, credit cards, auto loans, student loans, insurance, and personal loans. In response to sponsor selection of a category control, offers 2104 are displayed based on the selected category. In the example embodiment, a sponsor can select an offer control included in offers 2104, and select contacts from list 2106 of contacts to send the offer to. Further, a sponsor may select an offer link 2108 control. In response to selection of offer link 2108 control, GUI 170 pulls up a web page including a more detailed description of a particular offer. A sponsor may also select a message control 2110. In response to selection of message control 2110, pop-up 2202 is displayed by GUI 170 including an interface allowing the sponsor to send a message to the selected contact(s). To broadcast an offer to at least one contact, a sponsor can select broadcast offer control 2112, as explained with respect to FIG. 22 in more detail. In some embodiments, offers 2104 are generated based on analysis by SE computing system 152 of information entered in to SE computing system 150 by customers. In some embodiments, SE computing system 152 utilizes artificial intelligence techniques as described herein to generate offers 2104.

Figure 22:
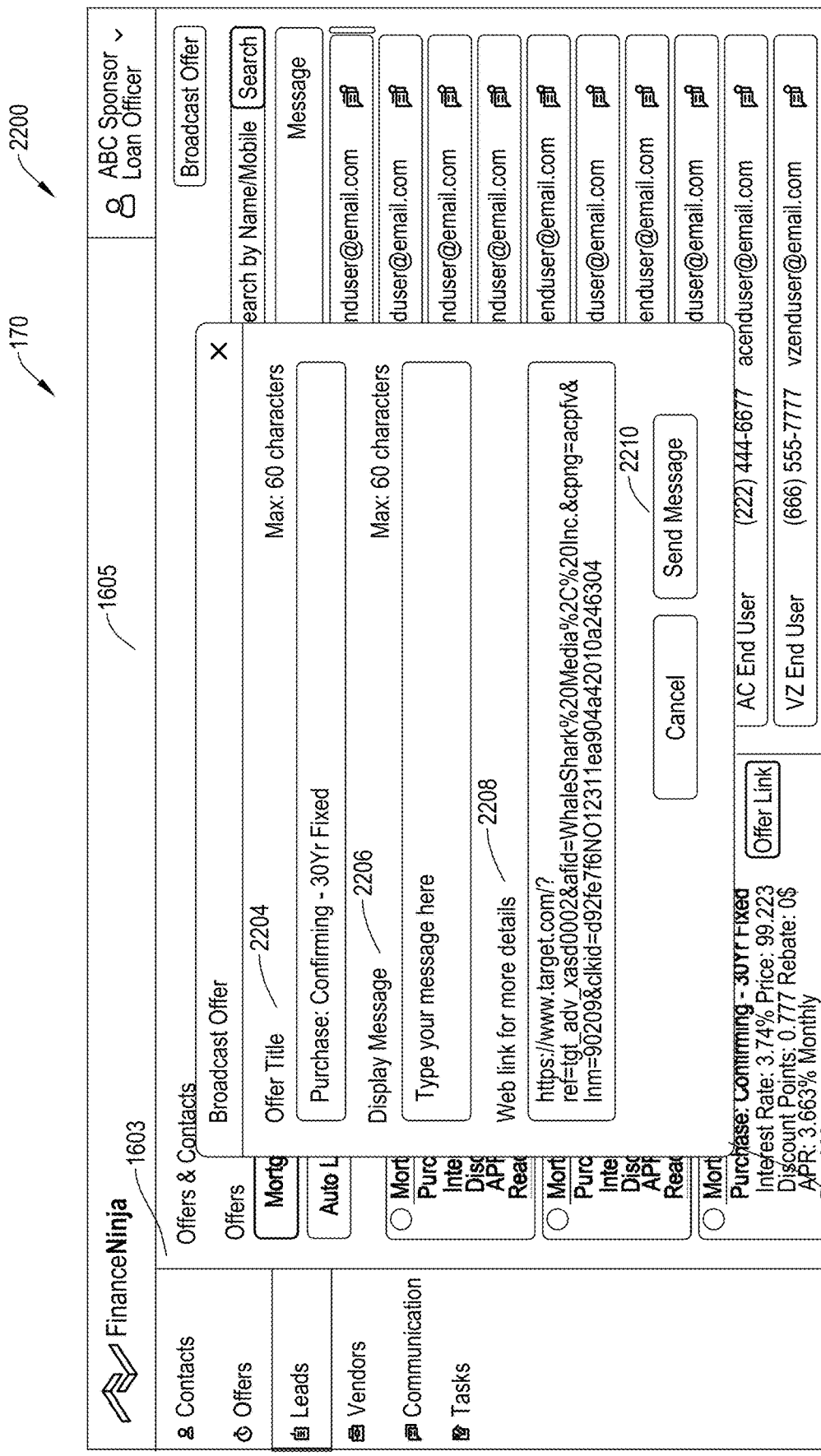
FIG. 22 illustrates an example screenshot of a broadcast offer page of a GUI in a sponsor portal in accordance with the present disclosure.

FIG. 22 is an example screenshot of a broadcast offer page 2200 of GUI 170. In the example embodiment, in response to selecting broadcast offer control 2112 as described above, pop-up page 2202 is displayed. Pop-up page 2202 includes an offer title 2204 section, a display message 2206 section, and a web link 2208 section. As shown on page 2202, SE computing system 152 generates offer title 2204 and web link 2208. In some embodiments, SE computing system 152 also generates a message included in display message 2206. Each of these fields may be editable by the sponsor. Upon sponsor selection of send message control 2210, the information included in pop-up 2202 is transmitted as a message to at least one contact in the list 2106 of contacts. In some embodiments, the message is transmitted to all contacts in list 2106 of contacts. In some embodiments, the sponsor selects particular contacts in list 2106 of contacts the message should be transmitted to. SE computing device 152 causes web link 2208 to appear as a hyperlink in the message displayed to the customer within SE application 160. In some embodiments, the message is caused to be displayed within SE application 160 as an interactive graphic configured to communicate the offer title, the details section, and the hyperlink for display on a screen of limited size, such as but not limited to a smart phone executing SE application 160. Thus, SE computing system 150 facilitates efficient communication of detailed offers to end users.

Figure 23:
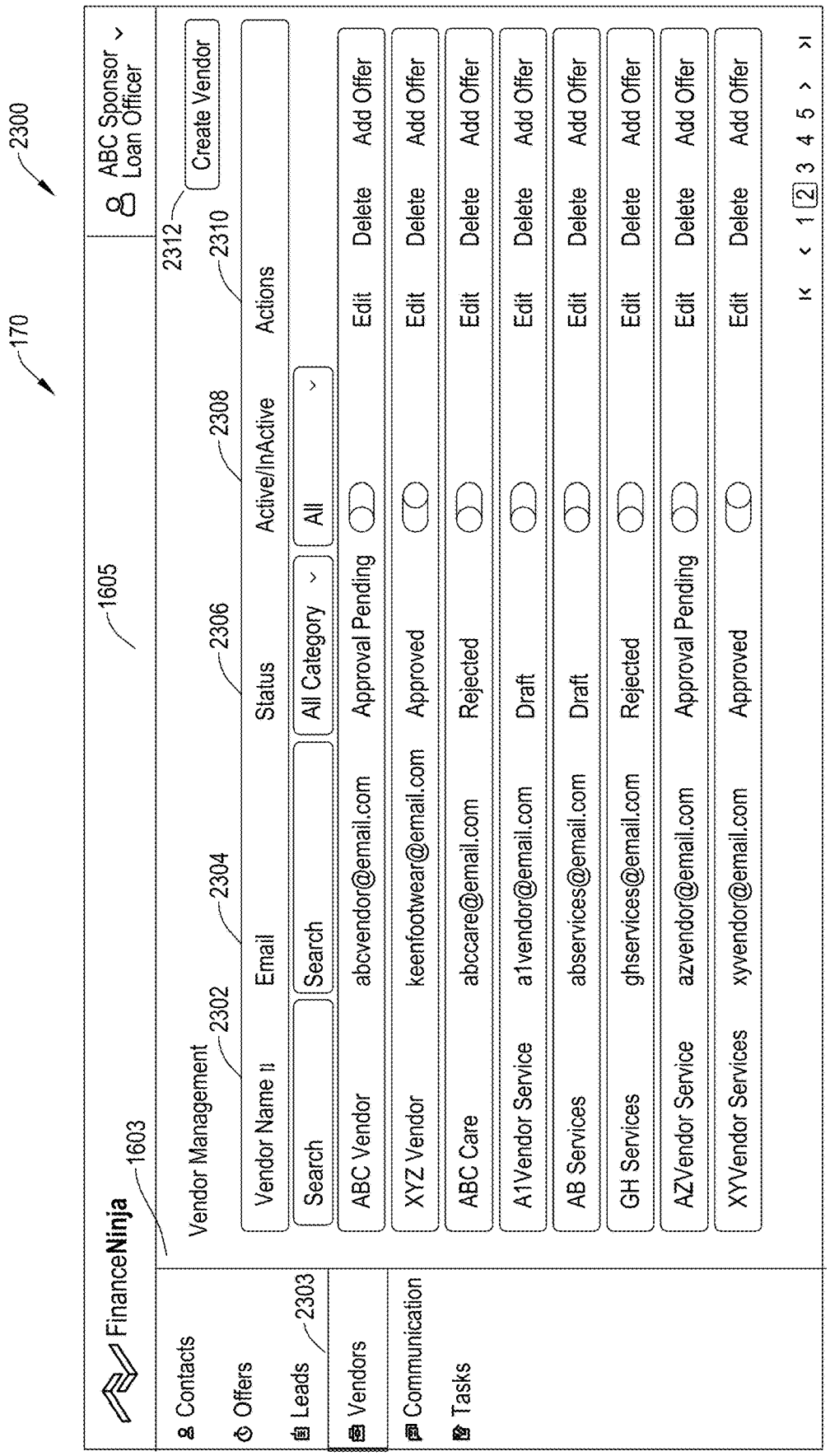
FIG. 23 illustrates an example screenshot of a vendor management page of a GUI that is displayed in a second display area in response to sponsor selection of a vendors tab in a first display area in a sponsor portal in accordance with the present disclosure.

FIG. 23 is an example screenshot of a vendor management page 2300 of GUI 170 that is displayed in second display area 1605 in response to sponsor selection of a vendors tab 2303 in first display area 1603. In the illustrated embodiment of vendor management page 2300, vendor names 2302, email addresses 2304, vendor statuses 2306, active/inactive indicators 2308, and action options 2310 are displayed, along with a create vendor control 2312.

Vendor names 2302 include the names of vendors listed on page 2300, and email addresses 2304 include email addresses for each vendor included on page 2300. Each status of vendor statuses 2306 includes an indication of the status of each vendor. Examples of vendor statuses 2306 include Approved, for vendors approved by the sponsor to submit offers, Rejected, for vendors rejected by the sponsor to submit offers, Approval Pending, for vendors the sponsor has neither accepted nor rejected, and Draft, for vendors that have not provided enough information to have an account created by SE computing system 152. Active/inactive indicators 2308 are controls selectable by a sponsor such that a sponsor can allow or disallow a vendor from submitting new offers. In the illustrated example, darker controls with the circle on the right side of the control are "active" (e.g., indicating vendors that can currently submit offers) while lighter controls with the circle on the left side of the control are "inactive" (e.g., indicating vendors that cannot currently submit offers). Further, actions 2310 column includes controls for a number of actions that can be taken by the sponsor. Actions 2310 column includes controls for editing, deleting, and/or adding an offer for a particular vendor.

In some embodiments, more vendor data is displayed on vendor management page 2300 including, as examples, vendor licensing information, vendor background details, vendor contract details, vendor revenue information, vendor legal information, and vendor contract documents (e.g., as uploaded by a vendor to SE computing system 150). In some embodiments SE computing system 152 analyzes customer traffic within SE computing system 150 to analyze how many customers are viewing offers from a particular vendor. SE computing system 152 may provide the analyzed information to vendors for advertising purposes. In some embodiments, a customer and/or sponsor are provided with a vendor scorecard by SE computing system 152 such the customer and/or sponsor may rate vendors and offer comments regarding vendors, as examples. In some embodiments, SE computing system 152 may automatically deactivate a vendor account within SE computing system 150 if a threshold number of bad/negative reports are received regarding a particular vendor.

In response to sponsor selection of create vendor control 2312, the sponsor is taken to a different page (e.g., page 2400) that allows the sponsor to create a new vendor stored at SE computing system 152, as described below in greater detail with respect to FIG. 24.

Figure 24:
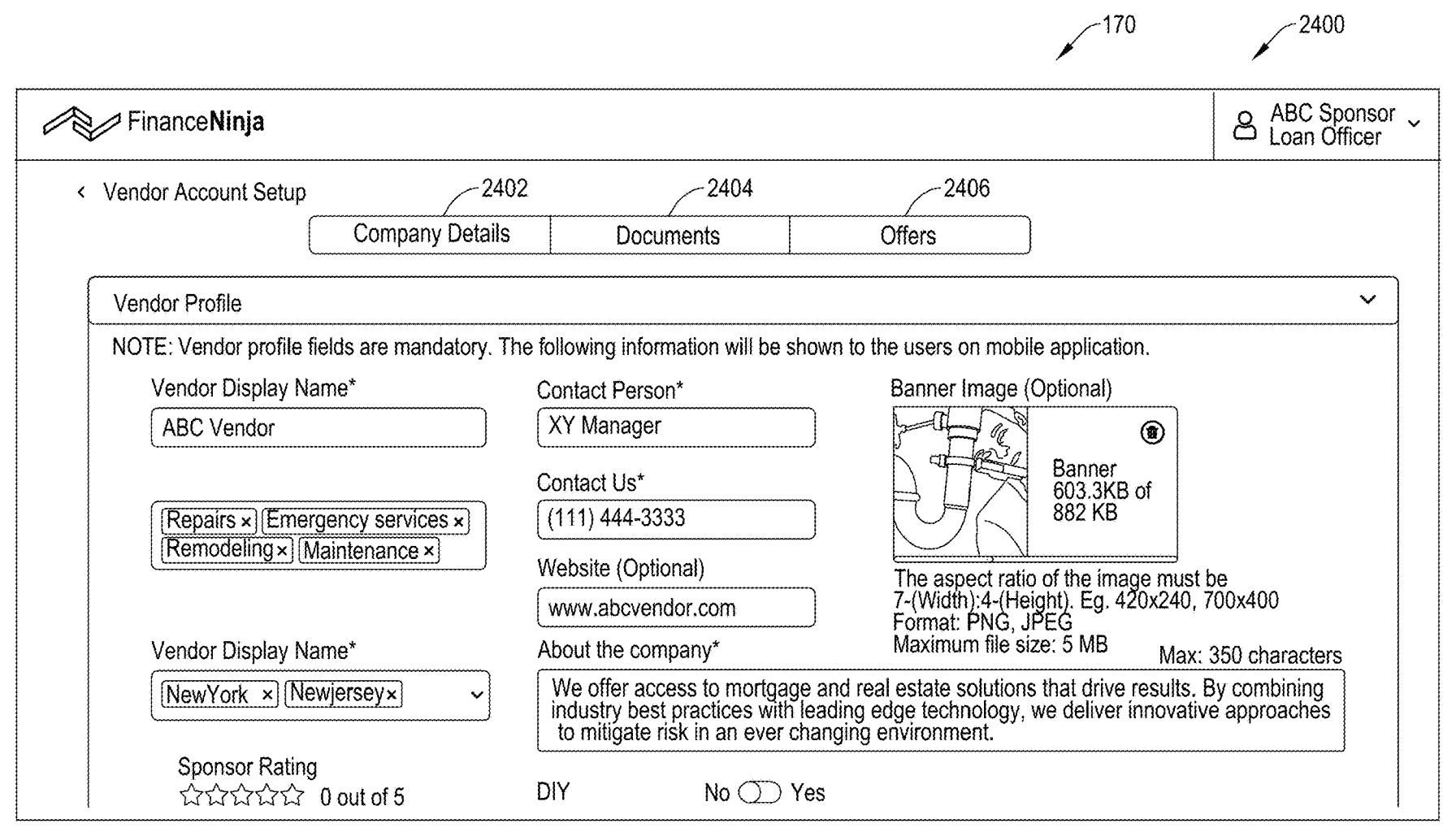

FIG. 24 is an example screenshot of a vendor account setup page 2400 of GUI 170. As described above, in the example embodiment, page 2400 is displayed upon selection of create vendor control 2312 as shown in FIG. 23. As examples, information entered for a vendor profile to be created at SE computing device 152 includes a vendor display name, a vendor contact person, a vendor category (e.g., indicating the industry of the vendor), vendor contact information, vendor locations (e.g., states, cities, etc.), a vendor website link, a sponsor rating (e.g., indicating on a scale of 1 to 5 stars the sponsor opinion of the services provided by the vendor), a description of the vendor company, and a vendor image.

In the example embodiment, vendor account setup page 2400 is displayed upon sponsor selection of company details tab 2402. Upon sponsor selection of documents tab 2404, in the example embodiment, a sponsor can upload a variety of documents (e.g., background checks, agreements, reports, licenses) that are associated with the vendor at SE computing system 152. Upon sponsor selection of offers tab 2406, a sponsor can view, edit, and/or delete vendor offers, as described below in greater detail with respect to FIG. 25.

Figure 25:
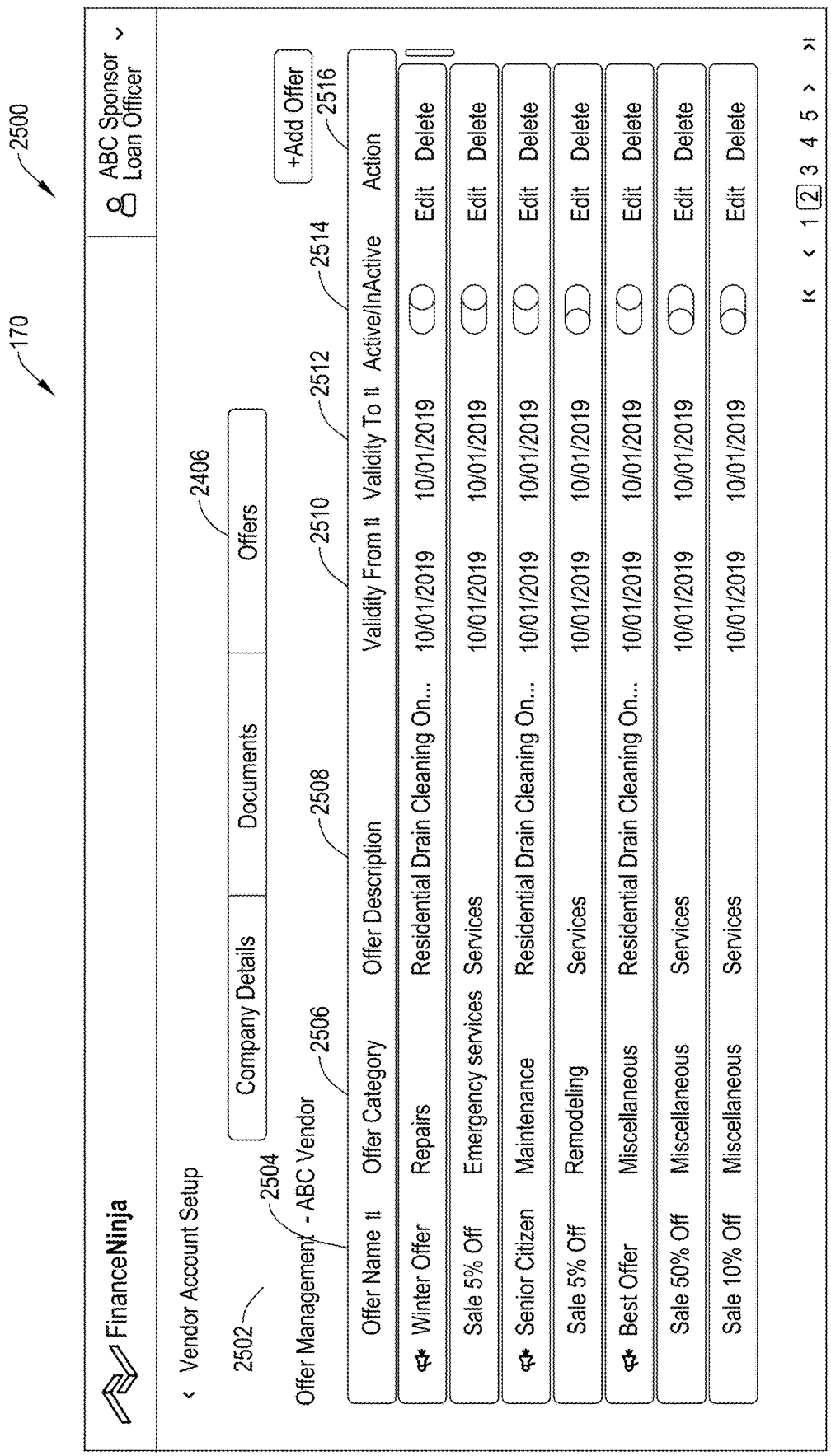
FIG. 25 illustrates an example screenshot of another vendor account setup page of a GUI that is displayed in response to selection of offers tab as shown in FIG. 24.

FIG. 25 is an example screenshot of another vendor account setup page 2500 of GUI 170 that is displayed in response to selection of offers tab 2406 as shown in FIG. 24. Upon selection of offers tab 2406, offer management section 2502 of setup page 2500 is displayed. Offer management section 2502 includes offer names 2504, offer categories 2506, offer descriptions 2508, valid from 2510 and valid to 2512 dates, status 2514, and actions 2516.

Offer names 2504 are displayed for each offer to indicate a name of what the offer is for (e.g., a sale, a discount, etc.). Offer categories 2506 are displayed to indicate what industry the offer is associated with (e.g., maintenance, repairs, emergency service, etc.). Valid from 2510 and valid to 2512 dates indicate a time frame for how long the associated offer will be active. Status 2514 column indicates which offers are currently being offered to the customer of the sponsor. Each control in status 2514 column is selectable by the sponsor to turn the selected offer on or off for their customers. For example, as shown on page 2500, darker controls with the circle on the right side of the control are "on" (e.g., currently being offered to customers) while lighter controls with the circle on the left side of the control are "off" (e.g., not currently being offered to customers). Further, actions 2516 column includes controls for a number of actions that can be taken by the sponsor. Upon selection of a particular control in actions 2516 column, a sponsor can edit and/or delete a particular offer.

Figure 26:
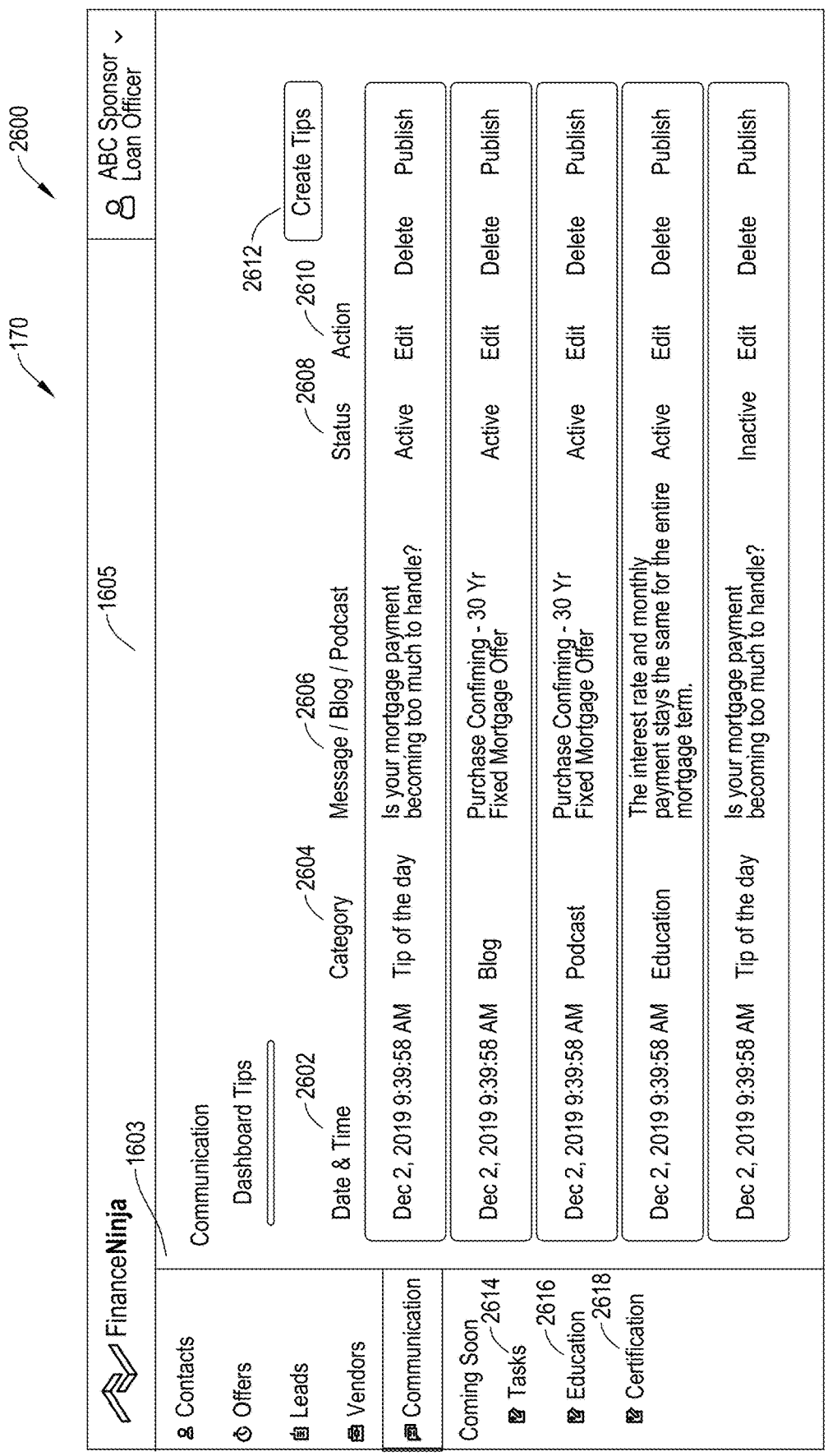
FIG. 26 illustrates an example screenshot of a communication page of a GUI 170 that is displayed in a second display area in response to sponsor selection of a communication tab in a first display area in a sponsor portal in accordance with the present disclosure.

FIG. 26 is an example screenshot of a communication page 2600 of GUI 170 that is displayed in second display area 1605 in response to sponsor selection of a communication tab 2603 in first display area 1603. In the illustrated embodiment shown in page 2600, messages sent from a sponsor to at least one customer are displayed, including tips shared from the sponsor to at least one customer. Different messages displayed on page 2600 are displayed along with different information regarding the messages including a date and time 2602 of a message, a category 2604 of a message, a message 2606 itself, a status 2608 of a message, and actions 2610 that can be taken with respect to a message.

A category 2604 of a message may be, as examples, a blog post, a podcast, education-related, and tips (e.g., advice). Indicators in status 2608 column indicate whether a message is active (e.g., viewable by customers) or inactive (e.g., not viewable by customers). Actions 2610 column includes controls for a number of actions that can be taken by the sponsor. Upon selection of a control in actions 2610 column, a sponsor may edit, delete, and/or publish a particular message. Further a create tips control 2612 may be selected by a sponsor to generate a new tip/piece of advice to create in a message (e.g., as a textual message sent to a mobile application, a podcast, etc.) that can then be shared with customers via SE computing device 152.

Further, as displayed on page 2600, a sponsor may select additional tabs in first display area 1603 including tasks tab 2614, education tab 2616, and certification tab 2618. In response to selection of tasks tab 2614, GUI 2601 displays, in second display area 1605, a page including controls for the sponsor to add new tasks (e.g., reminders, notices, action items, etc.), view tasks automatically generated by SE computing system 152 (e.g., in a listing of tasks), view new business opportunities identified by SE computing system 152, and select tasks. In response to selection of a task, SE computing system 152 communicates information to customers to improve the customer experience when interacting with SE computing system 150 including educational information and/or guidance. In response to selection of education tab 2616, GUI 2601 displays, in second display area 1605, education information selectively transmittable to mobile computing devices of at least a portion of the list of customers included in the contacts tab such that customers may view education information in an education module as described herein. In response to selection certification tab 2618, GUI 2601 displays, in second display area 1605, certification information selectively transmittable to mobile computing devices of at least a portion of the list of customers included in the contacts tab such that customers may view and confirm the certification information of the sponsor.

Figure 27:
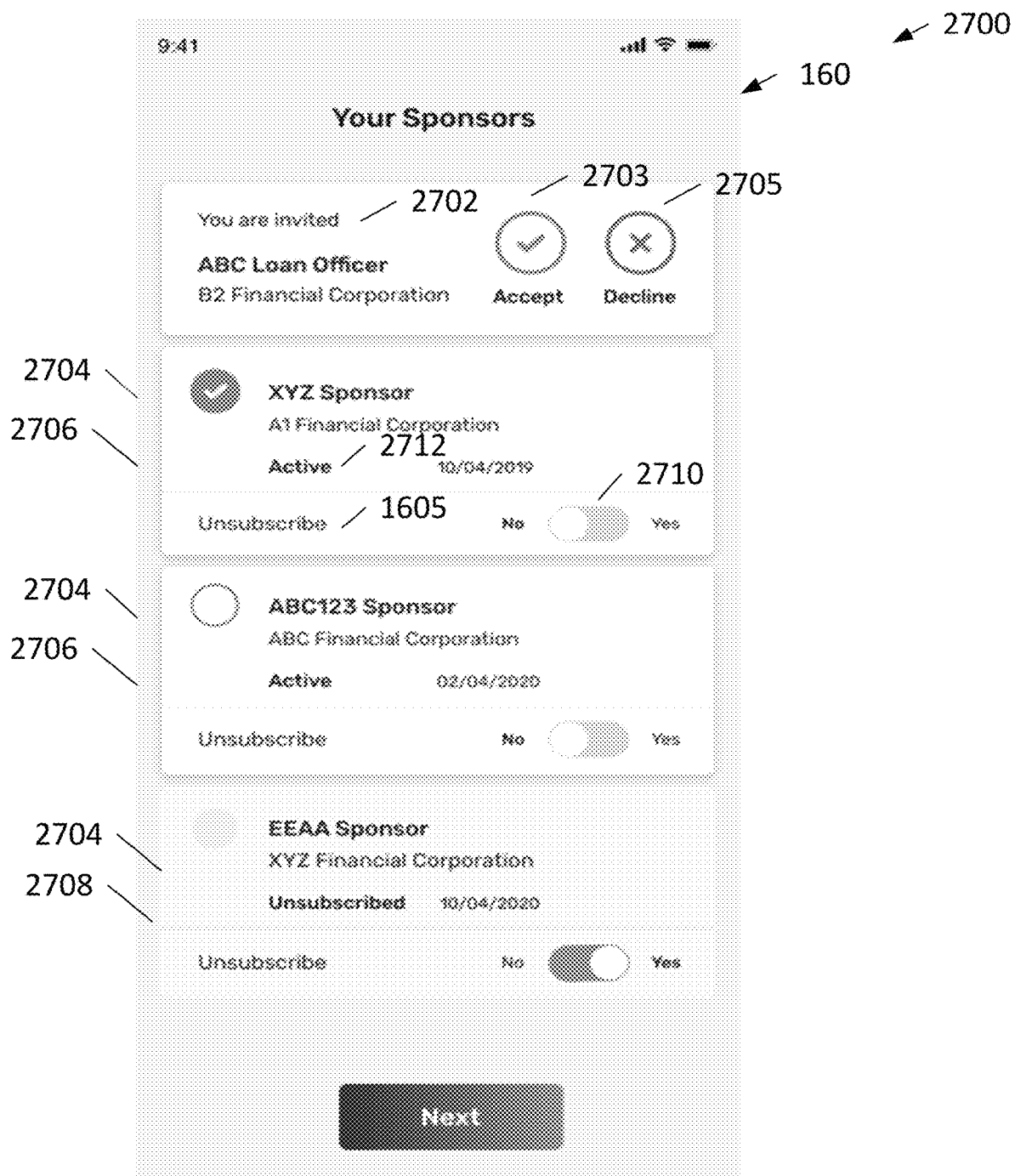
FIG. 27 illustrates an example screenshot of a sponsors page of a sponsorship engine (SE) application in accordance with the present disclosure.

FIG. 27 is an example screenshot of a sponsors page 2700 of SE application 160. In the example embodiment, SE application 160 is configured to execute on user computing devices 154 that are mobile devices, e.g., smart phones. Thus, SE application 160 is configured to display pages that are optimized for viewing in the limited area of a smart phone display. Alternatively, SE application 160 is configured to execute on any suitable device. SE application 160 enables interaction between end users or customers of the sponsor and SE computing device 152.

Illustrated on page 2700 is an example invited sponsor 2702, example accepted sponsors 2704, including subscribed sponsors 2706 and unsubscribed sponsors 2708. At the mobile application on sponsors page 2700, a customer can manage which sponsors they have accepted and which sponsors they subscribe to by selection of different controls. In the illustrated embodiment, invited sponsor 2702 is an example of a sponsor that has invited the customer to subscribe to their offers (e.g., from vendors associated with that sponsor). A customer may accept invited sponsor 2702 by selecting accept control 2703, or decline the invited sponsor by selecting decline control 2705. Accepted sponsors 2704 are examples of sponsors the customer has already accepted. However, even after accepting a sponsor, a customer may unsubscribe from certain accepted sponsors (e.g., unsubscribed sponsor 2708) while still subscribing to other sponsors (e.g., subscribed sponsors 2706) as indicated by subscribe control 2710. Further, a status identifier 2712 is displayed for each accepted sponsor indicating whether a sponsor is active (e.g., has recently used the sponsor portal), is inactive (e.g., has not recently used the sponsor portal), or is unsubscribed to by the customer.

Figure 28:
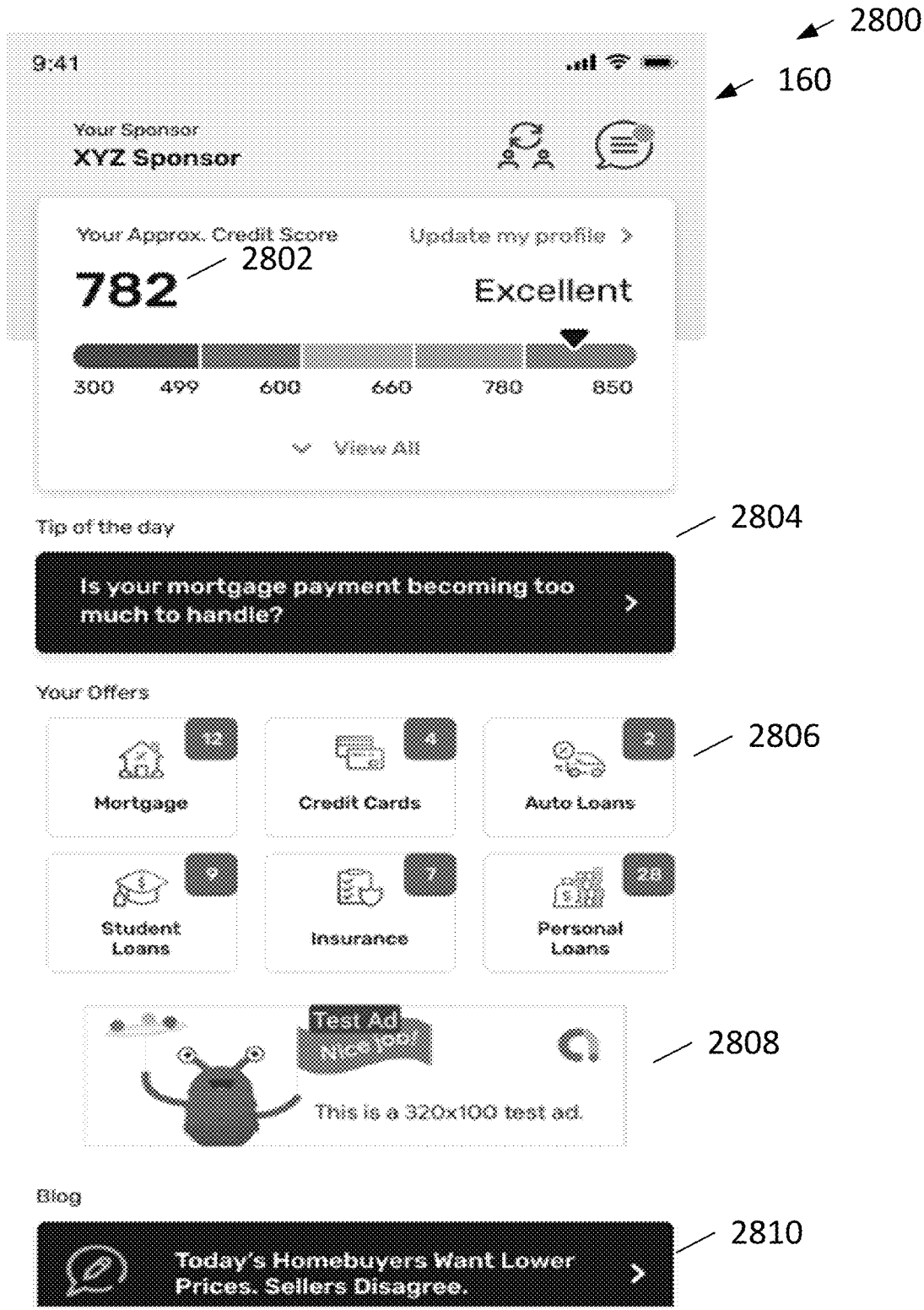
FIG. 28 illustrates an example screenshot of a dashboard page of an SE application in accordance with the present disclosure.

FIG. 28 is an example screenshot of a dashboard page 2800 of SE application 160. Illustrated on page 2800 are an example credit score 2802, an example tip 2804, an example dashboard 2806 including offers as described herein, an example advertisement 2808, and an example link 2810 to a blog post.

Credit score 2802 is displayed so that a customer using SE application 160 is aware of their approximate credit score, and to encourage the customer to utilize SE computing system 152 to improve their credit score as described herein. Tip 2804 includes advice and/or a prompt that is associated with a specific feature of the mobile application. For example, SE application 160 is configured to, based on control from SE computing device 152, help customers with mortgage options that may benefit the customer. Accordingly, example tip 2804 is related to mortgage payments.

Dashboard 2806 includes a listing of controls for a variety of options the customer has offers available for. For example, as illustrated in dashboard 2806, the customer currently has 12 offers associated with mortgages, 4 offers associated with credit cards, 2 offers associated with auto loans, 9 offers associated with student loans, 7 offers related to insurance, and 28 offers related to personal loans. As described herein, offers listed in dashboard 2806 include offers sent to customers, via SE computing system 152, from sponsors of the customer. In response to selection of a control in dashboard 2806, SE application 160 displays a new page associated with the selected control.

Example page 2800 also includes advertisement 2808 that in some embodiments is specifically selected for the customer by SE computing device 152. Example page 2800 further includes example link 2810 control. In response to customer selection of link 2810 control, SE application 160 displays a blog post that in some embodiments may also be specifically selected for the customer by SE computing device 152.

Figure 29:
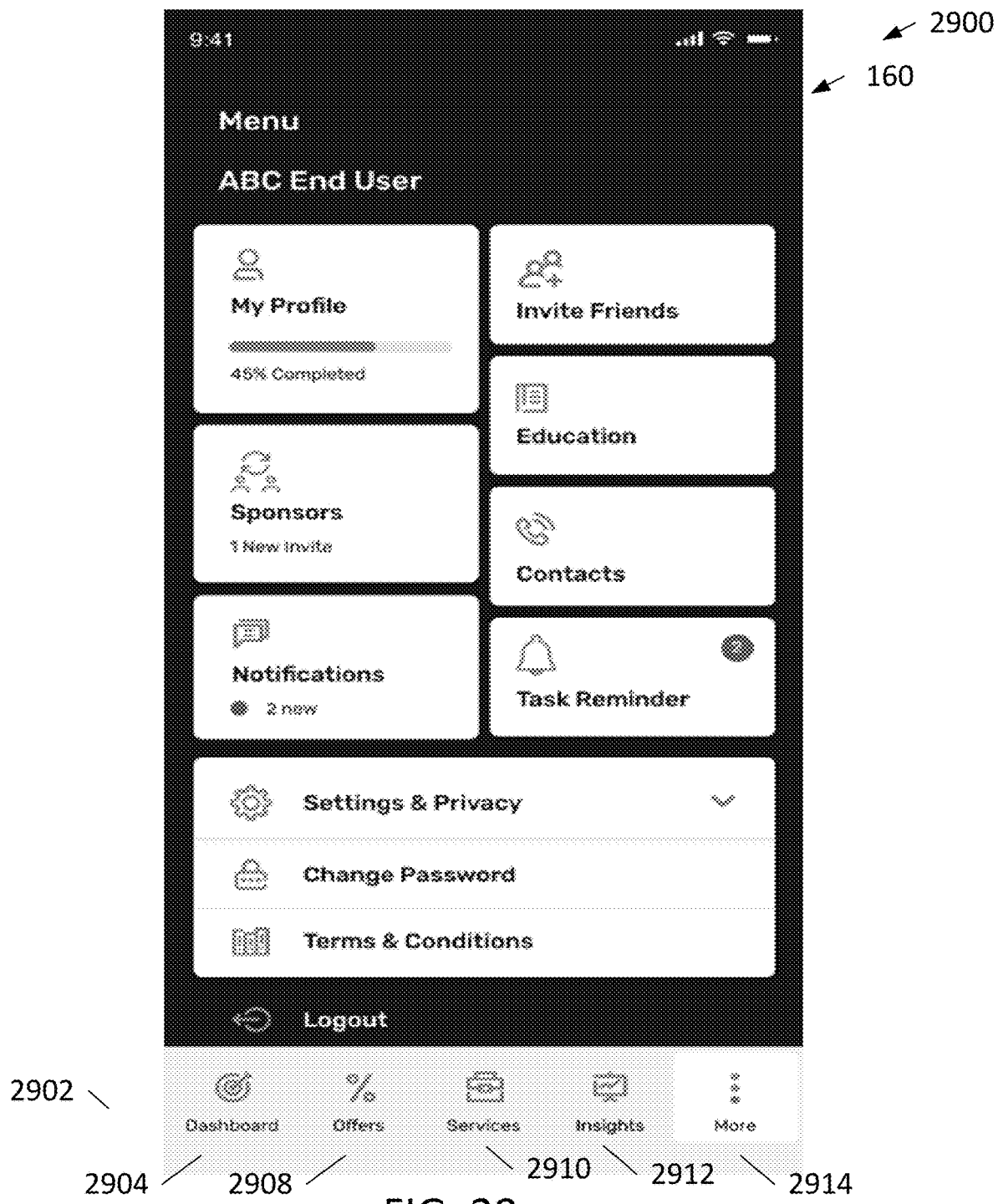
FIG. 29 illustrates an example screenshot of a home page of an SE application that is displayed upon activation of the SE application in accordance with the present disclosure.

FIG. 29 is an example screenshot of a home page 2900 of SE application 160 that is displayed upon activation of SE application 160. In the illustrated example, page 2900 includes controls linking page 2900 to a variety of other features included in the mobile application including a control to view and edit the profile of the customer (e.g., also including an indication of how much information the customer has entered in the application as a percentage), a sponsors control (e.g., to take a customer to sponsors page 2700), a notifications control (e.g., to take a customer to a page to view their notifications), an invite friends control (e.g., allowing a customer to invite other customers), an education control (e.g., to take the customer to a page with educational information (e.g., an education module) to assist the customer), a contacts link (e.g., allowing a customer to view their contacts list), and a task reminder link (e.g., to take a customer to a page where they can review tasks SE computing device 152 recommends the customer complete).

Other features included in example page 2900 include a control for settings and privacy regarding the mobile application, a change password control allowing the customer to change their password, a terms and conditions control allowing the customer to view terms and conditions associated with the application, and a logout control allowing the customer to log out of their account.

In addition, a menu 2902 includes control 2904 for selecting dashboard page 2800, control 2908 for selecting offers page 3400, control 2910 for selecting services page 3500, control 2912 for selecting insights page 3100, and control 2914 for selecting "more" or additional pages. Menu 2902 is also displayed on at least some other pages of SE application 160 as shown in the figures to facilitate user navigation within SE application 160.

Figure 30:
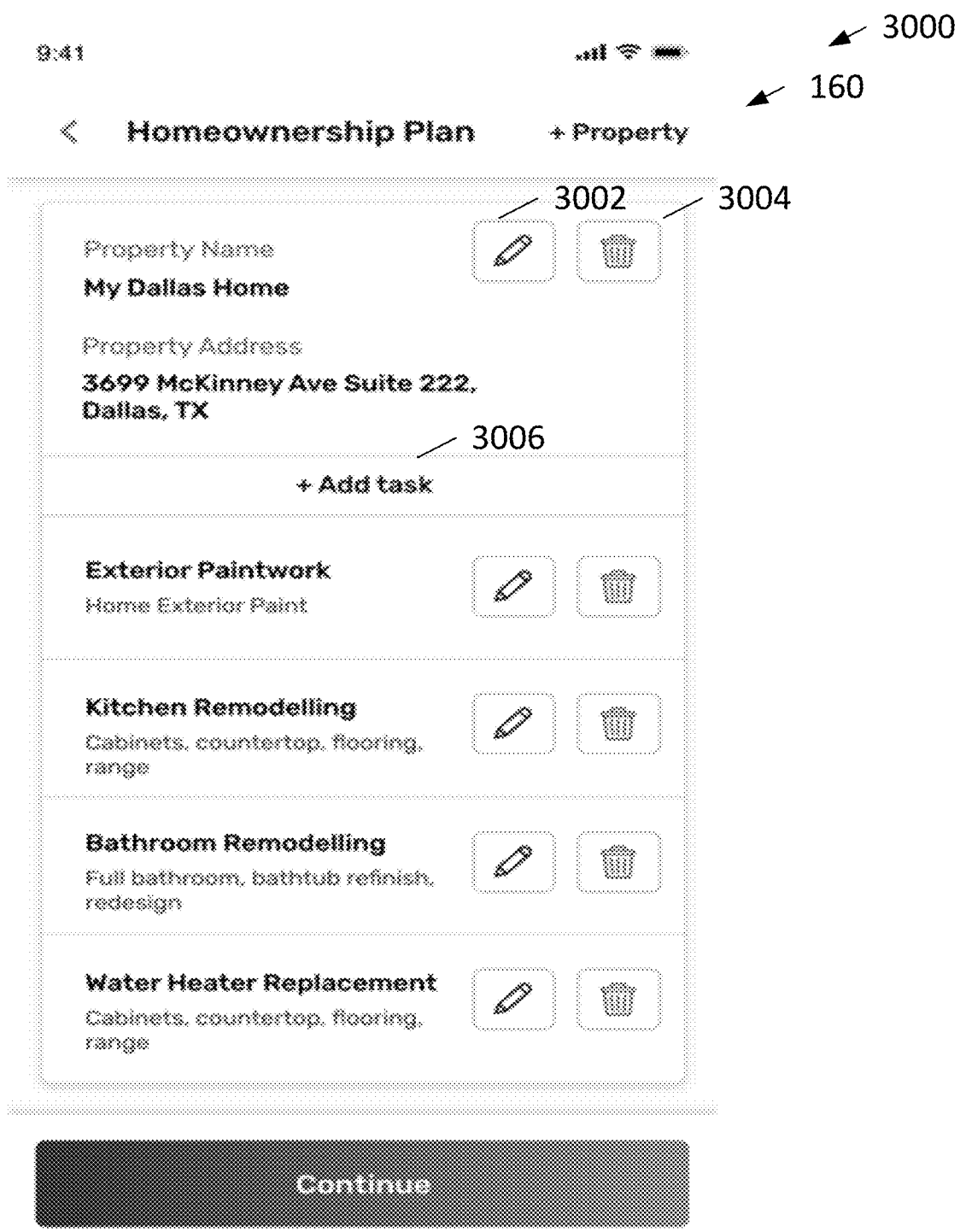
FIG. 30 illustrates an example screenshot of a homeownership page of an SE application that is accessible via a control in accordance with the present disclosure.

FIG. 30 is an example screenshot of a homeownership page 3000 of SE application 160 that is accessible via control 2914. As described in illustrated examples included herein, SE computing device 152 may create a homeownership plan for the customer automatically, and/or based on customer input (e.g., wherein the customer indicates which homeownership tasks they would like included in their plan). For example, as shown on page 3000, homeownership tasks may include exterior paintwork, kitchen remodeling, bathroom remodeling, and water heater replacement. Further, a customer may select to edit and/or delete particular tasks by selecting edit control 3002 and/or delete control 3004 respectively. A customer may also choose to add tasks by selecting add task control 3006. Further, the mobile application is configured to, via utilization of SE computing device 152, generate and store any number of homeownership plans for any number of properties associated with the customer. For example, the illustrated example in FIG. 30 displays a plan for a home in the state of Texas.

Figure 31:
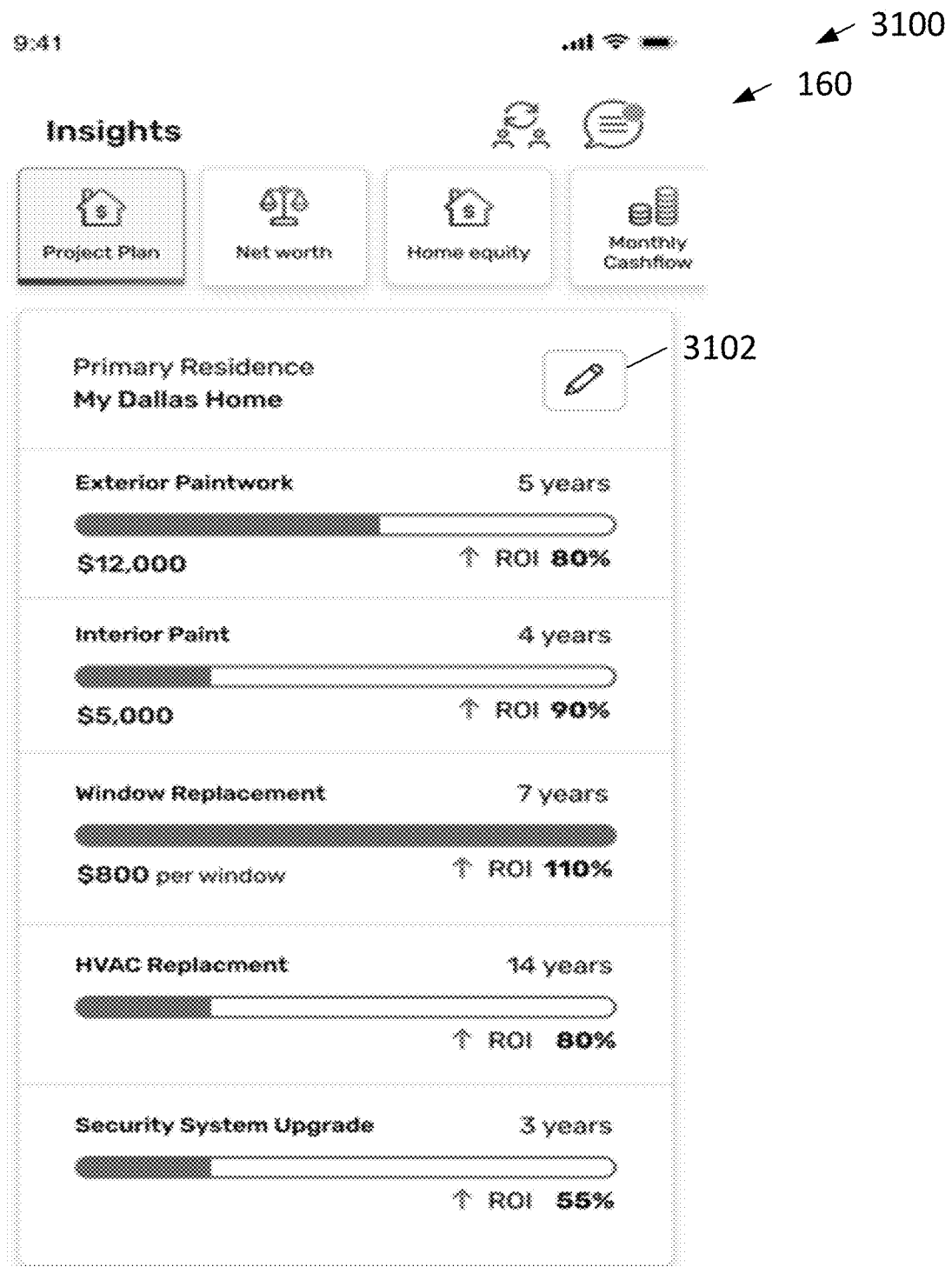
FIG. 31 illustrates an example screenshot of an insights page of an SE application accessible via a control in accordance with the present disclosure.

FIG. 31 is an example screenshot of an insights page 3100 of SE application 160 accessible via control 2912. In addition to homeownership page 3000 as described above, SE computing device 152 generates and stores many details regarding tasks included in a homeownership plan. For example, page 3100 illustrates details regarding the cost, progress towards payment, projected return on investment (ROI), and amount of time toward projected completion for tasks including exterior paintwork, interior paint, window replacement, HVAC replacement, and security system upgrades. Further insights generated and stored by SE computing device 152 include information regarding net worth, home equity, and monthly cash flow. On insights page 3100, a sponsor may select edit control 3102. In response to selection of control 3102, SE application 160 displays editable information regarding a property in the customer profile.

Figure 32:
FIG. 32 illustrates an example screenshot of a maintenance tasks page of an SE application accessible via a control in accordance with the present disclosure.

FIG. 32 is an example screenshot of a maintenance tasks page 3200 of SE application 160 accessible via control 2914. In the example embodiment, SE computing device 152 generates and stores maintenance tasks for each property submitted to SE application 160 by a customer. Maintenance tasks may be automatically generated by SE computing device 152, and/or may be manually submitted by the customer. For example, two different properties are displayed on page 3200, a home in Dallas and a home in New York. Further, different maintenance tasks are displayed for each property that may be edited and/or deleted (e.g., in response to selection of edit control 3202 and/or delete control 3204 respectively) by a customer including changing an air filter, HVAC cleaning, and pest control.

Figure 33:
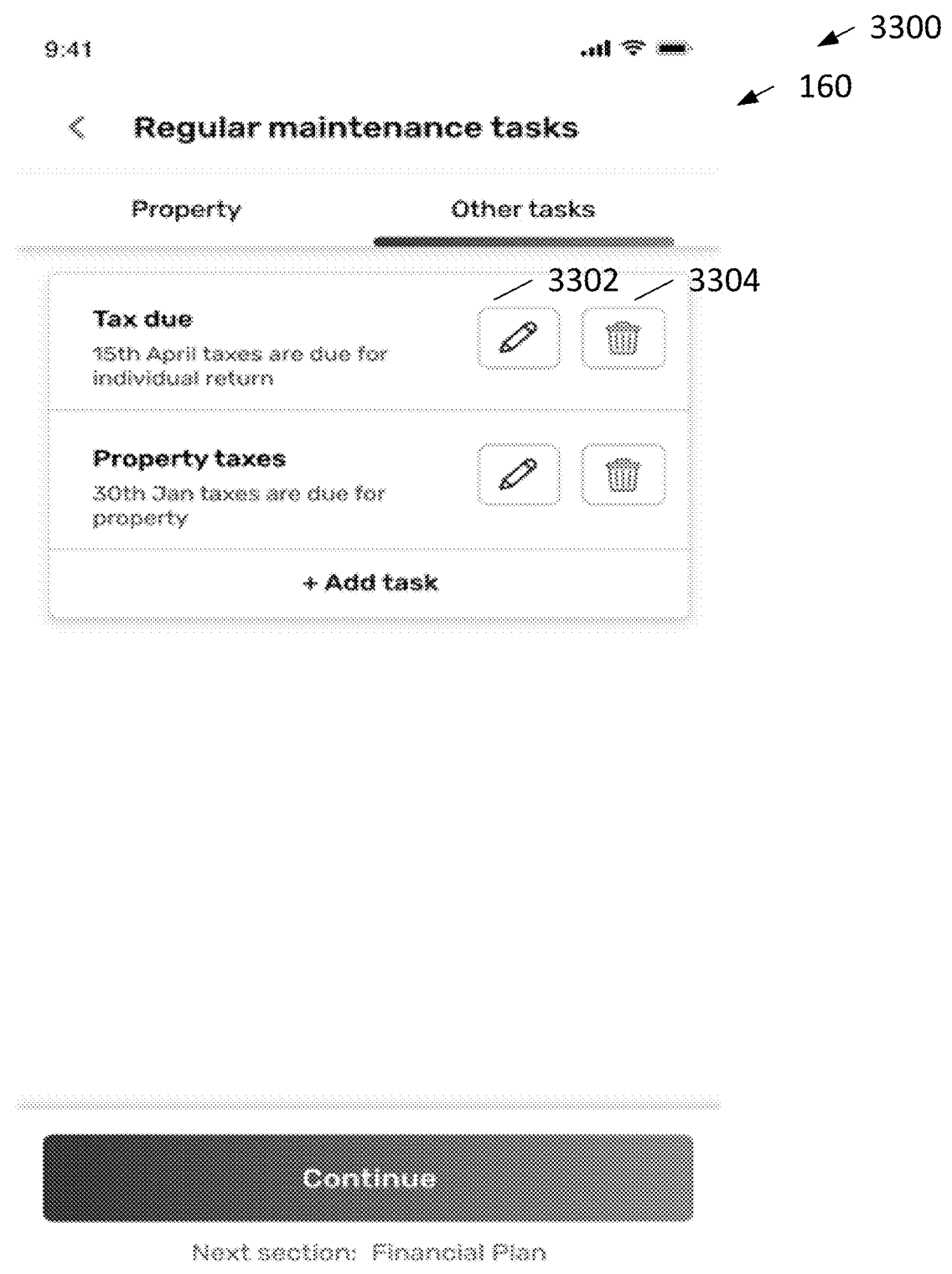

FIG. 33 is an example screenshot of an other tasks page 3300 of SE application 160 accessible via control 2914. Similar to the maintenance tasks described above, SE computing device 152 generates and stores other tasks for each property submitted to SE application 160 by a customer. Other tasks may be automatically generated by SE computing device 152, and/or may be manually submitted by the customer. Other tasks may also be edited and/or deleted (e.g., in response to selection of edit control 3302 and/or delete control 3304 respectively) by a customer.

Figure 34:
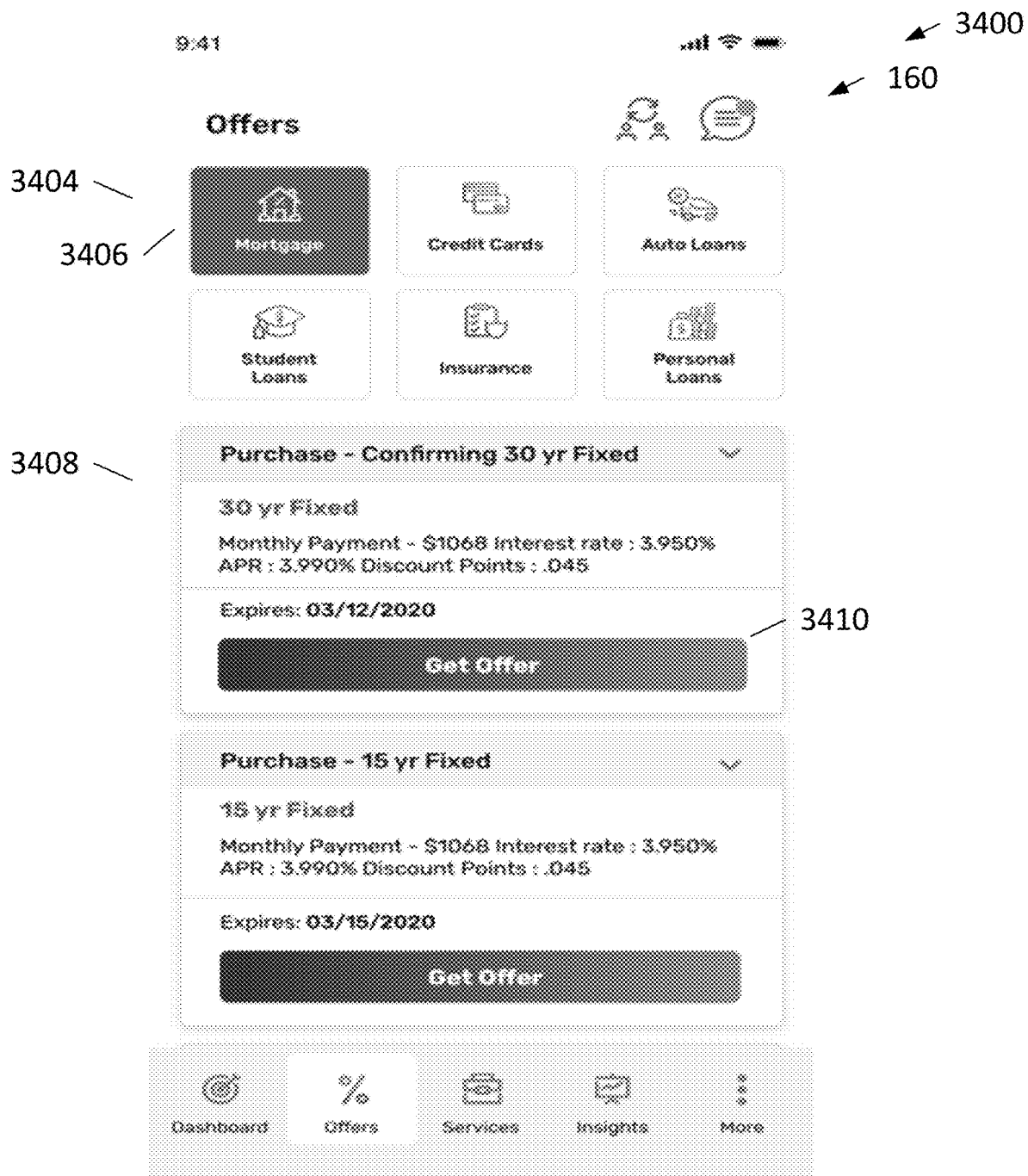
FIG. 34 illustrates an example screenshot of an offers page of an SE application that is displayed upon a customer selection of a control in accordance with the present disclosure.

FIG. 34 is an example screenshot of an offers page 3400 of SE application 160 that is displayed upon a customer selection of control 2908. Offers page 3400 includes a dashboard 3404 including controls for different categories of offers (e.g., mortgages, credit cards, auto loans, student loans, insurance, personal loans, etc.). Upon customer selection of a control for a category, offers for the category are displayed. In the illustrated embodiment, a customer has selected the mortgages control 3406. Accordingly, mortgage offers 3408 are displayed on page 3400. In some embodiments, mortgage offers 2408 (and other offers, including insurance offers) are automatically generated by SE computing device 152 based on customer and/or sponsor data stored in SE computing system 150. Upon customer selection of a get offer control 3410 on an offer, the customer can then accept that particular offer.

Figure 35:
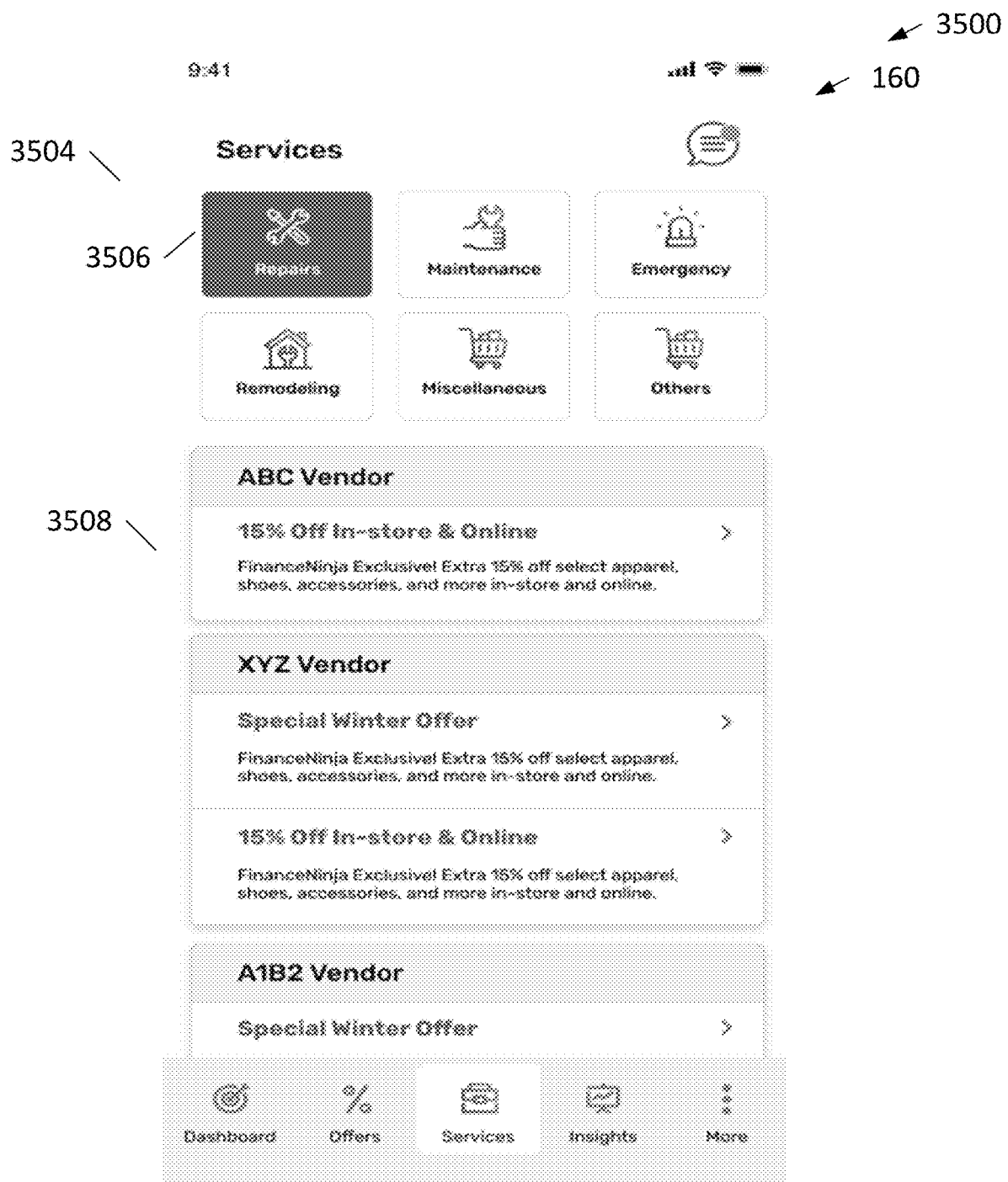
FIG. 35 is an example screenshot of a services page of an SE application that is displayed upon customer selection of a services tab in accordance with the present disclosure.

FIG. 35 is an example screenshot of a services page 3500 of SE application 160 that is displayed upon customer selection of a services tab 3502. In addition to offers, as described above, services may also be offered by certain vendors and transmitted to customers from SE computing device 152 via SE application 160. Accordingly, page 3500 includes a dashboard 3504 including controls for different categories of services (e.g., repairs, maintenance, emergencies, remodeling, miscellaneous, others, etc.). In the illustrated example, a customer has selected repairs control 3506. Accordingly, repairs offers 3508 are displayed.

Figure 36:
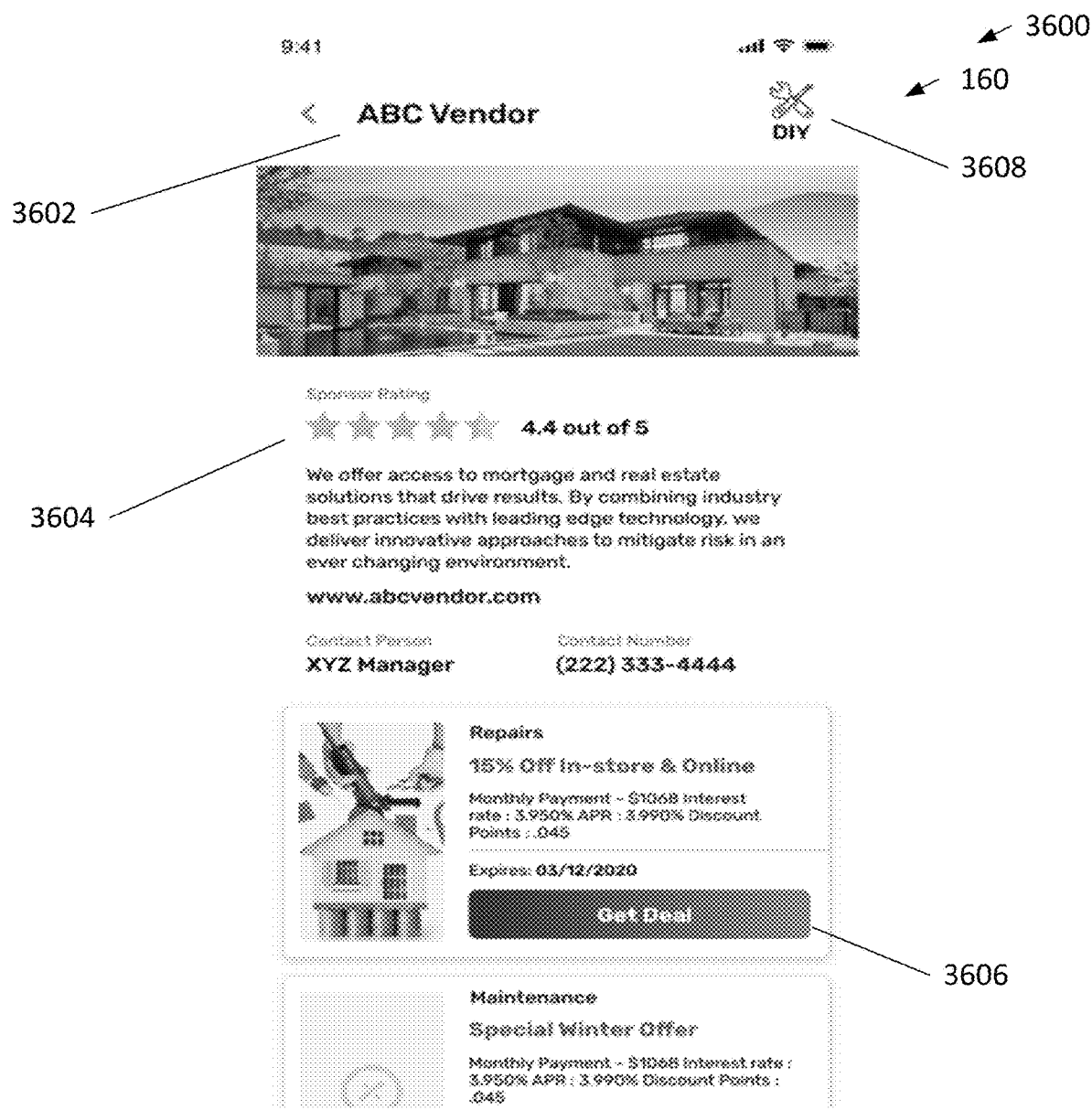
FIG. 36 is an example screenshot of a vendor page of an SE application that is displayed upon customer selection of a control associated with an offer in accordance with the present disclosure.

FIG. 36 is an example screenshot of a vendor page 3600 of SE application 160 that is displayed upon customer selection of a control associated with an offer (e.g., repairs offers 3508). In response to selection of a control of an offer, SE application 160, as controlled by SE computing device 152, is configured to display at least a vendor name 3602, a vendor rating 3604, as rated by a sponsor of the customer utilizing SE application 160, a get deal control 3606, and a do it yourself ("DIY") control 3608. In response to customer selection of get deal control 3606, SE computing device 152 is configured to cause SE application 160 to allow a customer to redeem an offer associated with get deal control 3606. In response to customer selection of DIY control 3608, SE computing device 152 is configured to cause SE application 160 to initiate a connection between a user computing device of a customer (e.g., user computing device 154) and a user computing device of a vendor (e.g., user computing device 154 of a vendor associated with vendor name 3602). For example, SE application 160 enables customers to select a video chat option (e.g., DIY control 3608) for vendors who agree to provide a service through SE system 150. More specifically, SE application 160 provides DIY control 3608 that, when selected by the customer, initiates a video chat with the vendor. The vendor may then help the customer complete a DIY task, in the equivalent of an interactive "how to" video, and form a new customer relationship without the vendor needing to travel to the customer property. The vendor benefits because the customer is much more likely to call on the vendor subsequently for larger projects, and optionally the vendor may charge a small fee for the DIY guidance.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques including computer software, firmware, hardware or any combination or subset thereof, wherein the technical effect is the ability of a computing system to provide financial recommendations for a user based on a user profile and enable the user to efficiently track the user's financial information across a variety of different types of financial products from a variety of different providers. Any such resulting program, having computer-readable code means, may be embodied or provided within one or more computer-readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

In addition, although various elements of the SE computing device and UFA computing device are described herein as including general processing and memory devices, it should be understood that each of the SE computing device and the UFA computing device is a specialized computer configured to perform the steps described herein for implementing an automated personal finance agent for a user.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics and information, audio and/or video records, text, and/or actual true or false values. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or other types of machine learning or artificial intelligence.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

As described above, the systems and methods described herein may use machine learning, for example, for pattern recognition and/or predictive modeling. That is, machine learning algorithms may be used by SE computing system 152 to generate a sequence of questions (e.g., second sequence of questions 210) regarding a user based on data in a plurality of data sets and/or determine a first educational module relevant to a user. Accordingly, the systems and methods described herein may use machine learning algorithms for both pattern recognition and predictive modeling.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal language of the claims.

What is claimed is:

1. A sponsor portal system configured to control a graphical user interface (GUI) at a user computing device, the sponsor portal system comprising a sponsor engine comprising a processor in communication with a database, the database storing sponsor profiles for a plurality of sponsors and user profiles for a plurality of users, each sponsor registered for recommending vendors to users, wherein the sponsor engine is programmed to cause to be displayed on the GUI:
a first display area displaying a plurality of tabs for different elements of the sponsor portal system; and
a second display area, wherein the sponsor engine is further programmed to dynamically update the second display area to display, in response to a selection of a leads tab in the first display area, a list of active offers, each active offer selectable by the sponsor and associated with a vendor, wherein in response to selection of an active offer, the sponsor engine is further programmed to:
cause display in overlay over the second display area a draft offer message corresponding to the selected active offer, the draft offer message including an offer title, a details section, and a hyperlink to additional information regarding the offer;
cause display of an approval control selectable to indicate approval of the draft offer message by the sponsor; and
wherein in response to selection of the approval control, the sponsor engine is programmed to:
determine, based upon the user profiles and at least one of the offer or the vendor associated with the offer, a subset of the plurality of users to receive the offer; and
transmit an interactive graphic to mobile computing devices of the subset of the plurality of users, the interactive graphic configured to communicate to the mobile computing devices a limited amount of information associated with the selected active offer, the limited amount of information comprising at least a portion of the offer title, the details section, and the hyperlink included in the draft offer message, the limited amount of information sized for ease of display on a smart phone screen of limited size.

2. The sponsor portal system of claim 1, wherein the sponsor engine is further programmed to determine the subset of the plurality of users based upon distances from a vendor location to respective end user locations, wherein the distances from the vendor location to the respective end user locations of the subset of the plurality of users are within a threshold distance, and wherein the user profiles comprise the respective end user locations.

3. The sponsor portal system of claim 1, wherein the sponsor engine is further programmed to determine the subset of the plurality of users based upon at least one of a credit score, income, or debt-to-income ratio of each respective user of the plurality of users.

4. The sponsor portal system of claim 1, wherein the sponsor engine is programmed to determine the subset based upon vendor ratings, each respective vendor rating of the vendor ratings associated with the vendor and a respective user of the plurality of users and comprising a hierarchal connection identifying how the respective user is connected with rating providers of the vendor rating.

5. The sponsor portal system of claim 1, wherein the additional information regarding the offer comprises a vendor rating from a reviewer and at least one review comprising at least one comment from the reviewer, wherein the reviewer satisfies at least one standard regarding how the reviewer is connected with a respective user profile.

6. The sponsor portal system of claim 1, wherein the sponsor engine is further programmed to dynamically update the second display area to display:
in response to a selection of a communication tab in the first display area, a listing of messages previously sent to customers of the sponsor, including a message-edit control selectable to enable editing of each message in the listing of messages;
in response to a selection of an offers tab in the first display area, a listing of offers submitted by at least one vendor in a list of vendors, the listing of offers including an offer-edit control selectable to enable editing of each offer in the listing of offers;
in response to a selection of a contacts tab in the first display area, a scrollable list of customers of the sponsor; and
in response to a selection of a vendors tab in the first display area, a list of vendors approved by the sponsor.

7. The sponsor portal system of claim 1, wherein the sponsor engine is further programmed to dynamically update the second display area to display:
in response to a selection of a tasks tab in the first display area, a listing of tasks, generated by the sponsor portal system in response to data stored in the database, recommended by the sponsor portal system for the sponsor to perform;

in response to a selection of an education tab in the first display area, education information selectively transmittable to mobile computing devices of at least a portion of a list of customers included in a contacts tab such that customers may view education information in an education module; and in response to a selection of a certification tab in the first display area, certification information selectively transmittable to mobile computing devices of at least a portion of the list of customers included in the contacts tab such that customers may view and confirm the certification information of the sponsor.

8. A computer-implemented method for implementing, for a sponsor portal system, a graphical user interface (GUI) at a user computing device, the sponsor portal system comprising a sponsor engine comprising a processor in communication with a database, the database storing sponsor profiles for a plurality of sponsors and user profiles for a plurality of users, each sponsor registered for recommending vendors to users, the method comprising steps, performed by the sponsor engine, of:

causing display, on a first display area of the GUI, of a plurality of tabs for different elements of the sponsor portal system;

dynamically updating a second display area of the GUI to display, in response to a selection of a leads tab in the first display area, a list of active offers, each active offer selectable by the sponsor and associated with a vendor;

in response to selection of an active offer from the list of active offers in the second display area, causing display in overlay over the second display area of a draft offer message corresponding to the selected active offer, the draft offer message including an offer title, a details section, and a hyperlink to additional information regarding the offer;

causing display of an approval control selectable to indicate approval of the draft offer message; and in response to selection of the approval control:
determining, based upon the user profiles and at least one of the offer or the vendor associated with the offer, a subset of the plurality of users to receive the offer; and transmitting an interactive graphic to mobile computing devices of the subset of the plurality of users, the interactive graphic configured to communicate to the mobile computing devices a limited amount of information associated with the selected active offer, the limited amount of information comprising at least a portion of the offer title, the details section, and the hyperlink included in the draft offer message, the limited amount of information sized for ease of display on a smart phone screen of limited size.

9. The computer-implemented method of claim 8, further comprising determining the subset of the plurality of users based upon distances from a vendor location to respective end user locations, wherein the distances from the vendor location to the respective end user locations of the subset of the plurality of users are within a threshold distance, and wherein the user profiles comprise the respective end user locations.

10. The computer-implemented method of claim 8, further comprising determining the subset of the plurality of users based upon the user profiles, the user profiles comprising at least one of a credit score, income, or debt-to-income ratio of each respective user of the plurality of users.

11. The computer-implemented method of claim 8, further comprising determining the subset based upon vendor ratings, each respective vendor rating of the vendor ratings associated with the vendor and a respective user of the plurality of users and comprising a hierarchal connection identifying how the respective user is connected with rating providers of the vendor rating.

12. The computer-implemented method of claim 8, wherein the additional information regarding the offer comprises a vendor rating from a reviewer and at least one review comprising at least one comment from the reviewer, wherein the reviewer satisfies at least one standard regarding how the reviewer is connected with a respective user profile.

13. The computer-implemented method of claim 8, further comprising dynamically updating the second display area to display:

in response to a selection of a communication tab in the first display area, a listing of messages previously sent to customers of the sponsor, including a message-edit control selectable to enable editing of each message in the listing of messages;

in response to a selection of an offers tab in the first display area, a listing of offers submitted by at least one vendor in a list of vendors, the listing of offers including an offer-edit control selectable to enable editing of each offer in the listing of offers;

in response to a selection of a contacts tab in the first display area, a scrollable list of customers of the sponsor; and in response to a selection of a vendors tab in the first display area, a list of vendors approved by the sponsor.

14. The computer-implemented method of claim 8, further comprising dynamically updating the second display area to display:

in response to a selection of a tasks tab in the first display area, a listing of tasks, generated by the sponsor portal system in response to data stored in the database, recommended by the sponsor portal system for the sponsor to perform;

in response to a selection of an education tab in the first display area, education information selectively transmittable to mobile computing devices of at least a portion of a list of customers included in a contacts tab such that customers may view education information in an education module; and in response to a selection of a certification tab in the first display area, certification information selectively transmittable to mobile computing devices of at least a portion of the list of customers included in the contacts tab such that customers may view and confirm the certification information of the sponsor.

15. At least one non-transitory computer-readable storage media of a sponsor portal system and including computer-executable instructions for implementing a graphical user interface (GUI) at a user computing device, the sponsor portal system including a sponsor engine comprising a processor in communication with a database, the database storing sponsor profiles for a plurality of sponsors and user profiles for a plurality of users, each sponsor registered for recommending vendors to users, wherein the computer-executable instructions, when executed by the sponsor engine, cause the sponsor engine to:

cause display, on a first display area of the GUI, of a plurality of tabs for different elements of the sponsor portal system;

dynamically update a second display area of the GUI to display, in response to a selection of a leads tab in the first display area, a list of active offers, each active offer selectable by the sponsor and associated with a vendor;

in response to selection of an active offer from the list of active offers in the second display area, cause display in overlay over the second display area of a draft offer message corresponding to the selected active offer, the draft offer message including an offer title, a details section, and a hyperlink to additional information regarding the offer;

cause display of an approval control selectable to indicate approval of the draft offer message; and in response to selection of the approval control:

determine, based upon the user profiles and at least one of the offer or the vendor associated with the offer, a subset of the plurality of users to receive the offer; and transmit an interactive graphic to mobile computing devices of the subset of the plurality of users, the interactive graphic configured to communicate to the mobile computing devices a limited amount of information associated with the selected active offer, the limited amount of information comprising at least a portion of the offer title, the details section, and the hyperlink included in the draft offer message, the limited amount of information sized for ease of display on a smart phone screen of limited size.

16. The at least one non-transitory computer-readable storage media of claim 15, wherein the computer-executable instructions, when executed by the sponsor engine, further cause the sponsor engine to determine the subset of the plurality of users based upon distances from a vendor location to respective end user locations, wherein the distances from the vendor location to the respective end user locations of the subset of the plurality of users are within a threshold distance, and wherein the user profiles comprise the respective end user locations.

17. The at least one non-transitory computer-readable storage media of claim 15, wherein the computer-executable instructions, when executed by the at sponsor engine, further cause the sponsor engine to determine the subset of the plurality of users based upon the user profiles, the user profiles comprising at least one of a credit score, income, or debt-to-income ratio of each respective user of the plurality of users.

18. The at least one non-transitory computer-readable storage media of claim 15, wherein the computer-executable instructions, when executed by the sponsor engine, further cause the sponsor engine to determine the subset based upon vendor ratings, each respective vendor rating of the vendor ratings associated with the vendor and a respective user of the plurality of users and comprising a hierarchal connection identifying how the respective user is connected with rating providers of the vendor rating.

19. The at least one non-transitory computer-readable storage media of claim 15, wherein the additional information regarding the offer comprises a vendor rating from a reviewer and at least one review comprising at least one comment from the reviewer, wherein the reviewer satisfies at least one standard regarding how the reviewer is connected with a respective user profile.

20. The at least one non-transitory computer-readable storage media of claim 15, wherein the computer-executable instructions, when executed by the sponsor engine, further cause the sponsor engine to dynamically update the second display area to display:

in response to a selection of a contacts tab in the first display area, a scrollable list of customers of the sponsor;

in response to a selection of a vendors tab in the first display area, a list of vendors approved by the sponsor;

in response to a selection of a communication tab in the first display area, a listing of messages previously sent to customers of the sponsor, including a message-edit control selectable to enable editing of each message in the listing of messages;

in response to a selection of an offers tab in the first display area, a listing of offers submitted by at least one vendor in a list of vendors, the listing of offers including an offer-edit control selectable to enable editing of each offer in the listing of offers;

in response to a selection of a tasks tab in the first display area, a listing of tasks, generated by the sponsor portal system in response to data stored in the database, recommended by the sponsor portal system for the sponsor to perform;

in response to a selection of an education tab in the first display area, education information selectively transmittable to mobile computing devices of at least a portion of a list of customers included in a contacts tab such that customers may view education information in an education module; and in response to a selection of a certification tab in the first display area, certification information selectively transmittable to mobile computing devices of at least a portion of the list of customers included in the contacts tab such that customers may view and confirm the certification information of the sponsor.

* * * * *